(12) United States Patent
Nolan et al.

(10) Patent No.: US 11,386,420 B2
(45) Date of Patent: Jul. 12, 2022

(54) CONTEXTUAL AUTHENTICATION OF AN ELECTRONIC WALLET

(71) Applicant: INTEL CORPORATION, Santa Clara, CA (US)

(72) Inventors: Michael Nolan, Maynooth (IE); Davide Carboni, London (GB); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 578 days.

(21) Appl. No.: 15/859,213

(22) Filed: Dec. 29, 2017

(65) Prior Publication Data

US 2019/0034920 A1    Jan. 31, 2019

(51) Int. Cl.
*G06Q 20/36* (2012.01)
*G06Q 20/40* (2012.01)

(52) U.S. Cl.
CPC ..... *G06Q 20/3674* (2013.01); *G06Q 20/4012* (2013.01)

(58) Field of Classification Search
CPC ............... G06Q 20/3829; G06Q 20/36; G06Q 20/3224; G06Q 20/367; G06Q 20/12; G06Q 20/10; G06Q 20/04; G06Q 20/40145; G06Q 20/3278; G06Q 20/32; G06Q 20/065
See application file for complete search history.

(56) References Cited

U.S. PATENT DOCUMENTS

| | | | |
|---|---|---|---|
| 5,892,900 A | 4/1999 | Ginter et al. | |
| 8,577,795 B2 | 11/2013 | Clubb et al. | |
| 9,454,723 B1 | 9/2016 | Cordes et al. | |
| 9,608,829 B2 | 3/2017 | Spanos et al. | |
| 10,354,325 B1 | 7/2019 | Skala et al. | |
| 10,909,541 B1 | 2/2021 | Maeng | |
| 2014/0046788 A1 | 2/2014 | Lee et al. | |
| 2015/0019320 A1 | 1/2015 | Menendez et al. | |
| 2015/0220928 A1 | 8/2015 | Allen | |
| 2015/0324789 A1 | 11/2015 | Dvorak et al. | |
| 2016/0080157 A1 | 3/2016 | Lundstrom | |
| 2016/0125412 A1* | 5/2016 | Cannon | G06Q 20/4014 705/44 |
| 2016/0292672 A1 | 10/2016 | Fay et al. | |
| 2016/0328700 A1* | 11/2016 | Bortolotto | G06Q 20/405 |

(Continued)

FOREIGN PATENT DOCUMENTS

TW    201828211    8/2018
WO    WO-2017197110 A1    11/2017

OTHER PUBLICATIONS

"U.S. Appl. No. 15/859,211, Final Office Action dated Jun. 23, 2020", 40 pgs.

(Continued)

*Primary Examiner* — Hao Fu

(74) *Attorney, Agent, or Firm* — Schwegman Lundberg & Woessner, P.A.

(57) ABSTRACT

Methods and systems are provided for a contextual authentication of an electronic wallet (e-wallet). An example apparatus includes a wallet application configured to confirm a context for use of an e-wallet, wherein the context is defined by a multifactor authentication (MFA) policy. A multifactor authentication application is configured to access a context sensor to provide input to the wallet application for the MFA policy.

23 Claims, 48 Drawing Sheets

(56) References Cited

U.S. PATENT DOCUMENTS

| | | | |
|---|---|---|---|
| 2017/0011460 A1* | 1/2017 | Molinari | G06F 21/645 |
| 2017/0053268 A1 | 2/2017 | Pande | |
| 2017/0062072 A1* | 3/2017 | Ghosh | G11C 11/1655 |
| 2017/0287090 A1 | 10/2017 | Hunn et al. | |
| 2017/0330174 A1 | 11/2017 | Demarinis et al. | |
| 2017/0357780 A1 | 12/2017 | Childress et al. | |
| 2017/0364908 A1 | 12/2017 | Smith et al. | |
| 2018/0006826 A1 | 1/2018 | Smith et al. | |
| 2018/0025442 A1 | 1/2018 | Isaacson et al. | |
| 2018/0091316 A1 | 3/2018 | Stradling et al. | |
| 2018/0109541 A1 | 4/2018 | Gleichauf | |
| 2018/0183586 A1* | 6/2018 | Bhargav-Spantzel | G06F 21/33 |
| 2018/0205743 A1 | 7/2018 | Mciver et al. | |
| 2018/0302414 A1 | 10/2018 | Wagner | |
| 2018/0337769 A1 | 11/2018 | Gleichauf | |
| 2018/0345904 A1* | 12/2018 | Moore | G07C 9/00174 |
| 2019/0034917 A1 | 1/2019 | Nolan et al. | |
| 2019/0034919 A1 | 1/2019 | Nolan et al. | |
| 2019/0034936 A1 | 1/2019 | Nolan et al. | |
| 2019/0035018 A1 | 1/2019 | Nolan et al. | |
| 2019/0080321 A1 | 3/2019 | Mundis et al. | |
| 2019/0080392 A1 | 3/2019 | Youb et al. | |
| 2019/0108542 A1 | 4/2019 | Durvasula et al. | |
| 2020/0119933 A1 | 4/2020 | Toll et al. | |

OTHER PUBLICATIONS

"U.S. Appl. No. 15/859,216, Non Final Office Action dated May 18, 2020", 20 pgs.
"U.S. Appl. No. 15/859,211, Non Final Office Action dated Jan. 2, 2020", 35 pgs.
"U.S. Appl. No. 15/859,211, Response filed May 4, 2020 to Non Final Office Action dated Jan. 2, 2020", 36 pgs.
"U.S. Appl. No. 15/859,208, Restriction Requirement dated Apr. 29, 2020", 6 pgs.
"U.S. Appl. No. 15/859,208, Response filed Jun. 26, 2020 to Restriction Requirement dated Apr. 29, 2020", 10 pgs.
"U.S. Appl. No. 15/859,208, Non Final Office Action dated Jul. 23, 2020", 18 pgs.
"U.S. Appl. No. 15/859,208, Response filed Aug. 3, 2020 to Non Final Office Action dated Jul. 23, 2020", 25 pgs.
"A Cost-Effective Foundation for End-to-End IoT Security", Intel Corp, White Paper, IoT Security, (2016), 1-5.
"Tor (anonymity network)", [Online], Retrieved from the Internet: https: web.archive.Org web 20171109052921 https. en.wikipedia.org wiki Tor_(anonymity_network), (Nov. 9, 2017), 13 pgs.
"Multisignature", [Online], Retrieved from the Internet: https: web.archive.Org web 20171124123130 https: en. bitcoin.it wiki Multisignature, (Nov. 24, 2017), 3 pgs.
"U.S. Appl. No. 15/859,212, Non Final Office Action dated Apr. 30, 2020", 29 pgs.
"U.S. Appl. No. 15/859,212, Response Filed Jul. 30, 2020 to Non Final Office Action dated Apr. 30, 2020", 32 pgs.
"U.S. Appl. No. 15/859,212, Restriction Requirement dated Jan. 10, 2020", 6 pgs.
"U.S. Appl. No. 15/859,212, Response filed Mar. 10, 2020 to Restriction Requirement dated Jan. 10, 2020", 9 pgs.
"U.S. Appl. No. 15/859,216, Restriction Requirement dated Feb. 7, 2020", 9 pgs.
"U.S. Appl. No. 15/859,216, Response filed Apr. 7, 2020 to Restriction Requirement dated Feb. 7, 2020", 11 pgs.
"U.S. Appl. No. 15/859,216, Response filed Sep. 16, 2020 to Non Final Office Action dated May 18, 2020", 15 pgs.
"U.S. Appl. No. 15/859,211, Response filed Sep. 23, 2020 to Final Office Action dated Jun. 23, 2020", 14 pgs.
"U.S. Appl. No. 15/859,211, Advisory Action dated Oct. 9, 2020", 5 pgs.
"U.S. Appl. No. 15/859,212, Non Final Office Action dated Oct. 15, 2020", 28 pgs.
"U.S. Appl. No. 15/859,211, Response to Advisory Action dated Oct. 9, 2020", 11 pgs.
"U.S. Appl. No. 15/859,216, Final Office Action dated Nov. 25, 2020", 28 pgs.
"U.S. Appl. No. 15/859,212, Response filed Jan. 26, 2021 to Non Final Office Action dated Oct. 15, 2020", 14 pgs.
"U.S. Appl. No. 15/859,212, Final Office Action dated Mar. 12, 2021", 29 pgs.
"U.S. Appl. No. 15/859,211, Non Final Office Action dated Mar. 17, 2021", 22 pgs.
"U.S. Appl. No. 15/859,216, Examiner Interview Summary dated Apr. 6, 2021", 2 pgs.
"U.S. Appl. No. 15/859,208, Final Office Action dated Apr. 7, 2021", 15 pgs.
Brickell, "Enhanced Privacy ID: A Direct Anonymous Attestation Scheme with Enhanced Revocation Capabilities", IEEE Transactions on Dependable and Secure Computing, vol. 9, No. 3, (May Jun. 2012), 345-360.
Lei, Zhang, "MEDAPs: secure multi-entities delegated authentication protocols for mobile cloud computing", Security and Communication Networks, (May 12, 2016).
Puri, Deepak, "IoT Security: Intel EPID Simplifies Authentication of IoT Devices", Network World, (Sep. 21, 2016), 1-10.
Rakesh, Gopinath Nirmala, "Improving the Security and Efficiency of Blockchain-based Cryptocurrencies", KTH Royal Institute of Technology, School of Electrical Engineering, Master's Thesis, (Jun. 30, 2017).
Ruan, Xiaoyu, "Privacy at the Next Level: Intel's Enhanced Privacy Identification (EPID)Technology", Springer Link, (Aug. 9, 2014), 1-32.
Steven, Goldfeder, "Securing Bitcoin wallets via a new DSA ECDSA threshold signature scheme", [Online]. Retrieved from the Internet: https: www.semanticscholar.org paper Securing-Bitcoin-wallets-via-a-new-DSA-%2F-ECDSA-Goldfeder-Narayanan 8b9b7e1fb101a899b0309ec508ac5912787cc12d, (Jun. 2015), 27 pgs.
U.S. Appl. No. 15/859,211, filed Dec. 29, 2017, Securing Electronic Wallet Transactions.
U.S. Appl. No. 15/859,212, filed Dec. 29, 2017, Approving Transactions From Electronic Wallet Shares.
U.S. Appl. No. 15/859,208, filed Dec. 29, 2017, Securing Distributed Electronic Wallet Shares.
U.S. Appl. No. 15/859,216, filed Dec. 29, 2017, Tracking an Electronic Wallet Using Radio Frequency Identification (RFID).
"U.S. Appl. No. 15/859,208, Notice of Allowance dated Jul. 2, 2021", 15 pgs.
"U.S. Appl. No. 15/859,208, Notice of Allowance dated Oct. 5, 2021", 11 pgs.
"U.S. Appl. No. 15/859,208, Response filed Jun. 4, 2021 to Final Office Action dated Apr. 7, 2021", 9 pgs.
"U.S. Appl. No. 15/859,212, Advisory Action dated Jun. 29, 2021", 4 pgs.
"U.S. Appl. No. 15/859,212, Response filed Jun. 14, 2021 to Final Office Action dated Mar. 12, 2021", 13 pgs.
"U.S. Appl. No. 15/859,212, Response filed Jul. 12, 2021 to Advisory Action dated Jun. 29, 2021", 13 pgs.
Gallagher, Sean, "With deletion of one wallet, $280M in Ethereum wallets get frozen," www.arstechnica.com, USA, last accessed May 15, 2018, 10 pages. https://arstechnica.com/information-technology/2017/11/with-deletion-of-one-wallet-280-m-in-ethereum-wallets-gets-frozen/.
Heilman et al., TubleBit: An Untrusted Bitcoin-Compatible Anonymous Payment Hub, Full version last updated on Tuly 31, 2017 from paper first posted online on Jun. 3, 2016, USA, 36 pages.
Lerner, Sergio Demian, RSK White Paper Overview, Nov. 19, 2015, Argentina, , last accessed May 16, 2018, 23 pages. https://uploads.strikinglycdn.com/files/ec5278f8-218c-407a-af3c-ab71a910246d/RSK%20White%20Paper%20-%20Overview.pdf.
Pentland et al., "Towards an Internet of Trusted Data: A New Framework for Identity and Data Sharing," MIT Connection Science, Aug. 2016, USA, 19 pages.
Smith, Ned, "Gateways: The Center of Complexity for Update," Open IoT Summit Oct. 2016, USA, 16 pages.

(56) References Cited

OTHER PUBLICATIONS

Sovrin Foundation, "Sovrin: A Protocol and Token for Self-Sovereign Identity and Decentralized Trust," Version 1, Jan. 2018, last accessed May 16, 2018, USA, 42 pages. https://sovrin.org/wp-content/uploads/2018/03/Sovrin-Protocol-and-Token-White-Paper.pdf.
Sovrin, "Sovrin Provisional Trust Framework," Jun. 28, 2017, USA, 30 pages.
Tobin et al., The Inevitable Rise of Self-Sovereign Identity, Sovrin, first release Sep. 29, 2016, updated Mar. 28, 2017, USA, 24 pages.
Trezor Blog, Trezor, Bitcoin Security Beyond Bitcoin, Trezor Blog, Nov. 22, 2016, Czech Republic, 10 pages.
Van Wirdum, Aaron, Mimblewimble: How a Stripped-Down Version of Bitcoin Could Improve Privacy, Fungibility and Scalability All al Once, Bitcoin Magazine, Aug. 12, 2016, last accessed May 15, 2018, USA, 8 pages. https://bitcoinmagazine.com/articles/mimblewimble-how-a-stripped-down-version-of-bitcoin-could-improve-privacy-fungibility-and-scalability-all-at-once-1471038001/.
Everyday Crypto; "#025—Blocksize, SegWit, and Censorship," (https://www.youtube.com/watch?v=KaH5w8dZPpo&feature=youtu.be), Published on Feb. 2, 2017; Date viewed May 16, 2018.

* cited by examiner

800

2600

2700

2800

US 11,386,420 B2

CONTEXTUAL AUTHENTICATION OF AN ELECTRONIC WALLET

TECHNICAL FIELD

The present techniques relate generally to Internet of Things (IoT) devices. More specifically the present techniques relate to electronic wallets.

BACKGROUND

It has been estimated that the internet of things (IoT) may bring Internet connectivity to more than 15 billion devices by 2020. For organizations, IoT devices may provide opportunities for monitoring, tracking, or controlling other devices and items, including further IoT devices, other home and industrial devices, items in manufacturing and food production chains, and the like. The emergence of IoT networks has served as a catalyst for profound change in the evolution of the Internet. In the future, the Internet is likely to evolve from a primarily human-oriented utility to an infrastructure where humans may eventually be minority actors in an interconnected world of devices.

Crypto-currencies, such as bitcoin, among others, may be used to pay for transactions, for example, in IoT networks and by IoT devices, among others. The transaction may include goods, services, and data services, such data transfers across networks, applications for additional functionality, and the like. Further, personal devices may be used to allow an owner of the device to pay for goods and services at point-of-sale terminals. The use of crypto-currency in devices, for example, having constraints on memory and processing power, may lead to security issues, including losing balances to hackers. Challenges exist in enabling reliable, secure, and identifiable devices that can form networks as needed to accomplish tasks.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EXAMPLES

Figure 1:
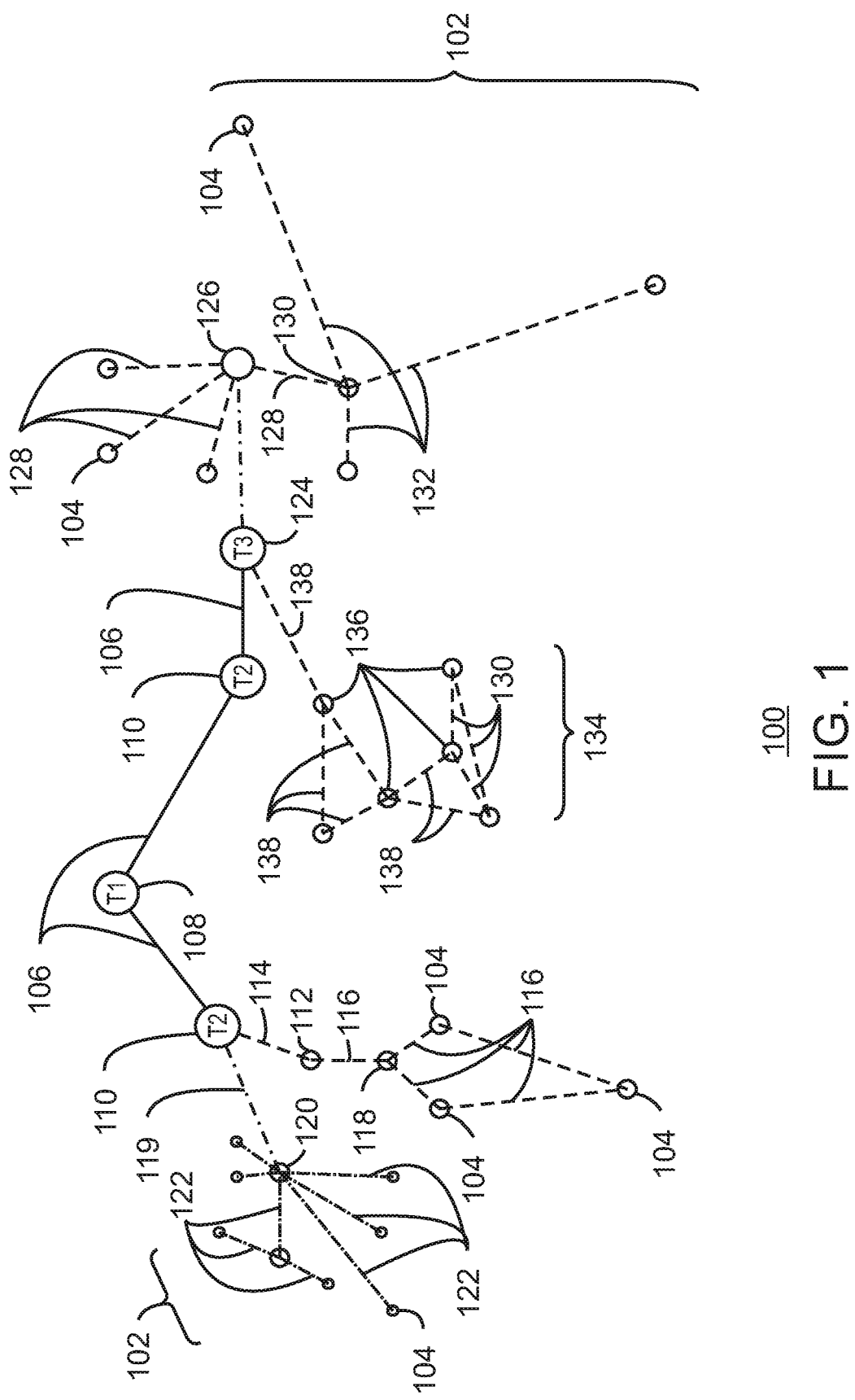
FIG. 1 is a drawing of interconnections that may be present in the Internet in accordance with some examples.

The internet of things (IoT) is a system in which a large number of computing devices are interconnected to each other and to a communications network (e.g., the Internet) to provide a functionality, such as data acquisition and actuation, at very low levels in networks. As used herein, low level means that devices may be located at or near the edges of networks, such as the last devices before the end of a network. As used herein, an IoT device may include a device performing a function, such as sensing or control, among others, in communication with other IoT devices and a communications network. The IoT device may include an autonomous device or a semiautonomous configured to performed one or more functions. Often, IoT devices can be constrained in memory, size, or functionality, allowing larger numbers to be deployed for a similar cost to a smaller number of larger devices. However, an IoT device may be a smart phone, laptop, tablet, PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home devices, such as water distribution systems, electric power distribution systems, pipeline control systems, plant control systems, light switches, thermostats, locks, cameras, alarms, motion sensors, and the like. The IoT devices may be accessible through a controller, such as computers, servers, and other systems, for example, to control systems or access data. The controller and the IoT devices can be remotely located from one another.

The Internet can be configured to provide communications to a large number of IoT devices. Accordingly, as described herein, a number of innovations for the future Internet are designed to address the need for network layers, from central servers, through gateways, down to edge devices, to grow unhindered, to discover and make accessible connected resources, and to support the ability to hide and compartmentalize connected resources. Any number of network protocols and communications standards may be used, wherein each protocol and standard is designed to address specific objectives.

Payment for goods and services, whether in automated networks over the Internet or in physical operations by users, may be facilitated by electronic wallets (e-wallets). E-wallets may hold balances in a number of forms including electronic currency based on blockchain technology, such as bitcoin, among others. However, securing the balances in e-wallets from theft by hackers, loss due to a lost physical device or from programmatic or logical errors.

Systems and methods described herein provide electronic wallets (e-wallets) that may be implemented on constrained devices while providing security from balance loss. For example, multiple encryption techniques may be used to secure transactions, such as using a hardware backed crypto multi-lock. The crypto multi-lock may be based on either a single device or in a dynamic array of e-wallets. The multiply encrypted e-wallets may be built on top of existing multi signature methods for address generation and transaction unlocking.

There are a number of concepts that may be used to implement a multi-signature concept. For example, multiple-encryption is the concept of using two or more independent keys to encrypt data multiple times. For example, tunneling using Transport Layer Security (TLS) over TLS, Internet Protocol Security (IPSEC) over IPSEC or TLS over IPSEC. The IEEE802.1X standard, for example, defines Extensible Authentication Protocol (EAP) methods such as EAP-TTLS where TLS is tunneled over TLS. Another multi-encryption method may use multiple message encryption, such as RFC7515 Java Script Object Notation (JSON)

Object Signing and Encryption (JOSE) and RFC8152 Concise Binary Object Representation (CBOR) Object Signing and Encryption COSE, where a message may be encrypted multiple times using independent keys. For example, msg1 wrapped by COSE which is further wrapped by COSE, or combinations of COSE and JOSE, or where message encryption is delivered via an encrypted channel, for example, msg1 wrapped by COSE which is wrapped by TLS.

Multi-signature is another concept that may be used independently of multi-encryption or in concert with it. In some examples, multi-encryption methods may define authentication schemes that use signing as well as encryption, therefore a multi-encryption scheme is also a multi-signature scheme.

The crypto multi-lock is a concept where a transaction to be committed to a blockchain chain is signed by more than one private key, in effect layering the transaction with multiple keys which are stored in different locations by a distributed wallet. All of the keys may be regenerated on demand, after each transaction, or if hardware based, may be based on a pool of millions of keys which are expired after a single transaction. The contents of the transaction must be unlocked, or decrypted in the correct order using the corresponding public keys.

Further, the e-wallets and communication protocols for IoT devices are part of the fabric supporting human accessible services that operate regardless of location, time or space. The innovations include transactions, securing of e-wallets, service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity including a combination of wired and wireless technologies as depicted in FIGS. 1 and 2.

Figure 2:
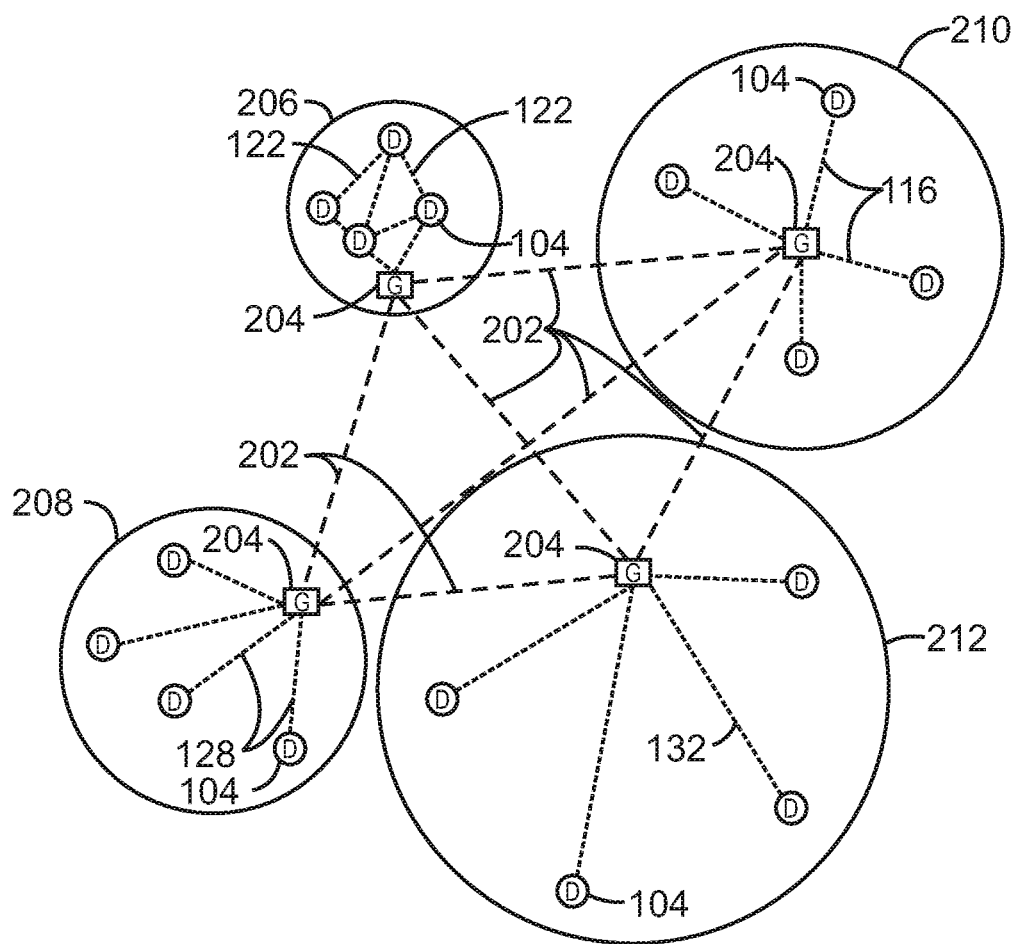
FIG. 2 is a drawing of a network topology for a number of internet-of-things (IoT) networks coupled through backbone links to gateways in accordance with some examples.

FIG. 1 is a drawing of interconnections that may be present between the Internet 100 and IoT networks in accordance with some examples. The interconnections may couple smaller networks 102, down to the individual IoT device 104, to the backbone 106 of the Internet 100. To simplify the drawing, not every device 104, or other object, is labeled.

In FIG. 1, top-level providers, which may be termed tier 1 ("T1") providers 108, are coupled by the backbone 106 of the Internet to other providers, such as secondary or tier 2 ("T2") providers 110. In some examples, the backbone 106 can include optical fiber links. In one example, a T2 provider 110 may couple to a tower 112 of an LTE cellular network, for example, by further links, by microwave communications 114, or by other communications technologies. The tower 112 may couple to a mesh network including IoT devices 104 through an LTE communication link 116, for example, through a central node 118. The communications between the individual IoT devices 104 may also be based on LTE communication links 116.

In another example, a high-speed uplink 119 may couple a T2 provider 110 to a gateway 120. A number of IoT devices 104 may communicate with the gateway 120, and with each other through the gateway 120, for example, over Bluetooth low energy (BLE) links 122.

The backbone 106 may couple lower levels of service providers to the Internet, such as tier 3 ("T3") providers 124. A T3 provider 124 may be considered a general Internet service provider (ISP), for example, purchasing access to the backbone 106 from a T2 provider 110 and providing access to a corporate gateway 126 and other customers.

From the corporate gateway 126, a wireless local area network (WLAN) can be used to communicate with IoT devices 104 through Wi-Fi® links 128. A Wi-Fi link 128 may also be used to couple to a low power wide area (LPWA) gateway 130, which can communicate with IoT devices 104 over LPWA links 132, for example, compatible with the LoRaWan specification promulgated by the LoRa alliance.

The T3 provider 124 may also provide access to a mesh network 134 through a coordinator device 136 that communicates with the T3 provider 124 using any number of communications links, such as an LTE cellular link, an LPWA link, or a link 138 based on the IEEE 802.15.4 standard, such as Zigbee®. Other coordinator devices 136 may provide a chain of links that forms cluster tree of linked devices.

In some examples, one or more IoT devices 104 include the appropriate transceiver for the communications with other devices. Further, one or more IoT devices 104 may include other radio, optical, or acoustic transceivers, as well as wired network interfaces, for communications using additional protocols and frequencies. In some examples, one or more of the IoT devices 104 includes components described for providing and securing e-wallets, as described herein.

In some examples, electronic wallets (e-wallets) are held in encrypted files in corporate networks, accessible through a corporate gateway 126. As used herein, e-wallets are encrypted files that may be used to hold e-cash, such as bitcoin or other types of blockchain managed credits. In some embodiments, the e-cash may take the form of links to credit or bank accounts. The electronic wallets may be provided by systems within a corporate network, and may reside in IoT networks. E-wallets may be used to conduct transactions either automatically, for example, from IoT units or networks, or manually, such as from devices in the possession of a user. The e-wallets may be distributed, with shares located on different devices, and may be secured as described herein. In some examples, a single transaction may be partially funded by a number of e-wallet shares. In other examples, a single transaction may be authorized by any single e-wallet share in the distributed e-wallet.

The technologies and networks may enable the growth of devices and networks. As the technologies grow, the network may be developed for payments and other transactions, self-management, functional evolution, or collaboration, without needing direct human intervention. Thus, the technologies may enable networks to function without centralized controlled systems. The technologies described herein may automate the network management and operation functions beyond current capabilities. Further, the approaches may provide the flexibility to have a centralized control operating without human intervention, a centralized control that is automated, or any combinations thereof.

FIG. 2 is a drawing of a network topology 200 that may be used for a number of internet-of-things (IoT) networks coupled through backbone links 202 to gateways 204 in accordance with some examples. Like numbered items are as described with respect to FIG. 1. Further, to simplify the drawing, not every device 104, or communications link 116, 122, 128, or 132 is labeled. The backbone links 202 may include any number of wired or wireless technologies, and may be part of a local area network (LAN), a wide area network (WAN), or the Internet.

Although the typologies in FIG. 2 are hub-and-spoke and the typologies in FIG. 1 are peer-to-peer, it may be observed that these are not in conflict, but that peer-peer nodes may behave as hub-and-spoke through gateways. It may also be observed in FIG. 2 that a sub-net topology may have multiple gateways, rendering it a hybrid topology rather than a purely hub-and-spoke topology rather than a strictly hub-and-spoke topology.

The network topology 200 may include any number of types of IoT networks, such as a mesh network 206 using Bluetooth Low Energy (BLE) links 122. In some examples, each of the individual IoT devices 104, in the mesh network 206 or in other networks 208, 210, and 212, may hold a portion of an e-wallet. This may be used in concert with the portions held by other individual IoT devices 104 in the network to perform transactions. The transactions may be in cooperation with other IoT networks, or cloud networks. These other IoT networks that include a WLAN network 208, a cellular network 210, and an LPWA network 212. Each of these IoT networks 206, 208, 210, and 212 may provide opportunities for new developments in the use of electronic wallets, as described herein.

For example, communications between IoT devices 104, such as over the backbone links 202, may be protected by a decentralized system for authentication, authorization, and accounting (AAA). In a decentralized AAA system, distributed payment, credit, audit, authorization, brokering, arbitration, and authentication systems may be implemented across interconnected heterogeneous infrastructure. This allows systems and networks to move towards autonomous operations.

In some examples, IoT devices 104, or other portable devices, such as devices carried by a user, may hold all or a portion of an e-wallet. The e-wallet may be encrypted and store a credit balance, for example, as a bit coin or other blockchain based electronic currency. However, many of the techniques described herein may hold other types of credit, including, for example, links to a credit account, bank account, and the like. The credit balance may be used for paying funds for transactions from the device, for example, using authentication keys, context, and other techniques described herein.

Using e-wallets, IoT devices 104 may pay for services, contracts, communications, and the like. Further the IoT devices 104 may include portable devices carried by a user, such as a mobile phone, to pay for transactions remotely or at a point of purchase.

The IoT networks may be further enhanced by the integration of sensing technologies, such as sound, light, electronic traffic, facial and pattern recognition, smell, vibration, into the autonomous organizations. The integration of sensory systems may allow systematic and autonomous communication and coordination of service delivery against contractual service objectives, orchestration and quality of service (QoS) based swarming and fusion of resources. For example, location, facial and other biometric recognition, context, and the like, may be used to secure an e-wallet as described herein.

The mesh network 206 may be enhanced by systems that perform inline data-to-information transforms. For example, self-forming chains of processing resources comprising a multi-link network may distribute the transformation of raw data to information in an efficient manner. This may allow such functionality as a first stage performing a first numerical operation, before passing the result to another stage, the next stage then performing another numerical operation, and passing that result on to another stage. For example, multiple encryption stages may improve the security of e-wallets.

Communications in the cellular network 210 may be enhanced by systems that offload data, extend communications to more remote devices, or both. The LPWA network 212 may include systems that perform non-Internet protocol (IP) to IP interconnections, addressing, and routing. This may allow the sending of e-wallet transactions across multiple networks, for example from the LPWA network 212 to a corporate payment system located in the WLAN network 208.

Figure 3:
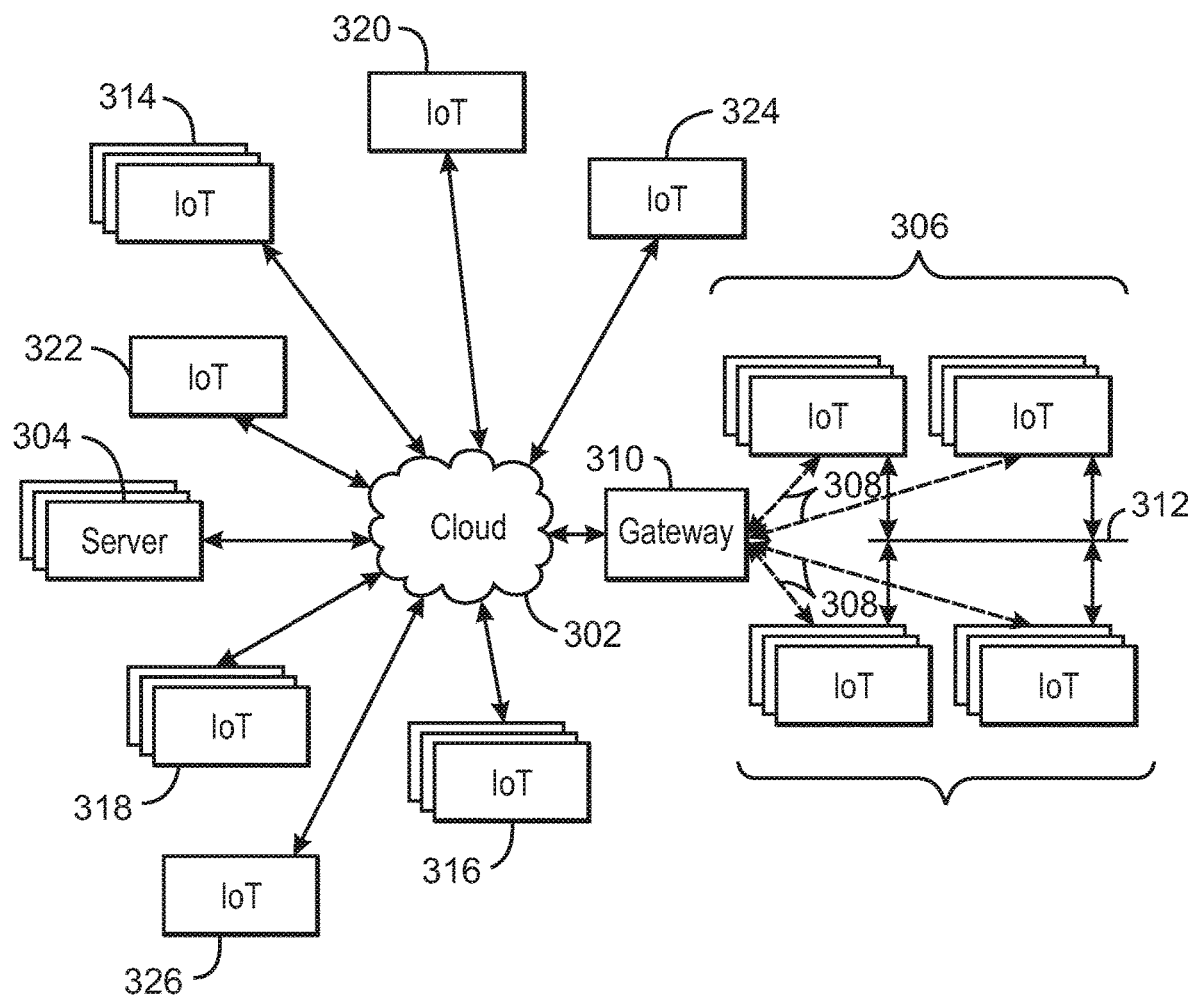
FIG. 3 is a drawing of a cloud computing network, or cloud, in communication with a number of IoT devices in accordance with some examples.

FIG. 3 is a drawing of a cloud computing network, or cloud 302, in communication with a number of Internet of Things (IoT) devices in accordance with some examples. The cloud 302 may represent the Internet, or may be a local area network (LAN), or a wide area network (WAN), such as a proprietary network for a company. The IoT devices may include any number of different types of devices, grouped in various combinations. For example, a traffic control group 306 may include IoT devices along streets in a city. These IoT devices may include parking meters, stoplights, traffic flow monitors, cameras, weather sensors, and the like. The traffic control group 306, or other sub-groups, may be in communication with the cloud 302 through wireless links 308, such as LPWA links, and the like. Further, a wired or wireless sub-network 312 may allow the IoT devices to communicate with each other, such as through a local area network, a wireless local area network, and the like. The IoT devices may use another device, such as a gateway 310 to communicate with the cloud 302.

Other groups of IoT devices may include remote weather stations 314, local information terminals 316, user carried devices 318, automated teller machines 320, alarm panels 322, or moving vehicles, such as emergency vehicles 324 or other vehicles 326, among many others. Each of these IoT devices may be in communication with other IoT devices, with servers 304, or both.

As can be seen from FIG. 3, a large number of IoT devices may be communicating through the cloud 302. This may allow different IoT devices to request or provide information to other devices autonomously. For example, the traffic control group 306 may request a current weather forecast from a group of remote weather stations 314, which may provide the forecast without human intervention. The traffic control group 306 may include a distributed e-wallet, in which shares of the e-wallet are held by a number of the IoT devices in the traffic control group 306. For example, the funds from the distributed e-wallet may be used to pay for the current weather forecast from the remote weather stations 314 automatically.

As another example, the traffic control group 306 may include parking meters along a street. The parking meters may accept payment from e-wallets in user carried devices 318. The parking meters may also be instructed by the traffic control group 306 not to allow parking along the street, for example, if a weather forecast from the remote weather stations 314 indicates that a snowstorm is imminent.

Clusters of IoT devices, such as the remote weather stations 314 or the traffic control group 306, may be equipped to communicate with other IoT devices as well as with the cloud 302. This may allow the IoT devices to form an ad-hoc network between the devices, allowing them to function as a single device, which may be termed a fog device. The shared e-wallet may be used to compensate remote devices for participating in the fog device. The fog device is discussed further with respect to FIG. 4.

Figure 4:
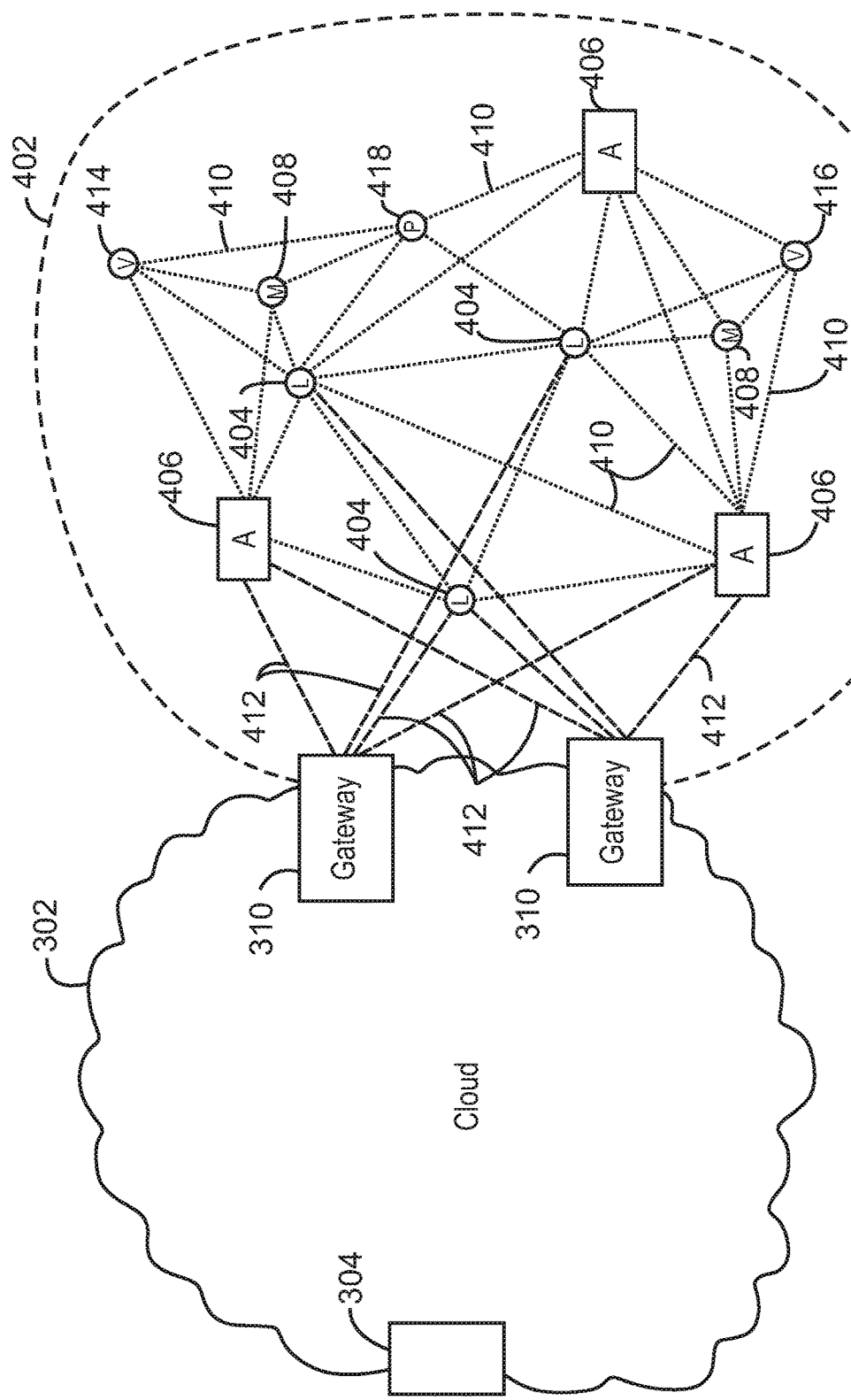
FIG. 4 is a drawing of a cloud computing network, or cloud, in communication with a mesh network of IoT devices, which may be termed a fog device, operating at the edge of the cloud in accordance with some examples.

FIG. 4 is a drawing 400 of a cloud computing network, or cloud 302, in communication with a mesh network of IoT devices, which may be termed a fog device 402, operating at the edge of the cloud 302 in accordance with some examples. Like numbered items are as described with respect to FIG. 3. As used herein, a fog device 402 is a cluster of devices that may be grouped to perform a specific function, such as traffic control, weather control, plant control, and the like.

In this example, the fog device 402 includes a group of IoT devices at a traffic intersection and along a street. The fog device 402 may be established in accordance with specifications released by the OpenFog Consortium (OFC), among others. These specifications allow the formation of a hierarchy of computing elements between the gateways 310 coupling the fog device 402 to the cloud 302 and to endpoint devices, such as traffic lights 404 and data aggregators 406 in this example. The fog device 402 can leverage the combined processing and network resources that the collective of IoT devices provides. Accordingly, a fog device 402 may be used for any number of applications including, for example, financial modeling, weather forecasting, traffic analyses, and the like.

For example, traffic flow through the intersection may be controlled by traffic lights 404, such as the three traffic lights 404 in this example. Analysis of the traffic flow and control schemes may be implemented by aggregators 406 that are in communication with the traffic lights 404 and each other through a mesh network. Parking, for example, near the intersection, may be controlled by parking meters 408.

Data may be uploaded to the cloud 302, and commands received from the cloud 302, through gateways 310 that are in communication with the traffic lights 404 and the aggregators 406 through the mesh network.

Any number of communications links may be used in the fog device 402. Shorter-range links 410, for example, compatible with IEEE 802.15.4 may provide local communications between IoT devices that are proximate to the intersection. Longer-range links 412, for example, compatible with LPWA standards, may provide communications between the IoT devices and the gateways 310. To simplify the diagram, not every communication link 410 or 412 is labeled with a reference number.

The fog device 402 may be considered to be a massively interconnected network wherein a number of IoT devices are in communications with each other, for example, by the communication links 408 and 410. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection and interoperability protocols may also be used, including, for example, the Open Platform Communications (OPC) Unified Architecture released in 2008 by the OPC Foundation, the AllJoyn protocol from the AllSeen alliance, the optimized link state routing (OLSR) Protocol, or the better approach to mobile ad-hoc networking (B.A.T.M.A.N.), among many others.

Communications from one IoT device may be passed along the most convenient path to reach the gateways 310, for example, the path having the fewest number of intermediate hops, or the highest bandwidth, among others. In these networks, the number of interconnections provide substantial redundancy, allowing communications to be maintained, even with the loss of a number of IoT devices.

The fog device 402 may include temporary IoT devices. In other words, not all of the IoT devices may be permanent members of the fog device 402. For example, in the exemplary system 400, three transient IoT devices have joined the fog device 402, a first vehicle 414, a second vehicle 416, and a pedestrian 418. In these cases, the IoT device may be built into the vehicles 414 and 416, or may be an app on a smart phone carried by the pedestrian 418. Other IoT devices may also be present, such as IoT devices in bicycle computers, motorcycle computers, drones, and the like.

The fog device 402 formed from the IoT devices may be presented to clients in the cloud 302, such as the cloud server 304, as a single device, or server, located at the edge of the cloud 302. As used herein, a server may be any individual device, virtual device, or cloud device, that provides information, control, provisioning, or other services to other devices. In this example, the control communications to specific resources in the fog device 402 may occur without identifying any specific IoT device within the fog device 402, which may be acting as a fog server. Further, the cloud server 304 may be a specific device, a virtualized device, or another fog device.

Accordingly, if one IoT device within the fog device 402 fails, other IoT devices in the fog device 402, acting as fog server nodes, may be able to discover and control a resource, such as an actuator, or other device attached to an IoT device. For example, the traffic lights 404 may be wired so as to allow any one of the traffic lights 404 to control lights for the other traffic lights 404. The aggregators 406 may also provide redundancy in the control of the traffic lights 404 and other functions of the fog device 402, for example, acting as local fog servers.

The parking meters 408 may collect parking fees, for example, from a vehicle 416 parked near the meter. The vehicle 416 may have an associated e-wallet that holds a balance for paying the fees. In some example, a device, such as a mobile phone, carried by the driver may have an e-wallet to pay the fees. The fees may be transferred to an e-wallet controlled by the fog device 402, for example, in a distributed e-wallet, as described herein. The e-wallet may be controlled by one class of device, such as the aggregators 406, acting as a fog server node, or may be distributed across all permanently installed parts of the fog device 402, such as the aggregators 406, the lights 404, the gateways 310, the parking meters 408, and the like. Temporary participants, such as the vehicles 414 and 416, and the pedestrian 418, may not control a share for security purposes.

The balance of the e-wallet associated with the fog device 402 may be regularly transferred to the cloud server 304 through the cloud 302. In some examples, a portion of the balance may be retained in the e-wallet associated with the fog device 402 to pay for expenses, such as data connection costs, and services, such as weather forecasts and maintenance.

In some examples, the IoT devices may be configured using an imperative programming style, e.g., with each IoT device having a specific function and communication partners. However, the IoT devices forming the fog device 402 may be configured in a declarative programming style, allowing the IoT devices to reconfigure their operations and communications, such as to determine needed resources in response to conditions, queries, and device failures. This may be performed as transient IoT devices, such as the pedestrian 418, join the fog device 402.

As the pedestrian 418 is likely to travel more slowly than the vehicles 414 and 416, the fog device 402 may reconfigure itself to ensure that the pedestrian 418 has sufficient time to make it through the intersection. This may be performed by forming a temporary group of the vehicles 414 and 416 and the pedestrian 418 to control the traffic lights 404. If one or both of the vehicles 414 or 416 are autonomous, the temporary group may instruct the vehicles to slow down prior to the traffic lights 404. Further, if all of the vehicles at the intersection are autonomous, the need for traffic signals may be diminished since autonomous vehicles' collision avoidance systems may allow for highly inter-leaved traffic patterns that may be too complex for traffic lights to manage. However, traffic lights 404 may still be important for the pedestrian 418, cyclists, or non-autonomous vehicles.

As the transient devices 414, 416, and 418, leave the vicinity of the intersection the fog device 402, the fog device 402 may reconfigure itself to eliminate those IoT devices from the network. As other transient IoT devices approach the intersection, the fog device 402 may reconfigure itself to include those devices.

The fog device 402 may include the traffic lights 404 for a number of intersections, such as along a street, along with all of the transient IoT devices along the street. The fog device 402 may then divide itself into functional units, such as the traffic lights 404 and other IoT devices proximate to a single intersection. This type of combination may enable the formation of larger IoT constructs, e.g., groups of IoT devices that perform a particular function, in the fog device 402. Further, if a weather forecast indicates bad conditions along the entire section of street, the fog device 402 may prevent any parking along any section of the street, for example, by instructing the parking meters 408 to not accept payment from an e-wallet held by a user. The parking meters 408 may provide a visual indication that parking is not allowed, for example, flashing a red light on the parking meters 408 in place of a display.

For example, if an emergency vehicle joins the fog device 402, an emergency construct, or virtual device, may be created that includes all of the traffic lights 404 for the street, allowing control of the traffic flow patterns for the entire street. The emergency construct may instruct the traffic lights 404 along the street to stay red for opposing traffic and green for the emergency vehicle, expediting the passage of the emergency vehicle.

As illustrated by the fog device 402, the organic evolution of IoT networks is central to improving or maximizing the utility, availability and resiliency of IoT implementations. Further, the example indicates the usefulness of strategies for improving trust and therefore security, such as of e-wallets. The local identification of devices may be important in implementations, as the decentralization of identity ensures a central authority cannot be exploited to allow impersonation of objects that may exist within the IoT networks. Further, local identification lowers communication overhead and latency.

Blockchains may be used to decentralize identification as they may provide agreement between devices regarding names and identities that are in current use. As used herein, a blockchain is a distributed database of identity records, and other transaction records, that is made up of data structure blocks. Further, as used herein, the term blockchain may include any one or more of other distributed ledger systems. Other distributed ledger approaches include Ethereum, Ripple, Hyperledger, Multichain, Keyless Signature Infrastructure, and the like. Each data structure block is based on a transaction, where a payment transaction, the issuance of a new name to a device, the formation of a composite device, or the formation of a virtual device is one example of a transaction.

Using blockchains for identification, impersonation may be detected by observing re-issuance of names and identities without a corresponding termination. Public blockchains may be most useful, as they can enable a diverse community of observers to detect misnaming, malicious naming, or failure of a naming infrastructure. Thus, trustworthy identity infrastructure may be central to trusting IoT networks. In some examples, the blockchains may be used for securing e-wallets and providing transactions from e-wallet's, as described herein.

As the participation of devices containing e-wallets in the network may be public, encryption schemes that provide improved security may protect against theft or loss of credentials due to compromised systems. This may be performed, for example, by a multiple encryption scheme, as described with respect to FIGS. 5 and 6.

Networks of devices for initiating and processing transactions, as described herein, may be provided in a multi-access edge computing (MEC) environment. Multi-access edge computing (MEC), also referred to as mobile edge computing, may offer application developers and content providers cloud-computing capabilities and an information technology service environment at the edge of a network. An MEC system may include an MEC orchestrator, and an MEC platform manager, which manage the provision of a service to a user equipment (UE) device, such as a device hosting an e-wallet or e-wallet share, by a service provider, through one or more access points, or one or more MEC hosts.

The MEC environment may be part of a radio access network (RAN) that has been opened to third party providers, such as clearing houses for blockchain transactions. The RAN may provide a high bandwidth, low latency system that allows fog devices 402 to function more efficiently with applications and services in the cloud 302. Accordingly, MEC 302 may be seen as a cloud or fog server running at the edge of a mobile network and performing tasks that may not be achieved with traditional network infrastructure. Machine-to-Machine gateway and control functions, such as the IoT device examples described with respect to FIGS. 3 and 4, are one example, e-wallet and purchasing systems are another. In an MEC network, processing power, such as servers, are moved closer to the edge of networks. For example, the aggregators 406 located within the fog device 402.

Examples described herein may use an MEC apparatus that may collect one or more local cost measurements to measure a local cost from a first entity to a second entity along a path from a service provider to the device to provide the service to the device. A local cost measurement from a first entity to a second entity may represent a latency, a financial cost, or a QoS, from the first entity to the second entity. In view of the one or more local cost measurements, a cost for a MEC host to provide the service or a cost for the service provider to provide the service may be calculated.

A service may be allocated to a MEC host based on an allocation policy related to a cost for the MEC host to provide the service or a cost for the service provider to provide the service. For example, the cost of processing a transaction for a user device, or transferring data to an fog device 402, may be charged to an e-cash balance in an e-wallet. Accordingly, the processing cost may be a determining factor in selecting a clearing entity or blockchain. Further, the latency of clearing a transaction may affect a user experience in purchasing goods or services, or may affect the response time of an automated system, such as charges to users e-wallets for the parking meters 408 or responses from weather stations 314 for the fog device 402.

Figure 5:
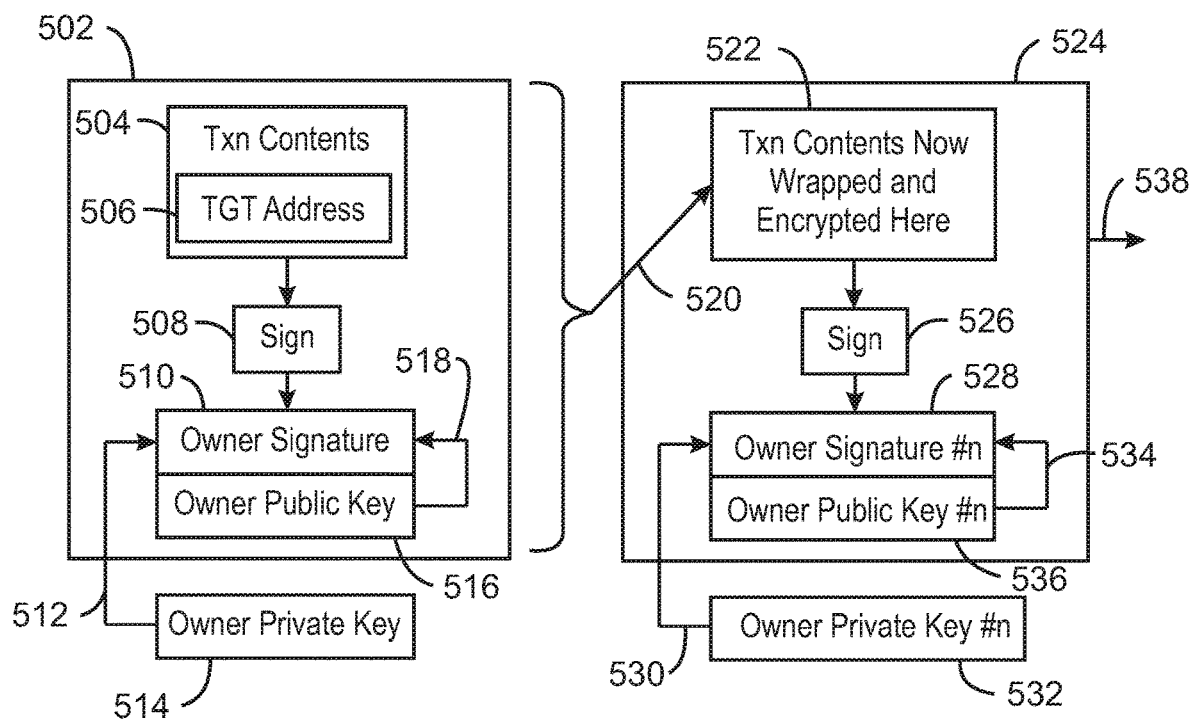
FIG. 5 is a schematic diagram of a crypto multi-lock process 500, in accordance with some examples.

FIG. 5 is a schematic diagram of a crypto multi-lock process 500, in accordance with some examples. In a transaction 502, transaction contents 504 that include, for example, an amount of funds for the transaction and a target address 506 to which the funds are being sent, are signed 508. The signature 510 may include a hash code of the transaction contents 504 that is encrypted 512 using an owners private key 514. The owner's public key 516 may be used to verify 518 the signature 510 on the transaction 502 before the transaction is committed to a blockchain. The transaction 502 may be prepared in an edge device, such as a smart phone, before being sent on to a cloud server for processing.

In the techniques described herein, the transaction 502 is not directly committed to the blockchain. Instead, the transaction 502 may be encrypted 520 again, and the encrypted contents 522 of the transaction 502 may be wrapped in a succeeding transaction 524. The succeeding transaction 524 may be prepared in another edge device, in a gateway or fog server, or in a server located in a cloud. The key for the first transaction 502 may be provided over an MEC network to the processing entity, while the key used for the encryption 520 of the succeeding transaction 524 may be provided over a secondary network, such as a Wi-Fi network, or through other techniques, that make it harder to intercept.

In the succeeding transaction 524, as in the initial transaction 502, the encrypted contents 522 may be signed 526. The signature 528 may be generated by encrypting 530 a hash of the encrypted contents 522 using a succeeding private key 532. The signature 528 may be verified 534 by using a succeeding public key 536 to confirm that the encrypted hash matches the hash of the encrypted contents 522. The multiply encrypted contents of the succeeding transaction 524 may then be committed 538 to a blockchain. The private keys, such as used for the encryption 520 of the initial transaction 502, and the signature 528 of the succeeding transaction 524 may then be transmitted to the receiver of the transaction.

The crypto multi-lock process 500 is not limited to two encryptions, but may be continued any number of times (n) before committing the encrypted transaction to the blockchain. The network consensus protocol, for example used to decode the transactions, may be configured to interpret the crypto multi-lock process 500 and continue to decode the transaction until it gets to the original transaction and destination address. Depending on the purpose of the transactions, the private keys may be communicated prior to the transaction and held by the receiving party, stored in an appropriate location accessible only by the decoding protocol, provided as one-time keys to be used and discarded after the transaction, and the like.

Figure 6:
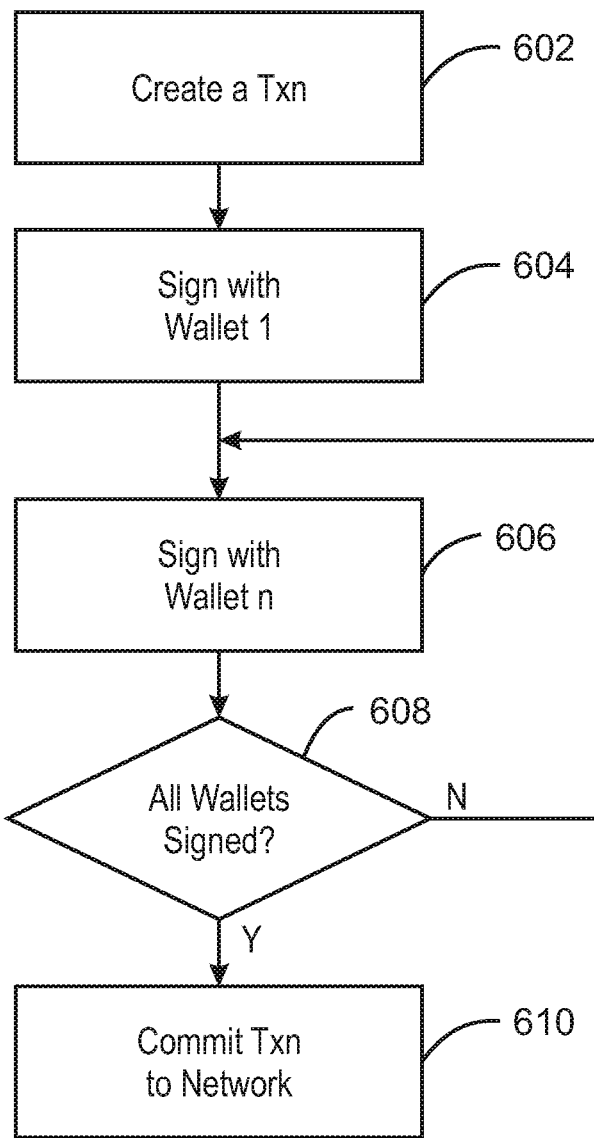
FIG. 6 is a process flow diagram of a method 600 for implementing a crypto-multilock process, in accordance with some examples.

FIG. 6 is a process flow diagram of a method 600 for implementing a crypto-multilock process, in accordance with some examples. As used herein, crypto-multilock to be any process that uses multi-encryption or multiple signatures or combinations thereof, and a policy for testing expected use or application of a crypto-multilock scheme. The method 600 may begin at block 602, when a transaction is created. At block 604, the transaction may be signed using a private key associated with the e-wallet. At block 606, subsequent transactions may be encrypted and signed with further private keys associated with the e-wallet. At block 608, a determination is made as to whether all e-wallets have signed. If not, process flow returns to block 606 for encryption and signing with the next e-wallet. If all wallets have signed at block 608, at block 610 the transaction is committed to the blockchain on the network.

The techniques are not limited to a single e-wallet that is multiply encrypted. For example, the e-wallet may be distributed across a number of devices. A distributed e-wallet may have a single address, or UUID, but does not necessarily reside in a single location. Thus, the e-wallets may ultimately represent one identity on the decentralized network, but the individual e-wallet instances may run in separate processes, may be backed by a combination of software and hardware that generates keys, or key pools, for example, running on different physical machines. Distributed e-wallets could use any number of key generation techniques, such as shared secrets, EPID keys, seed trees, and the like.

The distributed e-wallet may not be a fixed structure but may include temporal e-wallets that are created from a trusted enclave for the duration of a single transaction before being removed. This approach may further lower the probability that an attacker may compromise the keys and obtain access to the funds. For example, an e-wallet that is always in existence may provide a static target for an attacker. Generally, an e-wallet which is running continually in a process, for example, on a certain place or machine allows an attacker time to compromise the security of the system A temporal distributed e-wallet may have source or binary code running in an encrypted, secure enclave. The e-wallet may have a small footprint and may be instantiated rapidly. The secure enclave may be a trusted execute environment (TEE), for example, established using technologies such as Intel TXT and Intel SGX. Using these technologies, the authenticity of the temporal e-wallet may be established as it is instantiated. As the e-wallet only exists for as long as it needed to sign a transaction, it may be quickly deleted removing it as a target for an attacker. As result, an attacker may not be able to directly attack the e-wallet, but must focus an attack on compromising the hardware backed secure enclave where the source or binary code resides. The enclave may additionally be encrypted as an additional barrier to attack. This enclave may additionally be encrypted as an additional barrier to attack. The increase in security provided by the TEE may be used to provide distributed e-wallets as a cloud or fog based service, or through a public, private, or subscription-based application programming interface (API).

Figure 7:
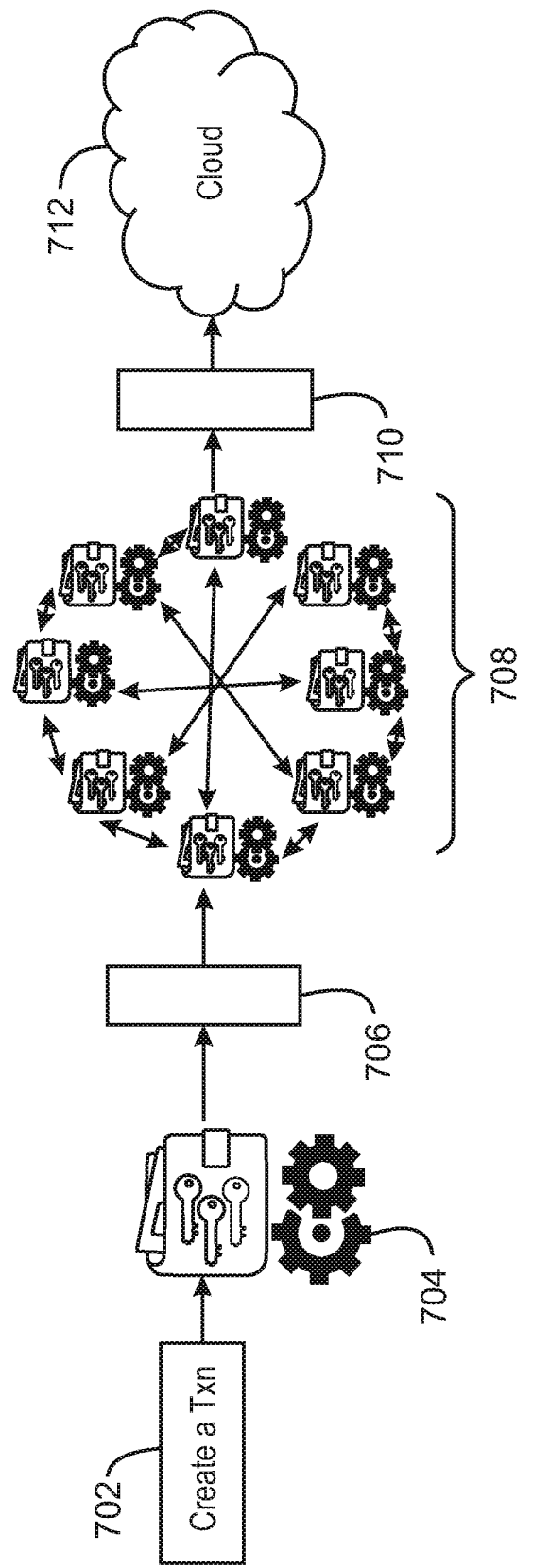
FIG. 7 is a schematic diagram of a distributed wallet as a service, in accordance with some examples.

FIG. 7 is a schematic diagram of a distributed wallet as a service 700, in accordance with some examples. While this does introduce another party, for example, the trusted authority that is hosting the service, it may allow individuals with limited resources to obtain a higher level of security on transactions that are of high value. The actor committing the transaction may have a ruleset or policy that determines which transactions to commit directly to a blockchain chain with a traditional level of security provided by a private key, and which to route through a distributed wallet provider. For example, the individual may desire that a transaction above a set spending limit, such as about $50, about $100, or at any limits set by the user, should be automatically provided to the web farm for further encryption.

In the service 700, a transaction may be created 702, for example, in an edge device such as a smartphone. The transaction may be signed with a local wallet 704, for example, using a private key held in the local wallet 704. The transaction may then be sent 706, such as through an API, to a public cloud over a router or load balancer. In some examples, the router may be referred to as a bridge or gateway, where message syntax may be translated to a second syntax, but where semantics are preserved. For example, a gateway may transfer communications from a first network in an OCF syntax to a second network using LWM2M or ALJOYN syntax, while also translating the communications. Further, the router may be an MEC server used to provide services for an MEC network.

The transaction may be provided to a web farm 708 of temporal distributed e-wallets, having full keys, partial keys, distributed keys, or any combinations thereof. The web farm 708 may be a networked group of cloud devices, which may be physical devices or virtual devices. If the transaction meets the rules for further encryption using the web farm 708, or the further encryption is requested by the user, the transaction may be encrypted using some combination of the keys from the temporal distributed e-wallets. The web farm 708 may have multiple connections 710 to a mining network to determine and obtain unique keys, for example, which may be used in a single transaction before being discarded. After encryption, the transaction may be committed 712 to a blockchain, for example, residing in a cloud.

In some examples, the web farm 708 may use a private blockchain for enhance security. A private blockchain may be an embodiment of a distributed e-wallet provider where each blockchain miner tracks an identity of an e-wallet and synchronizes transactions using a proof-of-work function that verifies the e-wallet provider's identity and authorization.

Furthermore, an e-wallet signing key may be constructed by an e-wallet application using a Merkle-Lamport signing key, for example, where each e-wallets' private signing key may be generated by computing about 256 pairs of random numbers that are each about 256-bits in length. The public key may include about 512 hashes computed by hashing each of the 512 random numbers. Each e-wallet shares its public key with every other e-wallet in the distributed e-wallet scheme.

An efficient public key sharing method may be achieved using entropy multiplexing where common 256-bit seed may be shared with each e-wallet at the creation of the e-wallet. Each e-wallet may be personalized by generating a universally unique identifier (UUID) for the e-wallet. The UUID for each e-wallet may also the shared with every other e-wallet. The objective is to link the user authentication context to the wallet contexts, but also result in e-wallets having a secure channel or key from which to protect, or crypto-multi-protect, wallet data. A signed Diffie-Hellman protocol such as Sigma or a secure password based key agreement protocol such as ESPEKE (elliptic-curve simple password exponential key exchange) may be used to establish secure sessions to distribute the seed and UUID values. As used herein, SPEKE is part of a family of techniques termed PAKE (Password Authentication Key Exchange). There are many variants, include J-PAKE, SPEKE, ESPEKE, and the like. When each e-wallet generates Merkle-Lamport private keys, a hash of the seed and UUID is used to seed a pseudorandom number generator (PRNG) that generates the private keys.

Users of e-cash systems built around blockchain technology, such as Bitcoin, may be at significant risk of loss from the e-wallets used by both seller and buyer during the transaction clearing period. Further risk occurs when e-cash is contained in the e-wallet, due to the possibility of the e-wallet key becoming corrupted, lost or stolen. Risk in more traditional forms of currency, commodities, stocks or other financial exchanges, may be mitigated through the use of compensating transactions, for example, insurance. A compensating transaction is a transaction that remunerates the buyer or seller or both if for some reason the transaction, or collection of transactions, results in losses to parties at risk. In a compensating transaction, an insurer, which is the entity supplying the compensating transactions, is rewarded with a transaction fee to accept the risk of the compensating transaction.

In a blockchain-based electronic currency there is no central authority that manages valuation of transactions or ensures remuneration is paid by insurers. In the techniques described herein, a method is provided for risks to the buyer and the seller risk to be offset by an insurer using blockchains. The system allows both buyer and seller to purchase insurance for a pending transaction, and for insurers to be reimbursed for a transaction fee if a buyer and/or a seller accepts the terms of the insurance. The blockchain also holds a payout transaction that remunerates buyer or seller or both should the terms of the claim be met, for example, similar to an escrow transaction.

Figure 8:
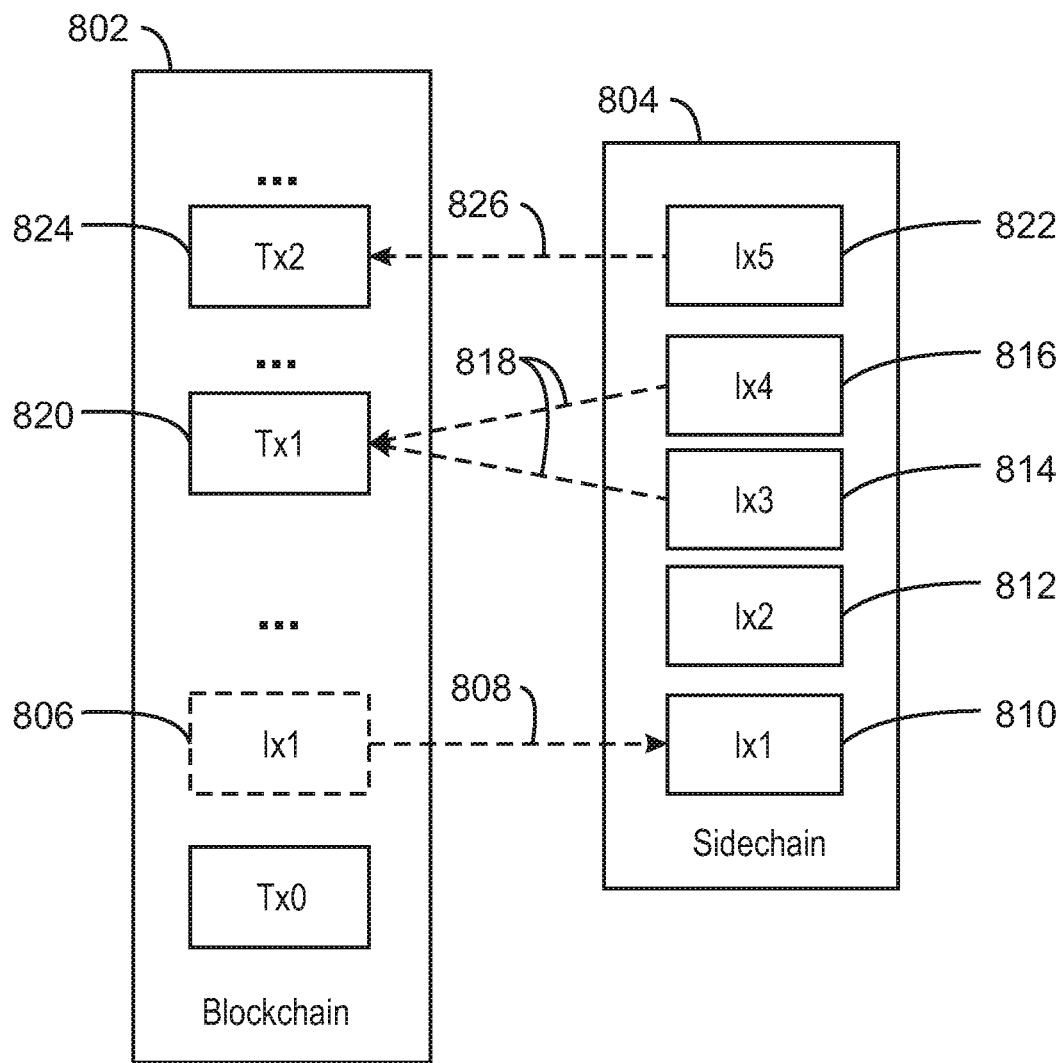
FIG. 8 is a schematic diagram of the use of compensating transactions using a blockchain, in accordance with some examples.

FIG. 8 is a schematic diagram of the use of compensating transactions 800 using a blockchain 802, in accordance with some examples. To implement the compensating transactions 800, a sidechain 804, for example, located on an MEC server, may be used to track the contracts used for the compensating transactions 800. In the blockchain 802, an initial insurance transaction 806 is posted to request insurance on a transaction. The initial insurance transaction 806 is recognized, for example, by miners, and posted 808 to the sidechain 804 as an initial transaction 810. The initial transaction 810 on the sidechain 804 constitutes an offer to buy insurance from a seller or buyer. The insures may monitor the sidechain 804, for example, using miners residing on the MEX server. A second transaction, Ix2, 812 may be posted to the sidechain 804 in response to the initial transaction 810 to reflect an open offer to buy insurance from a buyer or seller.

If an insurer accepts the contract, a third transaction, Ix3, 814 may be posted to the sidechain 804 to indicate that an insurer has accepted the seller's or buyer's contract. A fourth transaction, Ix4, 816 may be posted to the sidechain 804 to indicate that an insurer has accepted the buyer's or seller's contract. Both the third transaction 814 and the fourth transaction 816 indicate that the insurance is in effect 818 for the transaction 820 backed by the insurance policy.

If the funds represented by the transaction 820 are lost, for example, due to theft, loss of decrypting credentials, fraud, and the like, a claim 822 against the policy may be posted as a fifth transaction, Ix5, on the sidechain 804. In response to the claim 822, a compensating transaction 824 may be posted 826 to the blockchain 802.

Figure 9:
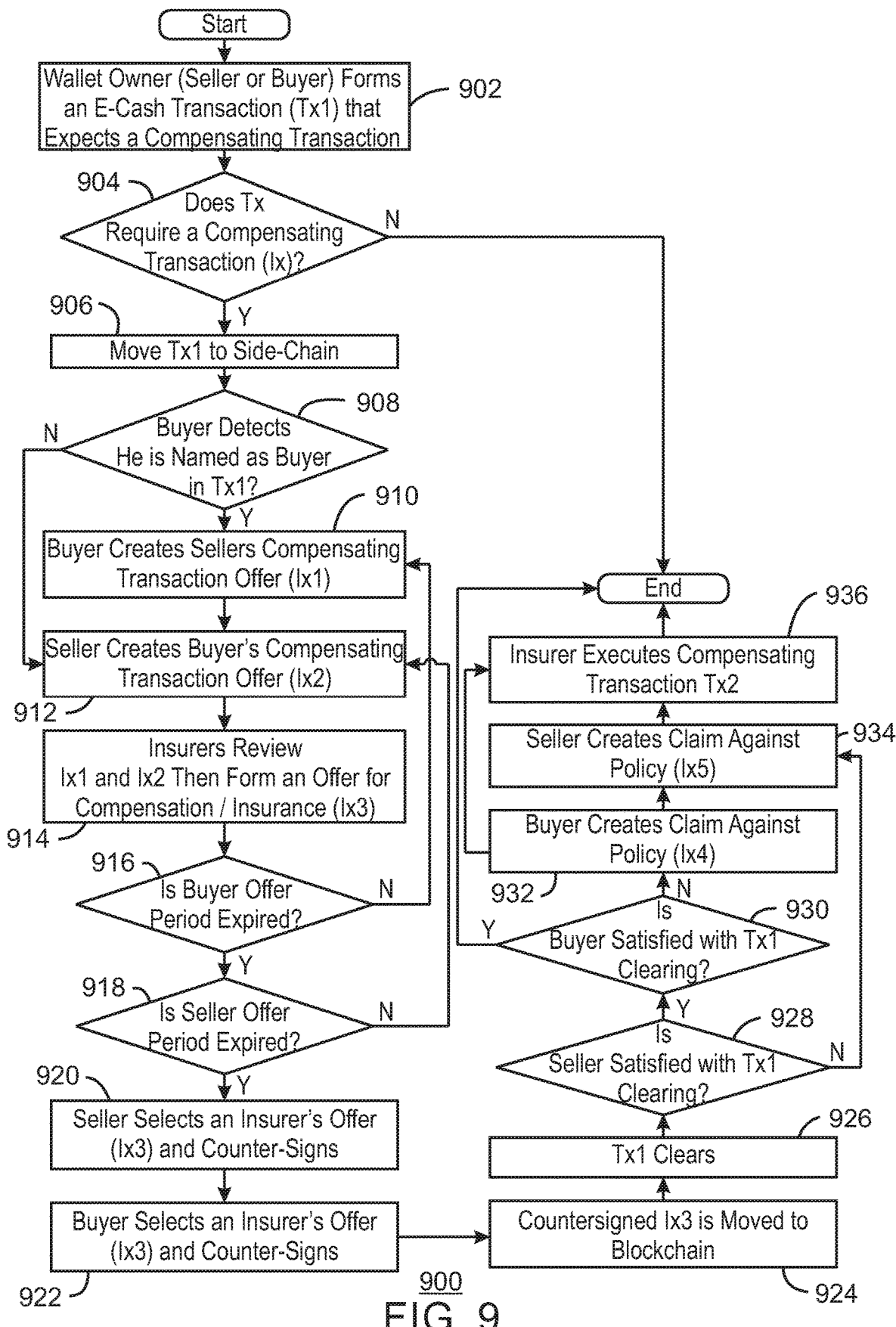
FIG. 9 is a process flow diagram of a method for using compensating transactions using a blockchain, in accordance with some examples

FIG. 9 is a process flow diagram of a method 900 for using compensating transactions using a blockchain, in accordance with some examples. The method 900 begins at block 902, when a wallet owner, such as a seller or buyer, forms an e-cash transaction (Tx1), for which the wallet owner expects a compensating transaction if the e-cash transaction is lost. At block 904 a determination is made as to whether the transaction requires a compensating transaction. If so block 906 the transaction is moved to a sidechain.

At block 908 a determination is made as to whether a buyer has detected that the buyer is named as the buyer in the transaction. If so, at block 910 the buyer creates a seller's compensating transaction offer (Ix1). If not, at block 912, the seller creates the buyer's compensating transaction offer (Ix2). At block 914, insurers, in the form of sidechain miners, review the compensating transaction offers (Ix1 and Ix2) and form an offer for providing compensation or insurance.

At block 916, a determination is made as to whether the buyer's offer period has expired. If not, process flow returns to block 910. At block 918, a determination is made as to whether the seller's offer period has expired. If not, process flow returns to block 912. At block 920, a seller selects an insurer's offer (Ix3) and countersigns, for example, using a key for an e-wallet, to accept the contract. At block 922, a buyer an insurer's offer (Ix3) and counter signs to accept the contract.

At block 924, the countersigned offer (Ix3) is moved to the blockchain. At block 926, the transaction (Tx1) is cleared. At block 928, a determination is made as to whether the seller is satisfied with the transaction clearing. If so, at block 930 a determination is made as to whether the buyer is satisfied with the transaction clearing. If so, the method 900 ends.

If at block 930 a determination is made that the buyer is not satisfied with the transaction clearing, process flow proceeds to block 932, at which the buyer creates a claim against the policy (Ix4). If at block 928 a determination is made that the seller is not satisfied with the transaction clearing, process flow proceeds to block 934, at which the seller creates a claim against the policy (Ix5). At block 936, the insurer executes the compensating transaction (Tx2), for example, after confirming that the transaction (Tx1) was lost, fraudulent, or did not clear.

Figure 10:
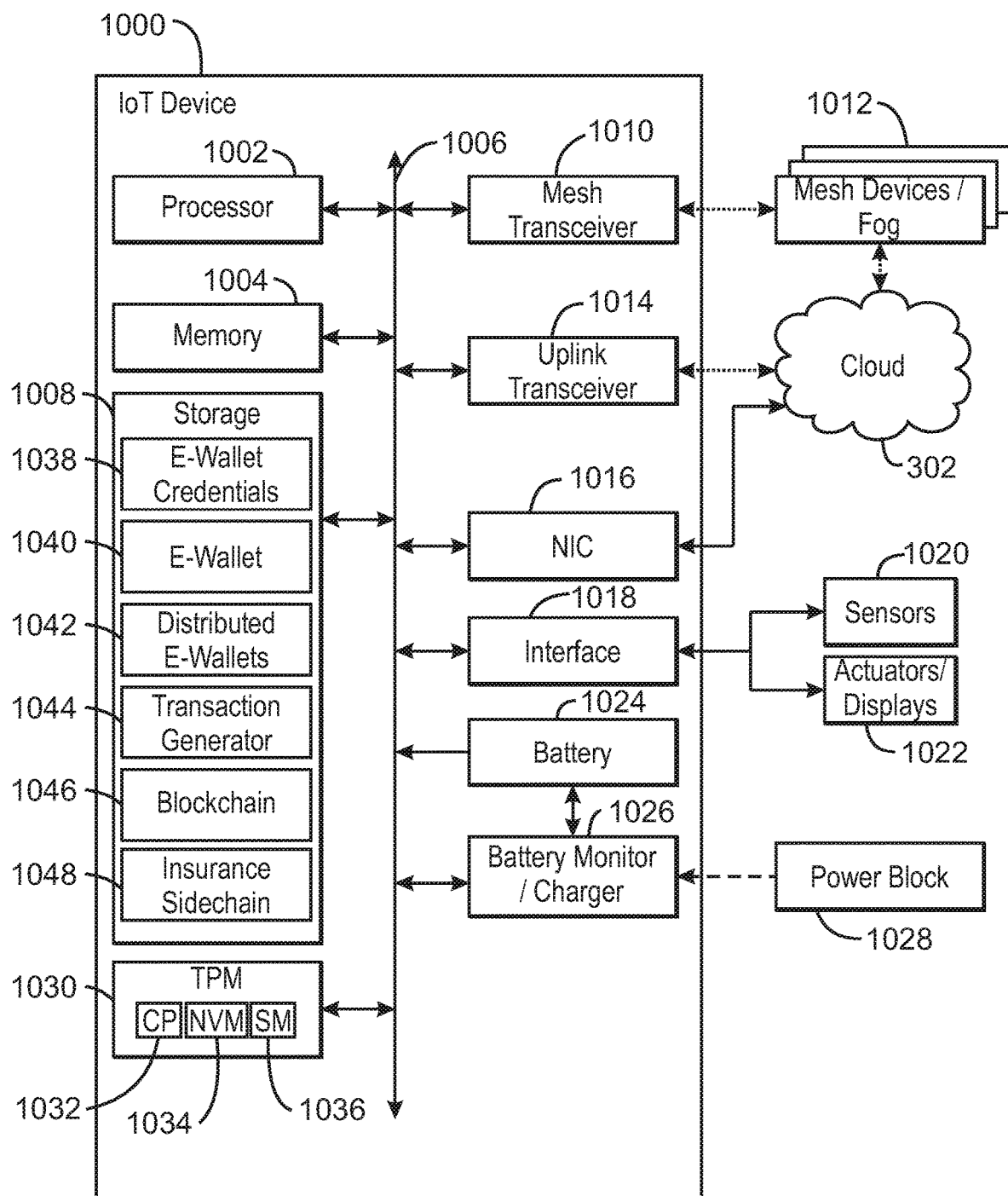
FIG. 10 is a block diagram of an example of components that may be present in an IoT device for implementing an e-wallet, in accordance with some examples.

FIG. 10 is a block diagram of an example of components that may be present in an IoT device 1000 for implementing an e-wallet, in accordance with some examples. The IoT device 1000 may include any combinations of the components shown in the example. The components may be implemented as ICs, portions thereof, discrete electronic devices, or other modules, logic, hardware, software, firmware, or a combination thereof adapted in the IoT device 1000, or as components otherwise incorporated within a chassis of a larger system. The block diagram of FIG. 10 is intended to show a high-level view of components of the IoT device 1000. However, some of the components shown may be omitted, additional components may be present, and different arrangement of the components shown may occur in other implementations.

The IoT device 1000 may include a processor 1002, which may be a microprocessor, a multi-core processor, a multithreaded processor, an ultra-low voltage processor, an embedded processor, or other known processing element. The processor 1002 may be a part of a system on a chip (SoC) in which the processor 1002 and other components are formed into a single integrated circuit, or a single package, such as the Edison™ or Galileo™ SoC boards from Intel. As an example, the processor 1002 may include an Intel® Architecture Core™ based processor, such as a Quark™, an Atom™, an i3, an i5, an i7, a Xeon®, a Xeon Phi™ co-processor, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

The processor 1002 may communicate with a system memory 1004 over a bus 1006. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or Mini-DIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 1008 may also be coupled to the processor 1002 via the bus 1006. To enable a thinner and lighter system design, the mass storage 1008 may be implemented via a solid-state drive (SSD). Other devices that may be used for the mass storage 1008 include flash memory cards, such as SD cards, microSD cards, xD picture cards, and the like, and USB flash drives.

In low power implementations, the mass storage 1008 may be on-die memory or registers associated with the processor 1002. However, in some examples, the mass storage 1008 may be implemented using a micro hard disk drive (HDD). Further, any number of new technologies may be used for the mass storage 1008 in addition to, or instead of, the technologies described, such resistance change memories, phase change memories, holographic memories, or chemical memories, among others. For example, the IoT device 1000 may incorporate the 3D XPOINT memories from Intel® and Micron®.

The components may communicate over the bus 1006. The bus 1006 may include any number of technologies, including industry standard architecture (ISA), extended ISA (EISA), peripheral component interconnect (PCI), peripheral component interconnect extended (PCIx), PCI express (PCIe), or any number of other technologies. The bus 1006 may be a proprietary bus, for example, used in a SoC based system. Other bus systems may be included, such as an I²C interface, I³C interface, an SPI interface, point to point interfaces, and a power bus, among others.

The bus 1006 may couple the processor 1002 to a mesh transceiver 1010, for communications with other mesh devices 1012. The mesh transceiver 1010 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1012. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The mesh transceiver 1010 may communicate using multiple standards or radios for communications at different range. For example, the IoT device 1000 may communicate with geographically proximate devices, e.g., within about 10 meters, using a local transceiver based on BLE, or another low power radio, to save power. More distant mesh devices 1012, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The mesh transceiver 1010 may be incorporated into an MCU as an address directly accessible by the chip, such as in the Curie® units available from Intel.

An uplink transceiver 1014 may be included to communicate with devices in the cloud 302. The uplink transceiver 1014 may be LPWA transceiver that follows the IEEE 802.15.4, IEEE 802.15.4g, IEEE 802.15.4e, IEEE 802.15.4k, or NB-IoT standards, among others. The IoT device 1000 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, Weightless-P from the Weightless Special Interest Group, Random Phase Multiple Access (RPMA®) from Ingenu, and other technologies. Further, other communications techniques, such as time-slotted channel hopping, described in the IEEE 802.15.4e specification may be used.

Any number of other radio communications and protocols may be used in addition to the systems mentioned for the mesh transceiver 1010 and uplink transceiver 1014, as described herein. For example, the radio transceivers 1010 and 1014 may include an LTE or other cellular transceiver that uses spread spectrum (SPA/SAS) communications for implementing high-speed communications, such as for video transfers. Further, any number of other protocols may be used, such as Wi-Fi® networks for medium speed communications, such as still pictures, sensor readings, and provision of network communications.

The radio transceivers 1010 and 1014 may include radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), or Narrow Band IoT (NB-IoT), among others. It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High-speed Packet Access), HSDPA (High-Speed Downlink Packet Access), HSUPA (High-Speed Uplink Packet Access), HSPA+(High-speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver 1014, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

The transceivers 1010 and 1014 may be used to provide communications between the IoT device 1000 and an MEC network. The MEC network may efficiently provide the e-wallet services described herein, such as the processing of transactions, the clearing of transaction, maintenance of the blockchain, multiple encryption service, and compensating transactions, among many others, as described herein.

A network interface controller (NIC) 1016 may be included to provide a wired communication to the cloud 302 or to other devices, such as the mesh devices 1012. The wired communication may provide an Ethernet connection, or may be based on other types of networks, such as Controller Area Network (CAN), Local Interconnect Network (LIN), DeviceNet, ControlNet, Data Highway+, EtherCAT, SERCOS, PROFIBUS, PROFINET RT, or PROFINET IRT, among many others. An additional NIC 1016 may be included to allow connect to a second network, for example, a NIC 1016 providing communications to the cloud over Ethernet, and a second NIC 1016 providing communications to other devices over another type of network.

The bus 1006 may couple the processor 1002 to an interface 1018 that is used to connect external devices. The external devices may include sensors 1020, such as accelerometers, level sensors, flow sensors, temperature sensors, pressure sensors, barometric pressure sensors, touch inputs on a touch screen, and the like. The interface 1018 may be used to connect the IoT device 1000 to actuators/displays 1022, such as power switches, valve actuators, an audible sound generator, a visual warning device, a screen or monitor, and the like.

While not shown, various input/output (I/O) devices may be present within, or connected to, the IoT device 1000. For example, a display may be included to show information, such as sensor readings or actuator position. An input device, such as a touch screen or keypad may be included to accept input.

A battery 1024 may power the IoT device 1000, although in examples in which the IoT device 1000 is mounted in a fixed location, it may have a power supply coupled to an electrical grid. The battery 1024 may be a lithium ion battery, a metal-air battery, such as a zinc-air battery, an aluminum-air battery, a lithium-air battery, a hybrid supercapacitor, and the like.

A battery monitor/charger 1026 may be included in the IoT device 1000 to track the state of charge (SoCh) of the battery 1020. The battery monitor/charger 1026 may be used to monitor other parameters of the battery 1024 to provide failure predictions, such as the state of health (SoH) and the state of function (SoF) of the battery 1024. The battery monitor/charger 1026 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1026 may communicate the information on the battery 1024 to the processor 1002 over the bus 1006. The battery monitor/charger 1026 may also include an analog-to-digital (ADC) convertor that allows the processor 1002 to directly monitor the voltage of the battery 1026 or the current flow from the battery 1024. The battery parameters may be used to determine actions that the IoT device 1000 may perform, such as transmission frequency, mesh network operation, sensing frequency, and the like.

A power block 1028, or other power supply coupled to a grid, may be coupled with the battery monitor/charger 1026 to charge the battery 1024. In some examples, the power block 1028 may be replaced with a wireless power receiver to obtain the power wirelessly, for example, through a loop antenna in the IoT device 1000. A wireless battery charging circuit, such as an LTC4020 chip from Linear Technologies of Milpitas, Calif., among others, may be included in the battery monitor/charger 1026. The specific charging circuits chosen may depend on the size of the battery 1024, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others. In some examples, the power block 1028 may be augmented or replaced with solar panels, a wind generator, a water generator, or other natural power systems.

The IoT gateway 1000 may include a trusted platform module (TPM) 1030, for example, compliant with the specification promulgated by the Trusted Computing Group as ISO/IEC 11889 in 2009. The TMP 1030 may include a cryptographic processor (CP) 1032, non-volatile memory (NVM) 1034, and secure memory (SM) 1036. The CP 1032 may provide a random number generator, an RSA hash generator, a SHA-1 hash generator, and an encryption-decryption engine, among others. The NVM 1034 may include keys programed at the time of manufacture that include, for example, an RSA key, among others. The SM 1036 may hold measurements taken on software in platform configuration registers. As used herein, a measurement is a hash code calculated on a code or data segment stored in the storage 1008 or memory 1004. Starting from a measurement of a boot code segment, the measurements may be used to establish a trusted execution environment (TEE), by creating a chain-of-trust from the initial booting, in which the e-wallets may operate. In some examples, the IoT device 1000 may not have a TPM 1030. In these examples, remote devices in communications with the IoT device 1000 may be used to secure transactions, for example, for an e-wallet.

The mass storage 1008 may include a number of modules to implement the e-wallet functions described herein. Although shown as code blocks in the mass storage 1008, it may be understood that any of the modules may be fully or partially replaced with hardwired circuits, for example, built into an application specific integrated circuit (ASIC). The mass storage 1008 may include one or more e-wallet credentials. The e-wallet credentials may include full keys or partial keys for an e-wallet app 1040. The e-wallet app 1040 may provide a user interface for the e-wallet, for example, through the display 1022. It may accept inputs through sensors 1020 associated with a touchscreen display. Further, the e-wallet app 1040 may obtain or generate the keys stored as the e-wallet credentials 1038. It may also determine a level of encryption for transactions, such as sending higher balance transactions, for example, above a user set spending limit, to a web farm of temporal distributed e-wallets for further encryption. The e-wallet app 1040 may generate and provision credentials for multiple distributed e-wallets 1042. The e-wallet app 1040 may monitor the links to distributed wallets, and e-wallet shares, monitor transactions, and hold a balance for the e-wallet, for example, in an electronic currency, including bitcoin among others. In some examples, the e-wallet app 1040 may hold a link to an online banking system or online credit system. The e-wallet app 1040 may belong to an owner or user of the IoT device 1000, or may be one of a number of distributed e-wallets 1042 being tracked by the IoT device 1000. The wallet app 1040 may determine if a transaction may need a compensating transaction in case of loss. The wallet app 1040 may generate and commit a transaction requesting an insurance contract to a blockchain 1046, as described with respect to FIGS. 8 and 9. The compensating transaction may be handled by an insurance sidechain 1048, a copy of which may be held in the IoT device 1000, or in external units.

The sensors 1020 and actuators/display 1022 may include a touchscreen on a mobile device that displays input and output controls for the e-wallet app 1040 to allow entry of transaction data for the e-wallet, control of keys for the e-wallet, and the like. A transaction generator 1044 may be used by the e-wallet at 1040 to generate transactions, such as creating transactions, signing transactions, and sending the transactions to purchase goods or services to an e-cash retailer, an e-wallet existing in another IoT device, a server location, a service provider, or the like. The transaction generator 1044 may perform a multi-encryption process, for example, as described with respect to FIGS. 5 and 6.

A blockchain 1046 may exist in the IoT device 1000, for example, as a copy of a shared blockchain held by a number of IoT devices. The blockchain may be a transactional database that includes blocks of data that have transactions corresponding to transfers of balances from e-wallets, ownership of e-wallets, and the like. The blockchain 1046 may also include authorization information, such as public encryption keys for e-wallets, owners of e-wallets, and other entities such as insurers.

Sharing a copy of the blockchain 1046 with other devices may allow other devices to confirm changes in the blockchain 1046 and flag any attempts to change the blockchain 1046 without proper authorization. For example, confirmation of transactions committed to the blockchain 1046, may provide further security to prevent false transactions on the blockchain 1046. An insurance sidechain 1048 may exist in the IoT device 1000 for accepting and implementing insurance contracts for compensating transactions to be made to the blockchain 1046. As described herein, the confirmation of transactions may be performed by miners that may part of the transaction generator 1044, or located in other devices.

Figure 11:
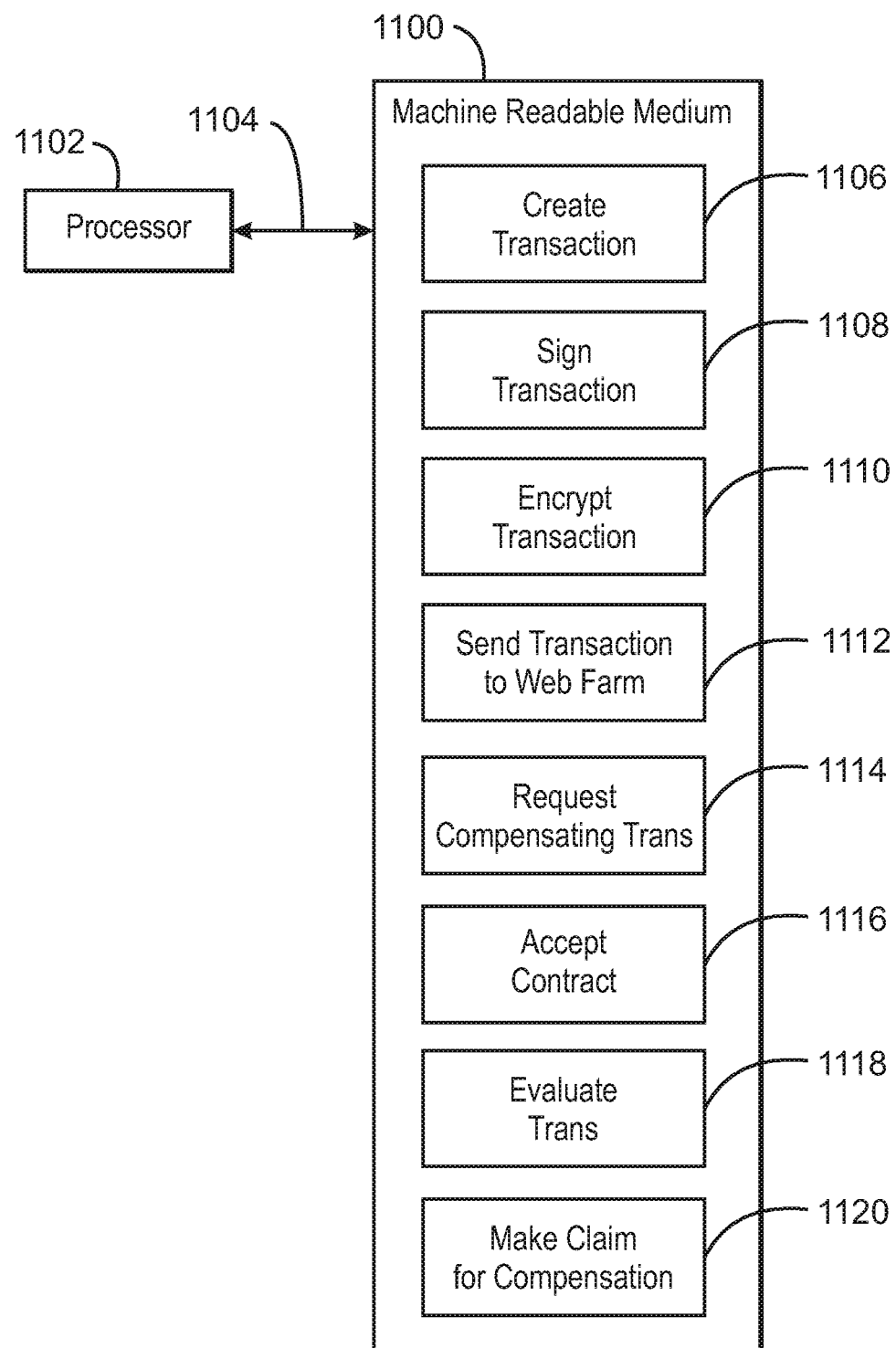
FIG. 11 is a block diagram of a non-transitory, machine readable medium including code that, when executed, directs a processor to implement an e-wallet, in accordance with some examples.

FIG. 11 is a block diagram of a non-transitory, machine readable medium 1100 including code that, when executed, directs a processor 1102 to implement an e-wallet, in accordance with some examples. The processor 1102 may access the non-transitory, machine readable medium 1100 over a bus 1104. The processor 1102 and bus 1104 may be selected as described with respect to the processor 1002 and bus 1006 of FIG. 10. The non-transitory, machine readable medium 1100 may include devices described for the mass storage 1008 of FIG. 10 or may include optical disks, thumb drives, or any number of other hardware devices.

The non-transitory, machine readable medium 1100 may include code 1106 to direct the processor 1102 to create a transaction, for example, as described with respect to FIGS. 5 and 6. Code 1108 may be included to direct the processor 1102 to sign a transaction with one or multiple private keys, as described with respect to FIGS. 5 and 6.

The machine readable medium 1100 may include code 1110 to direct the processor 1102 to encrypt a transaction, once or multiple times, as described with respect to FIGS. 5, 6, and 7. The machine readable medium 1100 may include code 1112 to send a transaction to web farm of temporal distributed wallets, which may use full keys, partial keys, or both to further encrypt the transaction, for example, as described with respect to FIG. 7.

The machine readable medium 1100 may include code 1114 to direct the processor 1102 to request a contract for a compensating transaction from an insurer for a transaction on the blockchain, for example, as described with respect to FIGS. 8 and 9. Code 1016 may be included to direct the processor 1102 to accept a contract from an insurer for a compensating transaction. Code 1118 may be included to direct the processor 1102 to evaluate the transaction for completeness and loss of any funds. Code 1120 may be included to direct the processor 1102 to make a claim for a compensating transaction from the insurer.

A distributed e-wallet is not limited to being used in a web farm, as described herein. A distributed e-wallet architecture may be used to improve a user experience by making multiple copies of the e-wallet, so that if one e-wallet share is destroyed a second e-wallet share may be used to recover the e-wallet contents. As a blockchain trust strategy may use a large number of nodes, for example, 100K-1M or more, the size of the network may make attacking a majority. Generally, e-wallets use a different trust strategy where the user selects hardened hardware technology that resists attacks.

The techniques described herein focus on a trust strategy that uses both hardened hardware technology and distributed computing technology, which may be a blockchain, to distribute e-wallet assets across multiple nodes so that attackers must compromise M of N e-wallet shares. This may be more difficult than compromising a single e-wallet instance.

A central tenant of e-cash systems is that the e-wallet cannot double spend because the blockchain, or clearing service, maintains a log of each e-wallet's balance. In this example, if a user makes a copy of the e-wallet, the balance is available to each copy of the e-wallet. However, should a copy of an e-wallet be stolen and compromised, the attacker may be able to spend the balance as well as the user. Since each copy of the e-wallet has the same private key, when a copy is compromised it becomes a race to spend the balance. Accordingly, further use of the e-wallet should be blocked if a copy is stolen. Techniques described herein allow e-wallet shares to be protected if a share is stolen.

Figure 12:
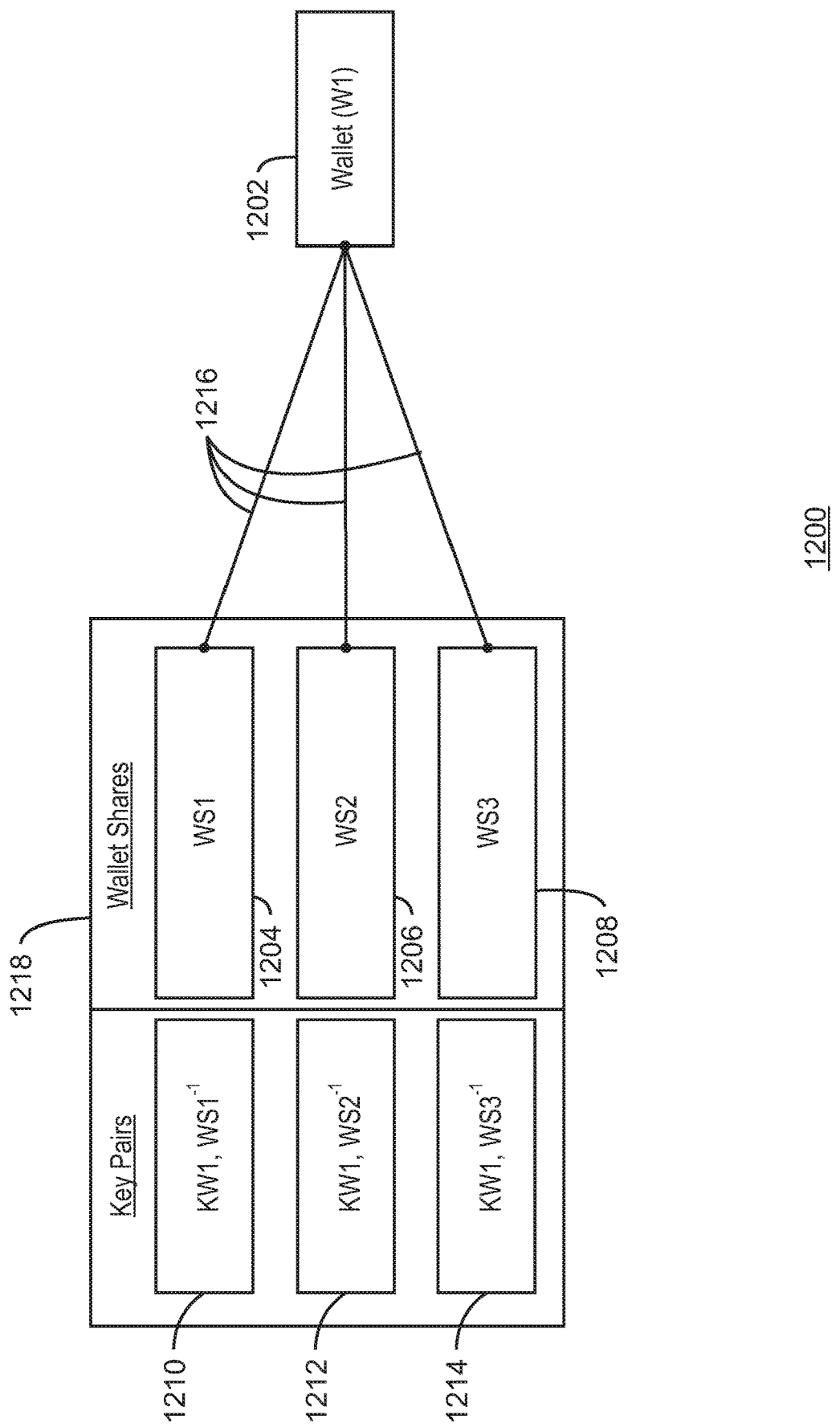
FIG. 12 is a schematic diagram of a process for using enhanced privacy ID (EPID) to provide a distributed wallet key, in accordance with some examples.

FIG. 12 is a schematic diagram of a process 1200 for using enhanced privacy ID (EPID) to provide a distributed wallet key, in accordance with some examples. EPID is an enhancement of the direct attestation algorithm (DAA) that allows attestation of the identity of a device without revealing the identity. It complies with international standards ISO/IEC 20008[2]/20009[3] and the Trusted Computing Group (TCG) TPM 2.0 for authentication.

EPID may be used in the process 1200 for implementing an e-wallet 1202 making up a distributed e-wallet where each e-wallet share 1204, 1206, or 1208 contains a unique private key 1210, 1212, or 1214, respectively. Verification of transactions signed by EPID keys rely on a single public key (Kw1) for the wallet. Hence, regardless of which e-wallet share 1204, 1206, or 1208 signed the transaction the same public key (Kw1) is used to authorize clearing. Clearing the transaction through the blockchain is similar using EPID versus traditional transaction keys.

Each of the e-wallet shares 1204, 1206, and 1208 are joined 1216 to the e-wallet 1202. From the e-wallet 1202, a wallet share manager may be used to manage e-wallet shares 1218, for example, by allowing a user to revoke individual e-wallet shares 1204, 1206, or 1208 without invalidating the e-wallet, or its public key, itself. The user maintains a wallet share manager (WSM) that allows each share device to be provisioned with a private key for the e-wallet on that device. As described herein, the WSM may be an app on a mobile device that provides a touchscreen input for the user. The WSM may use a TEE to also delete the private key as part of decommissioning a wallet share.

The e-wallet 1202 may be an edge device, such as a smart phone, aggregator, or other IoT device. Further, the e-wallet shares 1204, 1206, and 1208 may also be hosted by edge devices, such as car systems, ATMs, fog devices, and the like. In some examples, the e-wallet shares 1204, 1206, and 1208 may be hosted by cloud servers, virtualized cloud servers, and the like.

Figure 13:
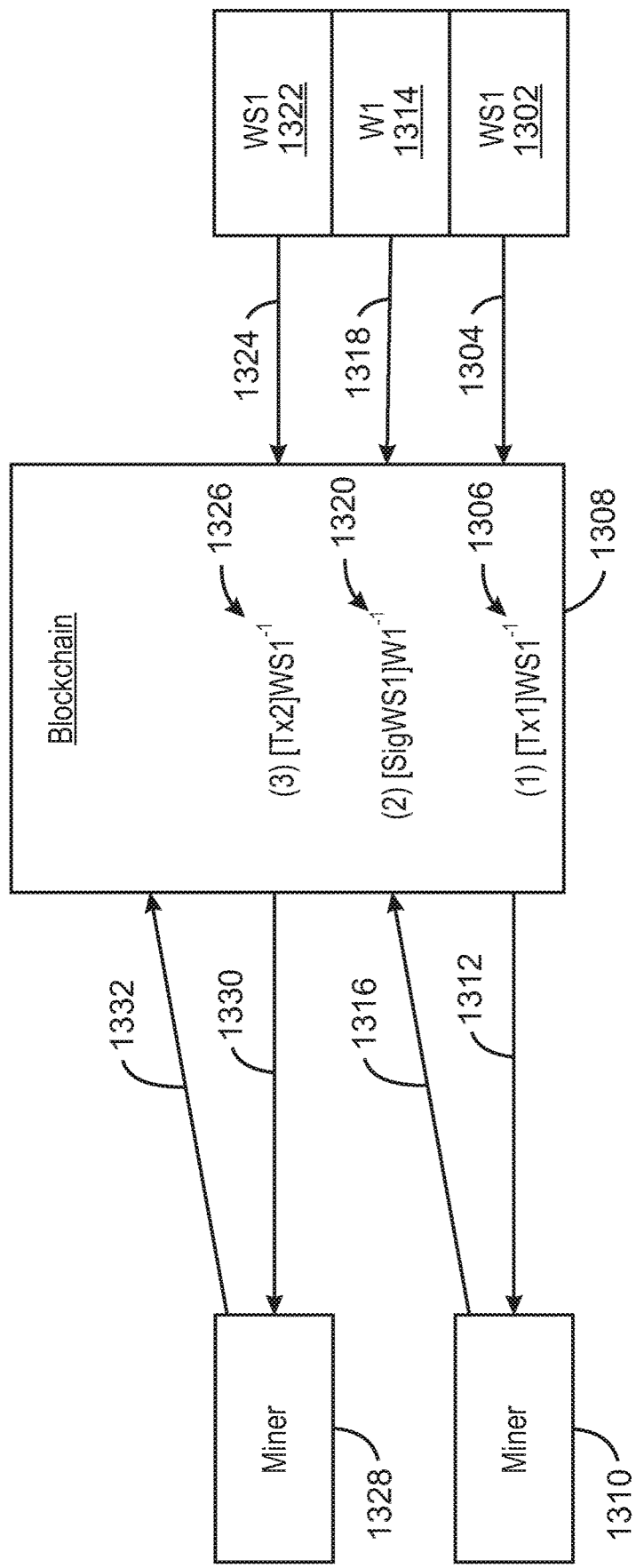
FIG. 13 is a schematic diagram of a distributed wallet transaction including an EPID key, in accordance with some examples.

FIG. 13 is a schematic diagram of a distributed wallet transaction 1300 including an EPID key, in accordance with some examples. To perform a transaction, an e-wallet share (WS1) 1302 may commit 1304 the transaction 1306 to a blockchain 1308. A miner 1310 verifies 1312 the transaction 1306 with the e-wallet 1314, and reports 1316 success by committing a message to the blockchain 1308.

If the e-wallet share (WS1) 1302 is stolen and compromised, the WSM of the owner's e-wallet (W1) 1314 may commit 1318 an EPID signature revocation message 1320 to the blockchain informing it of a revoked e-wallet share (WS1) 1322. If the revoked e-wallet share (WS1) 1322 attempts to commit 1324 another transaction, it must supply a signature list 1326.

If the revoked e-wallet share (WS1) 1322 does not sign the transaction, the transaction is aborted. If the revoked e-wallet (WS1) signs with the signature list 1326, it is detected by a miner 1328 that verifies 1330 the signature with the e-wallet 1312 during transaction clearing. If the miner 1328 determines that the transaction has been committed by a revoked e-wallet share (WS1) 1322, the miner 1328 reports a failure 1332. In the case of a blockchain 1306, each miner 1328 and 1310, among others, for the blockchain 1306 verifies the transaction and signature revocation list. A majority of miners must conclude the signature is valid before the transaction is processed. The owner of the e-wallet agrees to pay the transaction fee in return for miners helping enforce integrity of a distributed e-wallet scheme.

The miners 1310 and 1328, and the blockchain 1308, may be hosted in any number of devices. This may include, for example, the edge device hosting the e-wallet 1314, and edge device or other device hosting an e-wallet share 1322, a fog server, or a fog device, among others.

Figure 14:
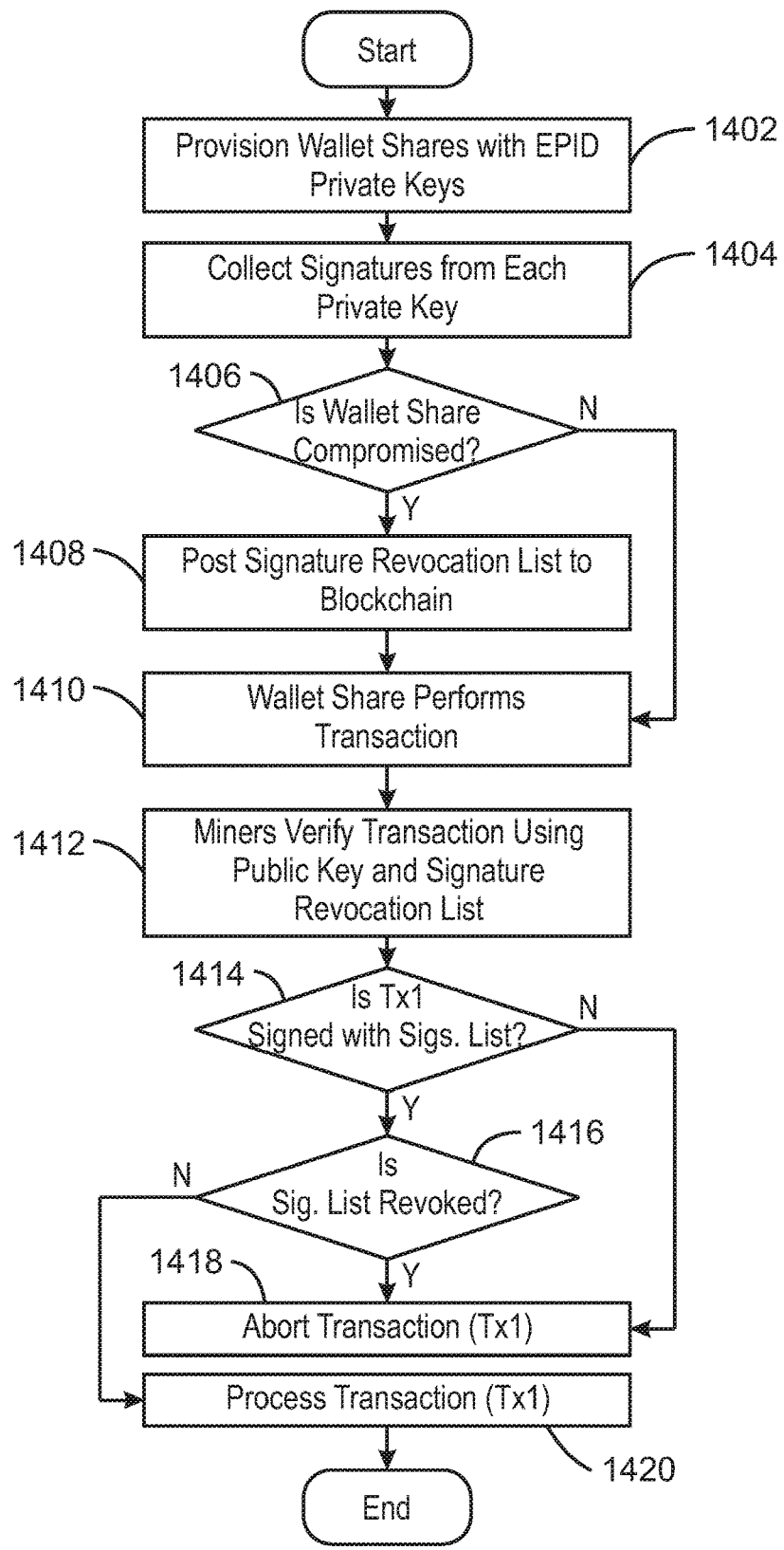
FIG. 14 is a process flow diagram of a method for using an EPID as a distributed wallet key, in accordance with some examples.

FIG. 14 is a process flow diagram of a method 1400 for using an EPID as a distributed wallet key, in accordance with some examples. The method 1400 begins at block 1402, when e-wallet shares are provisioned with EPID private keys (WS1$^{-1}$, WS2$^{-1}$, . . . WSn$^{-1}$). At block 1404, signatures are collected from each private key (SigWS1, SigWS2, . . . , SigWSn).

At block 1406, a determination is made as to whether an e-wallet share is compromised. If so, at block 1408 the signature for the e-wallet share, for example, SigWS1, is posted to the blockchain. If not, at block 1410, the e-wallet share performs a transaction.

At block 1412, miners verify the transaction using the public key for the e-wallet to which the e-wallet share belongs, checking the signature revocation list for the signature, such as SigWS1. At block 1414, a determination is made as to whether the transaction is signed with SigWS1. If so, at block 1416, a determination is made as to whether the transaction signature, SigWS1, is revoked. If the transaction is not signed, as determined at block 1414, or the signature (SigWS1) has been revoked, as determined at block 1416, the transaction is aborted at block 1418. If the transaction is signed, and the signature has not been revoked, the transaction is processed at block 1420.

The use of distributed e-wallets makes it important that the balances across all of the shares of the e-wallets be synchronized. This may be complicated by shares in devices that are only in intermittent use, for example, while the device is powered or the shares our loaded in device memory. Shares that are only in intermittent use may be termed "sleepy shares" herein.

Figure 15:
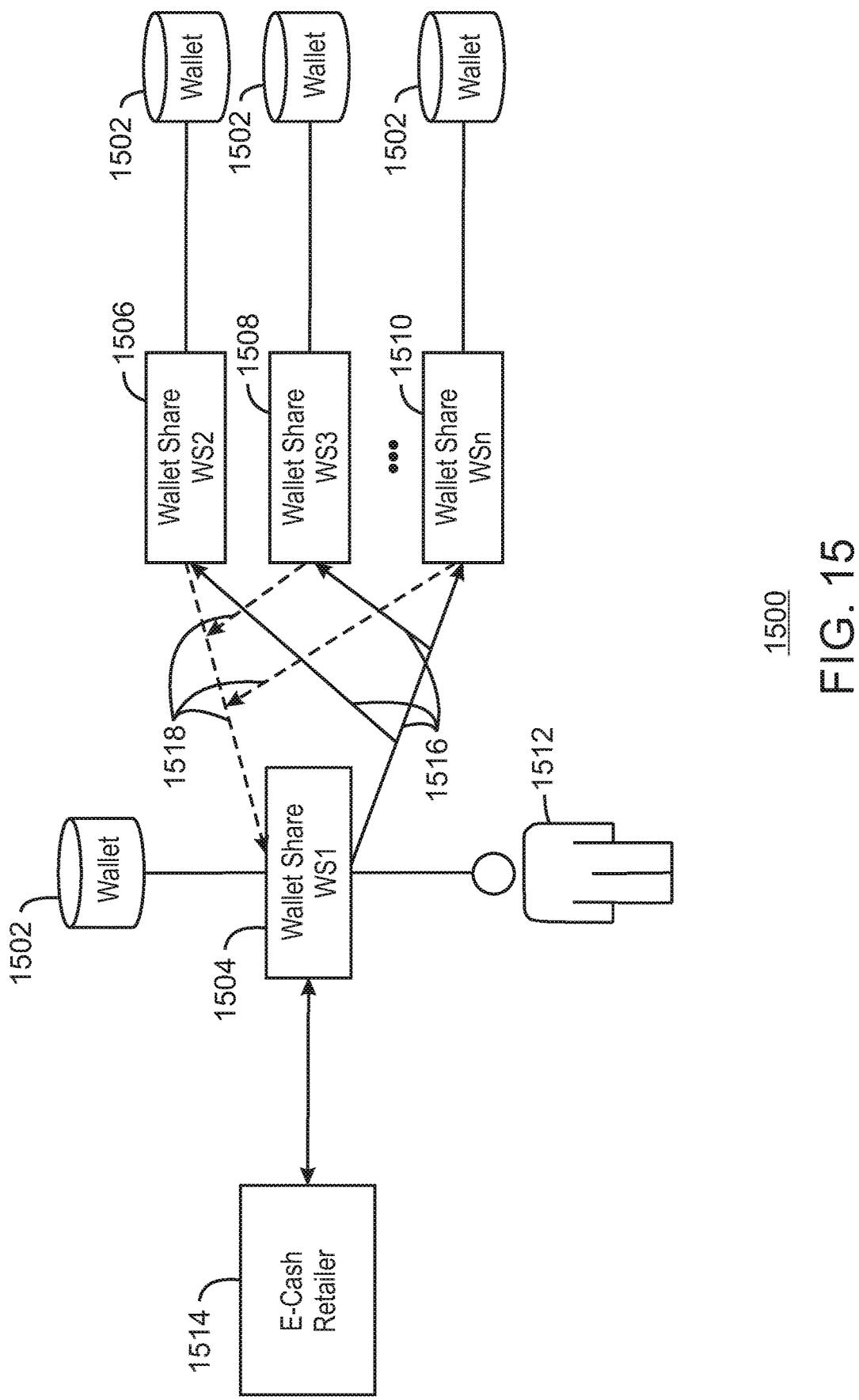
FIG. 15 is a schematic diagram of a wallet having synchronized shares using shared resources, in accordance with some examples.

FIG. 15 is a schematic diagram of a process 1504 synchronizing shares of an e-wallet using shared resources, in accordance with some examples. The process 1504 may be illustrated by an e-wallet (W1) with EPID group keys that are shared among several distributed wallet shares, WS1 1504, WS2 1506, WS1 1508, and WSn 1510. The process 1504 for ensuring the e-wallet balance 1502 is consistent across all distributed wallet shares, including sleepy shares, may use a publish and subscribe system between all e-wallet shares for the distributed wallet, W1.

When the wallet owner 1510 wishes to transact an e-cash transaction (Tx1) with the distributed wallet W1, a wallet share, WS1 1504 is selected to interface with e-cash retailer 1514. The transaction, Tx1, may be authorized by the user 1512 through a user interface of WS1 1504. A log or history of Tx1 is maintained locally. The history may be integrity vetted by finding Tx1 on a blockchain that performs transaction clearing for Tx1. WS1 1504 synchronizes the wallet balance among the other shares by sending a wallet wake message 1516 to each of the distributed wallet shares. The wallet wake message 1516 may be broadcast, multi-cast, or sent by multiple unicast messages.

After sending the wallet wake message 1516, WS1 1504 sends a balance synchronization message consisting of Tx1 and a nonce (N1) that is signed by an authentication key for WS1 1504 (KWS1). As used herein, a nonce may be a random or pseudorandom number that is created for a single communication, and may not be used thereafter. To lower the probability that a nonce may be repeated it is generated with enough random bits to decrease any probabilistic or significant chance of a repeat. Authentication protocols may be protected from replay attacks by using nonces. The message may further be signed by the EPID wallet key (Kw1-WS1). Signing using the EPID key ensures the authentication and nonce are meant for transactions related to the wallet W1.

Upon receipt of the sync message each of the distributed wallet shares, WS2 1506, WS1 1508, and WSn 1510, responds by sending a message 1518 acknowledging receipt of the sync message 1516. This is accomplished by signing the nonce (N1) and the transaction number Tx1 with the WS authentication key which is countersigned with the EPID wallet key. A wallet share manager in each of the devices holding the distributed wallet shares may also synchronize the balance 1502 of the share of the e-wallet that they manage to the balance in the synchronization message.

In cases where a node holding a distributed wallet share does not acknowledge the synchronization message, WS1 1504 may resend the balance synchronization message. A different nonce (N2) may be used to ensure that retries are not doubly counted to the network effects or malicious replay.

The e-cash retailer 1514 may be a fog server node in an IoT network, or fog device, used for retail transaction. In some examples, this may be the retail network used in a store for point-of-sale processing of transactions. The e-cash retailer 1514 may have network links, for example, to an MEC server, for processing and clearing the transaction.

Figure 16:
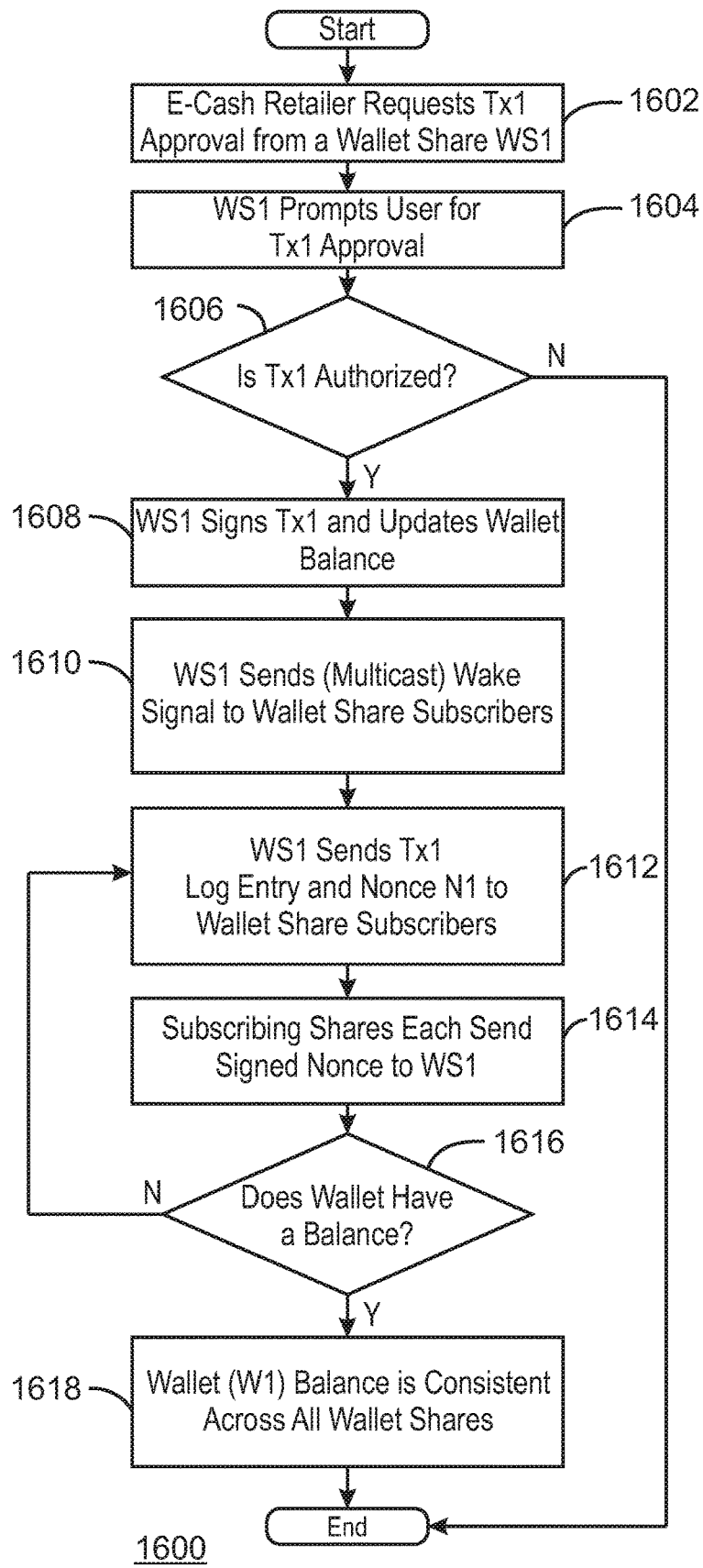
FIG. 16 is a process flow diagram of a method for implementing synchronized wallet shares using shared resources, in accordance with some examples.

FIG. 16 is a process flow diagram of a method 1600 for implementing synchronized wallet shares using shared resources, in accordance with some examples. The method begins at block 1602, when an e-cash retailer requests a transaction approval from a wallet share (WS1). At block 1604, the wallet share prompts the user for approval of the transaction. At block 1606, a determination is made as to whether the transaction is authorized. If not, the method 1600 ends.

At block 1608, the wallet share (WS1) signs the transaction and updates the wallet balance (Bal=Bal−Tx1). At block 1610, the wallet share (WS1) sends a wake signal to wallet share subscribers, for example, WS2, WS3, . . . WSn. At block 1612, the wallet share sends a log entry for Tx1 and a nonce (N1) to the other wallet share subscribers, WS2, WS3, . . . WSn, which functions as a balance synchronization message. In response, at block 1614, each e-wallet share subscriber signs the log entry and nonce and returns it to the initial wallet share as [[N1, Tx1]Kwsx]Kepid_W1, which functions as an acknowledgment message for the balance synchronization message. Each e-wallet share subscriber may also update the balance of the e-wallet that they are tracking.

At block 1616, a determination is made as to whether the wallet has a balance. If not, process flow returns to block 1612. At block 1618, the wallet balance is consistent across all wallet shares.

The e-wallet transactions described with respect to FIGS. 12-16 pay an entire transaction from a single e-wallet share, then synchronize the balances across the entire group. Further security may be achieved by paying portions of the transaction from, or to, different e-wallet shares. In this technique, an e-cash user may lower the risk of e-wallet use by maintaining multiple e-wallets from which a portion of the transaction is paid from each share. Each e-wallet may also be a distributed e-wallet having multiple shares. The user manages risk by maintaining a low average balance for each e-wallet. A threshold policy is assigned to each e-wallet indicating when it is appropriate to deny receipt of a credit balance that is too risky for a single e-wallet to handle.

Figure 17:
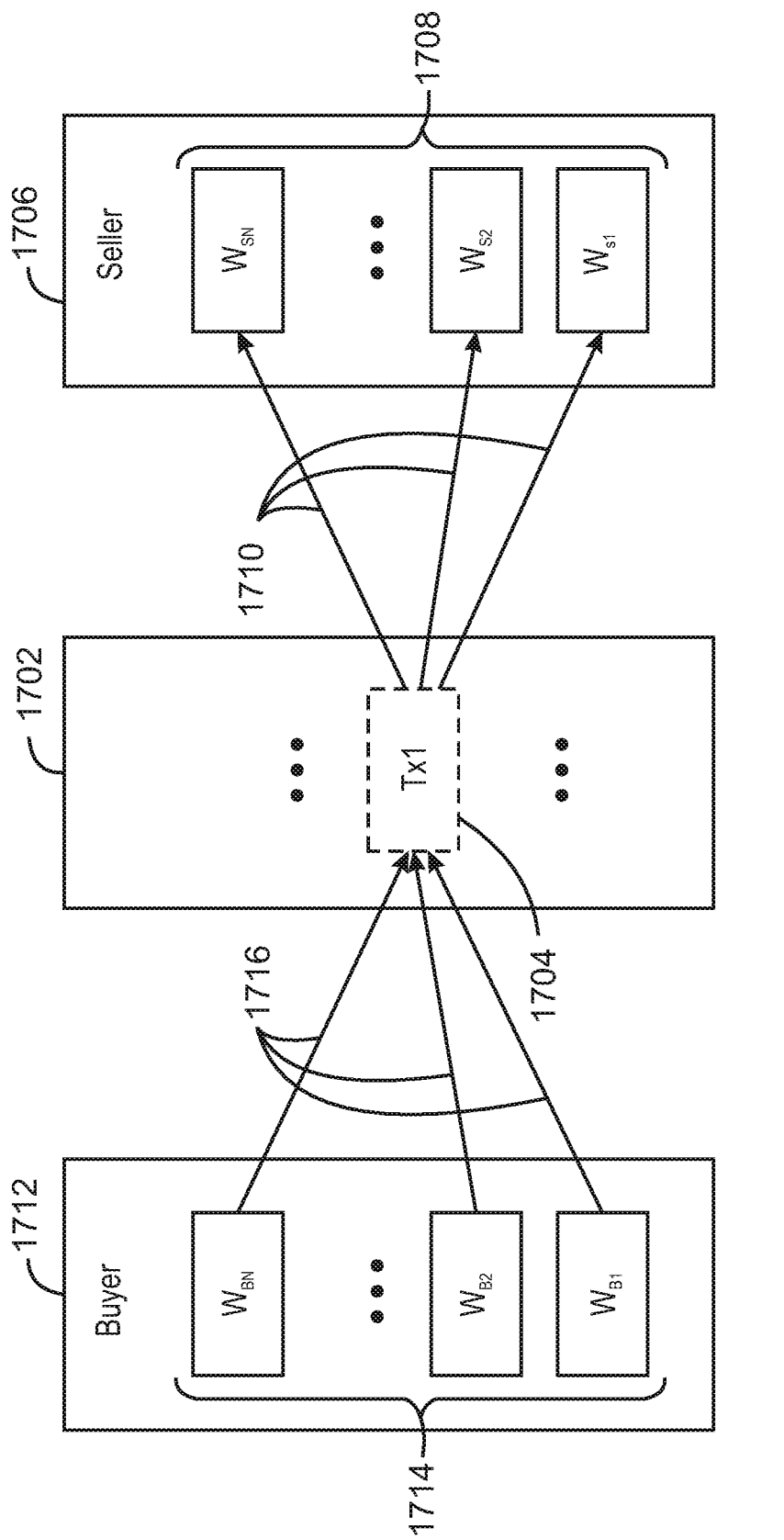
FIG. 17 is a schematic diagram of implementing fractional transactions using multiple e-wallet shares, in accordance with some examples.

FIG. 17 is a schematic diagram of a process 1700 implementing fractional transactions using multiple e-wallet shares, in accordance with some examples. As described herein, a blockchain 1702 records a transaction 1704 in a block. A seller's e-wallet 1706 may receive payment into multiple fractional e-wallets 1708 through multiple fractional transactions 1710, for example, by reading the transaction block 1704. The multiple fractional transactions 1710 may be created from the original (Tx1) transaction 1704 such that the transaction amount for each of the fractional transactions 1710 is below the threshold allowed by the seller's fractional e-wallets 1708 used to process the fractional transactions 1710. In some examples, the seller's e-wallet 1706 may have shares distributed across multiple hosting devices, such as point-of-sale terminals in a retail establishment. Similarly, a buyer's e-wallet 1712 may have shares distributed across multiple hosting devices. As the shares are encrypted, some of the shares of the buyer's e-wallet 1712 may be hosted in devices in the retail establishment. Copies of the blockchain 1702 may be shared across the same devices hosting the seller's e-wallet 1706 and the buyers e-wallet 1712. In addition, copies of the blockchain 1702 may reside on an MEC network.

The buyer's e-wallet 1712 may also support multiple fractional e-wallets 1714. As for the seller's e-wallet 1706, each of the fractional e-wallets 1714 for the buyer may have payment limits that may prevent paying the full amount, or some fraction of the full amount, with a single fractional e-wallet 1714. The buyer may create or select as many fractional e-wallets 1714 as needed to pay 1716 the fractional transaction 1704 to both satisfy the threshold requirements imposed by the seller, and to evenly distribute transaction load so that the balance of each fractional e-wallet 1714 may be maintained at a balanced level versus the other fractional e-wallets 1714. The roles of buyer and seller may be reversed interactively, such that the fractional e-wallets 1708 and 1714 maintain a balance that is below a threshold.

The blockchain 1702, for example, through miners, may clear each of the fractional transactions being careful to account for each fraction until all fractions clear. The original transaction Tx1 1704 may then be recognized as having cleared.

Figure 18:
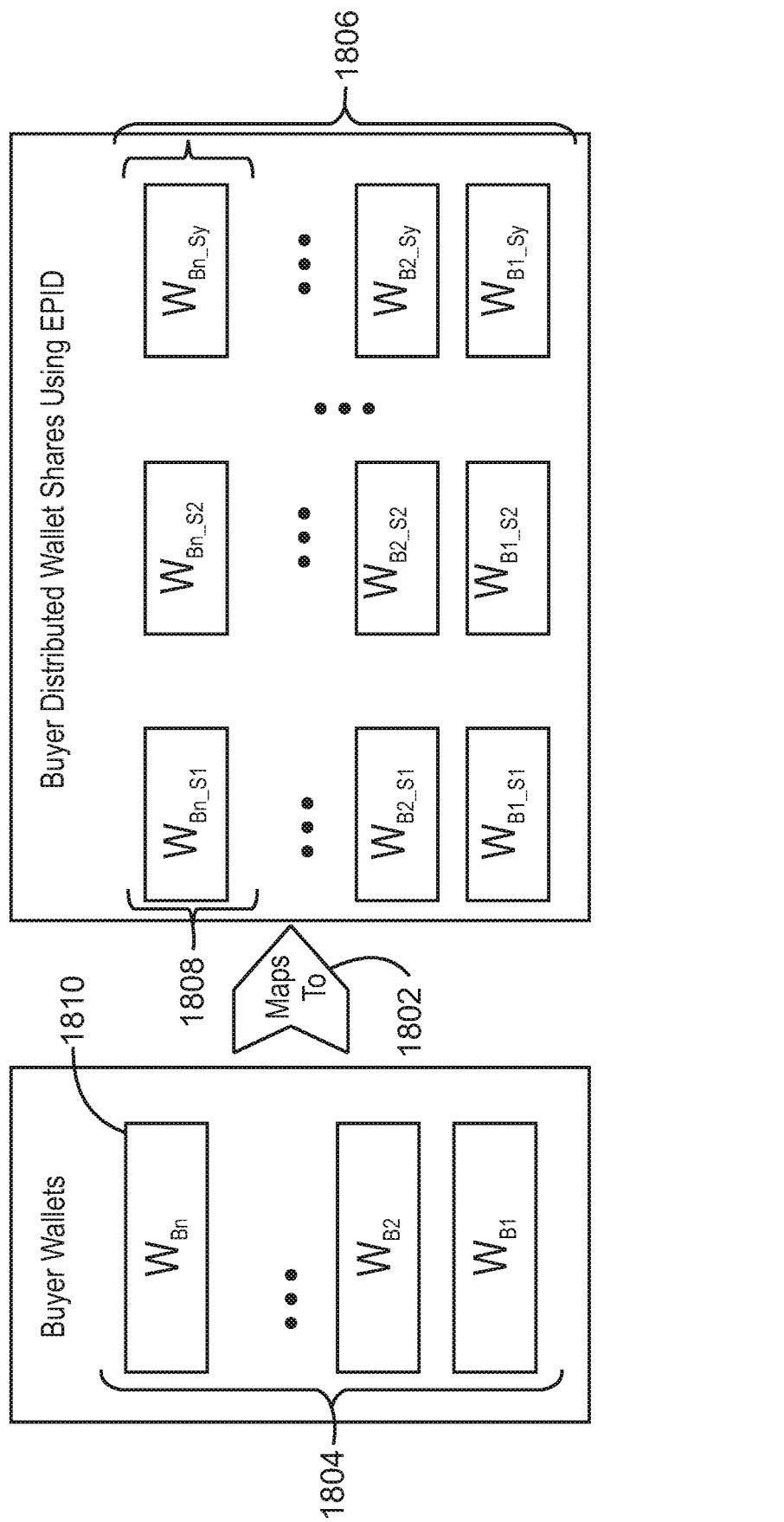
FIG. 18 is a schematic diagram of using EPID to map fractional transactions to multiple distributed e-wallets, in accordance with some examples.

FIG. 18 is a schematic diagram of a process 1800 for using EPID to map fractional transactions to multiple distributed e-wallets, in accordance with some examples. E-wallet keys 1804 may consist of a traditional asymmetric signing key or an EPID key 1806. In the case of EPID signing, any of the distributed e-wallet shares 1808 mapped to a particular user e-wallet 1810 may sign the fractional transactions for that e-wallet 1810. For improved user convenience, the user may maintain a distributed e-wallet share 1808 for each e-wallet 1804 on the same host, platform, or TEE, such as a mobile device carried by the user, so that processing and availability of the e-wallets is simplified, Loring the processing time. In this mode, each fractional transaction may be signed using parallel processing threads so the signing latency for a user is approximately equal to that of a single key sign operation.

Figure 19:
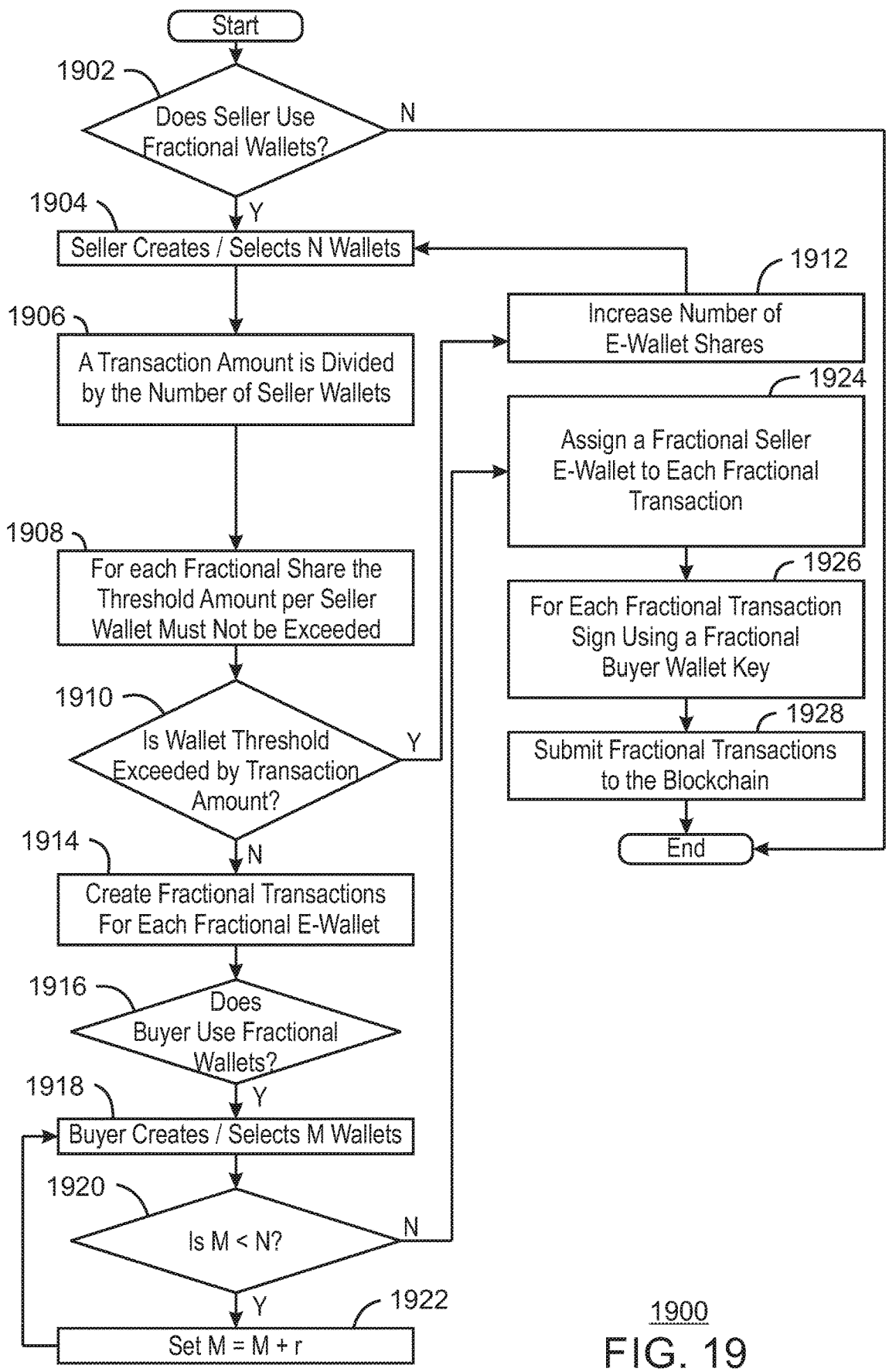
FIG. 19 is a process flow diagram of a method for using fractional4transactions in multiple wallets, in accordance with some examples.

FIG. 19 is a process flow diagram of a method 1900 for using fractional transactions in multiple wallets, in accordance with some examples. The method begins at block 1902, when a determination is made as to whether the seller uses fractional e-wallets. If not, the method 1900 ends.

At block 1904, the seller creates or selects a number of fractional e-wallets (N). At block 1906, transaction amount (X) in the transaction (Tx1) is divided by the number of the fractional e-wallets (N) from the seller, such that X is equal to the shares from each fractional e-wallet, for example, X=SUM(x1, x2, . . . , xn).

At block 1908, a calculation is made to determine that, for the addition of each fractional share, xn, to the total amount, X, the total amount X has not exceeded a maximum amount threshold (Ti) for the wallet (Wbi). At block 1910, a determination is made as to whether the wallet threshold has been exceeded by a fractional share. If so, process flow proceeds to block 1912, where the number of fractional e-wallets selected is increased (N=N+r) before process flow is returned to block 1904.

If the wallet threshold has not been exceeded at block 1912, process flow proceeds to block 1914. At block 1914, fractional transactions (Tx1_i) are created for each fractional e-wallet in the wallet (each I in N). Each fractional transaction (Tx1_i) as the fractional share amount (xn) assigned to the fractional transaction (Tx1_i).

At block 1916, a determination is made as to whether the buyer uses fractional e-wallets. The fractional value may be set to 1 of 1 and processing can continue at 1914. Otherwise, it may be assumed that there is a flow for non-fractional wallet processing that is used instead. For example, a flag may be set to ignore any blocks that include fractional e-wallets for buyers, as noted herein. At block 1916, the buyer creates or selects a number of fractional e-wallets (M). At block 1920, a determination is made as to whether the number (M) of fractional e-wallets selected by the buyer is less than the number of fractional e-wallets (N) selected by the seller. If so, at block 1922 the number of fractional e-wallets selected by the buyer is increased, and process flow returns to block 1918.

If at block 1920, the number of fractional e-wallets selected by the buyer is not less than the number of fractional e-wallets selected by the seller, process flow proceeds to block 1924. At block 1924, each fractional seller wallet (Wsi) in the seller wallet (Ws=Ws1, Ws2, . . . , Wsn) is assigned to a fractional transaction Tx1_i. For example, F(Tx1, Ws)=((Tx1_1, Ws1), (Tx1_2, Ws2), . . . , (Tx1_n, Wsn)).

At block 1926, if it has been determined that the buyer is using fractional wallets at block 1916, each fractional transaction (Fi) is signed using a fractional e-wallet key for the buyer. For example, ([Tx1_1, Ws1]KB1, [TX1_2, Ws2] KB2, . . . , [Tx1_n,Wsn]KBm). If at block 1916, it was determined that the buyer is not using fractional e-wallets, each fractional transaction is signed using the buyer's wallet key, for example, ([Tx1_1, Ws1]KB, [TX1_2, Ws2] KB, . . . , [Tx1_n,Wsn]KB).

At block 1928, the fractional transactions F(Tx1, Ws) are submitted to the blockchain. For example, this may be performed directly of the blockchain is on the same system, or through a transaction message sent to a blockchain on another system, or both.

Figure 20:
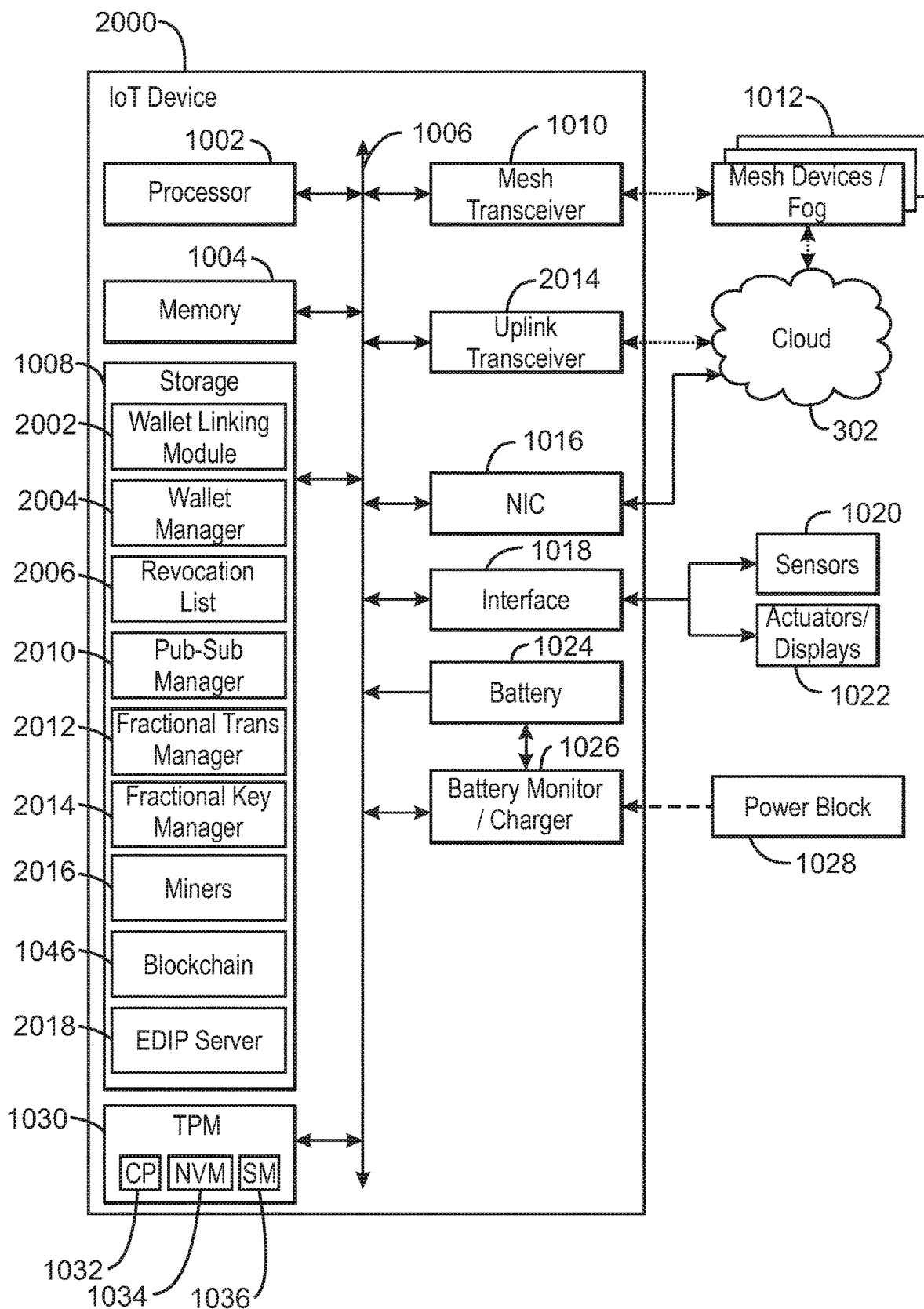
FIG. 20 is a block diagram of an example of components that may be present in an IoT device for implementing fractional transactions from multiple e-wallets, in accordance with some examples.

FIG. 20 is a block diagram of an example of components that may be present in an IoT device 2000 for implementing transactions from multiple e-wallets, in accordance with some examples. Like numbered items are as described with respect to FIGS. 3 and 10. It can be noted that different components may be selected and used for the IoT device 1000 discussed with respect to FIG. 10, and the IoT Device 2000 discussed with respect to FIG. 20.

The mass storage 1008 may include a number of modules to implement the e-wallet functions described herein. Although shown as code blocks in the mass storage 1008, it may be understood that any of the modules may be fully or partially replaced with hardwired circuits, for example, built into an application specific integrated circuit (ASIC). The mass storage 1008 may include a wallet linking module 2002 that associates shares, or fractional shares, of an e-wallet with a wallet. A wallet share manager 2004 may be used to create transactions for the wallet. The share wallet manager 2004 may be used to create a wallet share or a fractional wallet share. The wallet manager 2004 may use the wallet linking module 2002 to link wallet shares or fractional wallet shares to the e-wallet. The wallet share manager 2004 may also provision the wallet shares or fractional wallet shares with keys and an e-cash balance, submit a transaction for an e-wallet to a blockchain, and initiate a fractional share transaction, among other functions. The wallet share manager 2004 may also revoke a share of an e-wallet, for example, by entering the revoked share in a revocation list 2006. The revocation list 2006 may include credentials, or lists of credentials, for revoke shares. The revocation list 2006 may be posted to a blockchain 2008 to allow miners for the wallet shares to check the list prior to clearing a transaction, as described with respect to FIGS. 13 and 14.

The mass storage 1008 may include a publication-subscription (pub-sub) manager 2010 to send a wake-up message to other e-wallet shares upon the clearing of a transaction. The pub-sub manager 2010 may then publish the transaction to the e-wallet shares, allowing the wallet shares to adjust their balances to synchronize the balances across the e-wallet shares, as described with respect to FIGS. 15 and 16.

A fractional transaction manager 2012 may be used to implement transactions that are shared across a number of fractional e-wallet shares, as described with respect to FIGS. 17, 18, and 19. For example, the fractional transaction manager 2012 may split a transaction into fractional transactions that are assigned to individual fractional e-wallet shares for a seller. The fractional transaction manager 2012 may also determine if a buyer is using fractional e-wallets, assign fractional e-wallet shares from the buyer to fractional e-wallet shares from the seller, and determine if the fractional e-wallet shares exceed spending limits for e-wallets. A fractional key manager 2014 may sign each fractional transaction using a fractional e-wallet key for a buyer. If the buyer is not using fractional e-wallets, the fractional key manager 2014 may sign each fractional transaction using a key for the buyer's e-wallet. The fractional key manager 2014 may then submit the signed fractional transactions to the blockchain, as described with respect to FIG. 19.

As described herein, a blockchain 1046 may be included in the IoT device 2000 to record transactions and fractional transactions. In addition to other information, the blockchain 1046 may record revocation of wallet shares, shared public keys, and signed transactions. As described herein, the fractional transactions and shared wallet transactions recorded on the blockchain 1046 may be validated by miners 2016 that examine the blockchain 1046 to confirm that a wallet has not been revoked, that all signatures are present, and clear a transaction once these conditions are met, for example, as described with respect to FIG. 14. The miners 2016 may charge fees against the transaction to confirm the transaction transactions recorded on the blockchain 1046 are valid. Further, the miners 2016 may work with miners on other systems that hold a copy of the blockchain 1046 to validate the transaction, for example, by a majority vote of miners.

In some examples, an EPID server 2018 may be included to provide encryption services, such as encrypting and decrypting data using a public or private key. Further, the EPID server 2018 may provide public or private keys or other credentials that can be used to authorize transactions, as well as acting as a key verification server. The EPID server 2018 may also be used in other applications to form and issue keys, or to generate fractional keys, for use in the methods described with respect to FIGS. 12 to 19.

Figure 21:
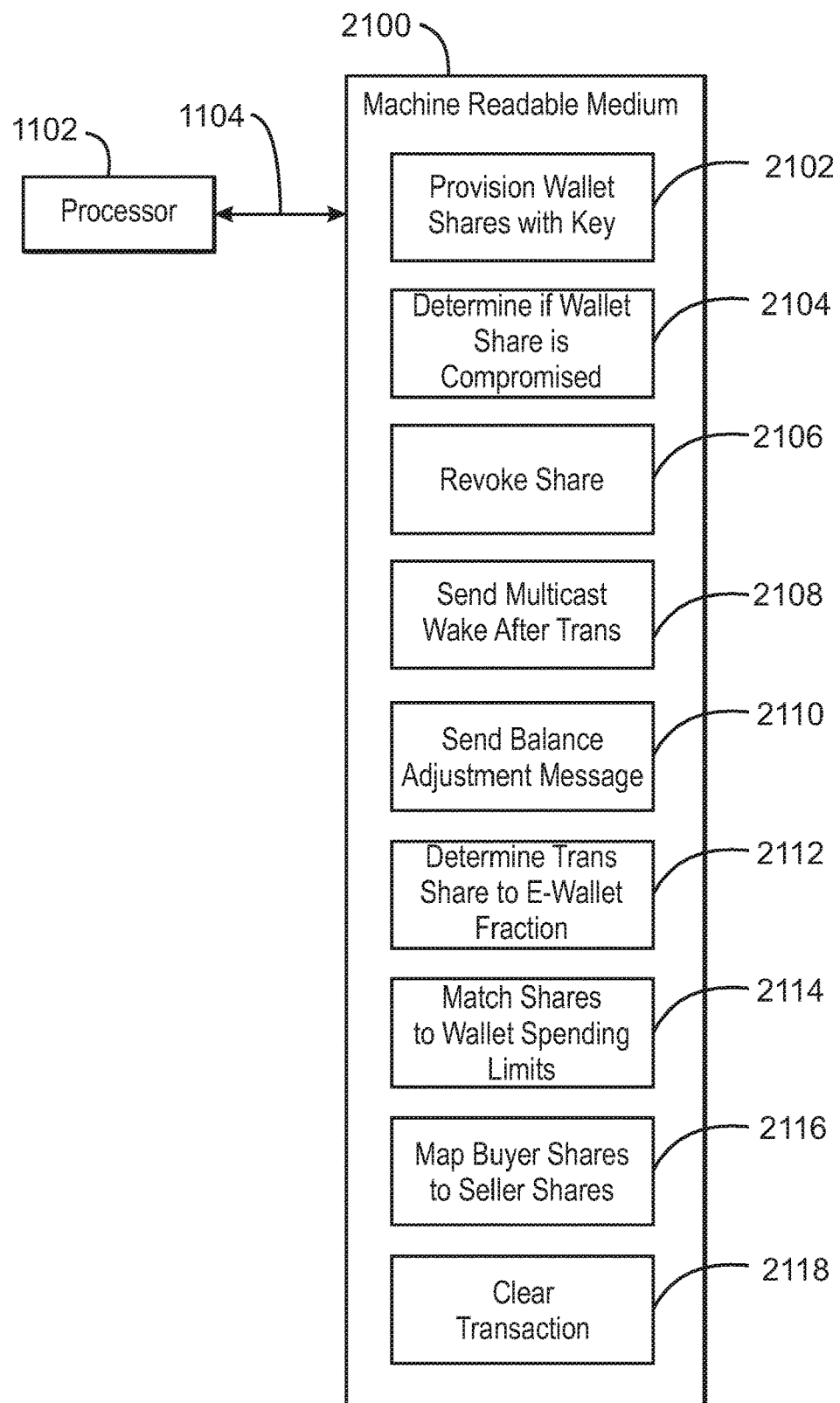
FIG. 21 is a block diagram of a non-transitory, machine readable medium including code that, when executed, directs a processor to implement fractional transactions from multiple e-wallets, in accordance with some examples.

FIG. 21 is a block diagram of a non-transitory, machine readable medium 2100 including code that, when executed, directs a processor to implement fractional transactions from multiple e-wallets, in accordance with some examples. The processor 1102 may access the non-transitory, machine readable medium 2100 over a bus 1104. The processor 1102 and bus 1104 may be selected as described with respect to the processor 1002 and bus 1006 of FIG. 10. The non-transitory, machine readable medium 2100 may include devices described for the mass storage 1008 of FIG. 10 or may include optical disks, thumb drives, or any number of other hardware devices.

The non-transitory, machine readable medium 2100 may include code 2102 to direct the processor 1102 to provision wallet shares, for example, with EPID keys and balances. Code 2104 may be included to direct the processor 1102 to determine if wallet shares are compromised. Code 2106 may be included to direct the processor 1102 to revoke an e-wallet share, for example, by posting a revocation list to a blockchain.

The non-transitory, machine readable medium 2100 may include code 2108 to direct the processor 1102 to send a wake-up message to other wallet shares after a transaction is cleared. Code 2110 may be included to direct the processor 1102 to send a balance adjustment message to other devices holding wallet shares.

The non-transitory, machine readable medium 2100 may include code 2112 to direct the processor 1102 to determine a transaction share to go to an e-wallet fraction for a fractional transaction. Code 2114 may be included to direct the processor 1102 to match e-wallet shares to spending limits for the wallet shares and for the e-wallet. Code 2116 may be included to direct the processor 1102 to map buyer shares to seller shares for a fractional transaction, for example, if both the buyer and the seller are using fractional e-wallet shares. Code 2118 may be included to clear a fractional transaction by posting transactional messages to the blockchain.

In a distributed e-wallet environment, if one of the e-wallet shares is lost or stolen an attacker may be able to obtain physical access to the e-wallet contents, for example, by compromising the key or keys, and may use the key or keys to make illicit transactions the key to make illicit transactions. The techniques described with respect to FIGS. 22 to 30 may use multi key authorization policies to protect wallet shares, for example, by employing an M of N agreement protocol that obtains spending approval from M of N wallet shares, for example, located on different devices, as a precondition to transaction submission. In some examples, each e-wallet share signs the proposed transaction and nonce that is subsequently countersigned with an e-wallet key, for example, an EPID key.

Figure 22:
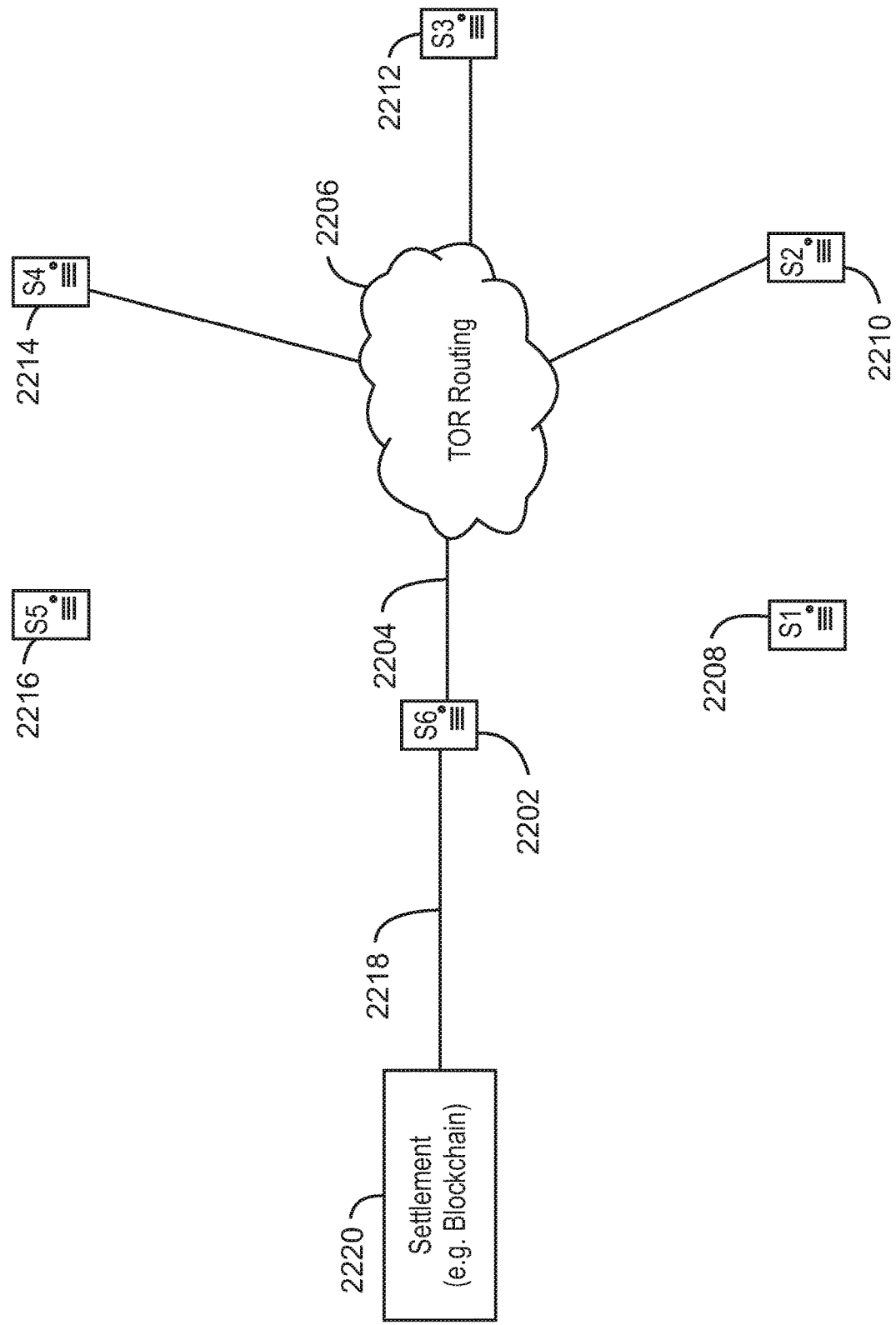
FIG. 22 is a schematic diagram of a wallet signing authorization using an M of N policy, in accordance with some examples.

FIG. 22 is a schematic diagram of a wallet signing authorization 2200 using an M of N policy, in accordance with some examples. E-wallet share devices may be headed or headless. Headed devices may require additional user logins and approval dialogs, which may further strengthen a determination of a user intent to use the wallet. Headless share devices may participate in the M of N signature scheme so that an attacker will be required to physically compromise additional devices in order to reach the M threshold of approvers.

The wallet signing authorization 2200 may begin when a e-wallet share S6 2202 in a first device issues a transaction with an approval request 2204 (Tx1_MofN). The approval request 2204 may be a combination of the transaction and the M of N approval policy. The approval request 2204 may be sent to a private or anonymizing network 2206, such as a TOR network, to be forwarded to a number of other e-wallet shares in other devices, such S1 2208, S2 2210, S3 2212, S4 2214, and S5 2216.

The devices hosting the e-wallet shares S1 2208, S2 2210, S3 2212, S4 2214, S5 2216, and S6 2202 may be edge devices, such as smart phones, or may be any number of other devices that may be connected to the anonymizing network 2206, such as ATMs, car networks, fog servers, fog devices, or MEC servers, among many others. The anonymizing network 2206 may be a virtualized device residing in a cloud network, such as the Internet. The blockchain 2220 may be hosted by an MEC network, with copies shared to virtualized devices in the MEC network. Copies of the blockchain 2220 may also be hosted by some or all of the devices hosting e-wallet shares S1 2208, S2 2210, S3 2212, S4 2214, S5 2216, and S6 2202.

The M of N approval represents an M number of e-wallet shares that are required to approve a transaction out of an N total number of devices, before the transaction is allowed to clear. In this example, four e-wallet shares are required to prove the transaction out of six total shares, and thus, the M of N approval policy is four of six.

The e-wallet shares, S1 2208, S2 2210, S3 2212, S3 2214, and S5 2216, may respond by signing the approval request 2204, and exchanging messages with the multi-signed approval request 2204. Once the other e-wallet shares have responded with the signatures, the requesting e-wallet share, S6 2202, signs the request, resulting in a signed transaction of the form [[[[[[[[TX1, Policy, Context] KS4] Kw1] KS2] Kw1] KS3] Kw1] KS6] Kw1]. In this form, the transaction is TX1, the policy may be the number of M required for approval, and the context may include information on device locations or type among others. The final signed M of N sign transaction 2218, or multi-signed approval request, is committed by the device requesting the transaction, S6 2202 in this example, to a blockchain 2220 for settlement. Clearing of the transaction may be performed by miners that apply the M of N policy to the transaction. In this example, four of the six shares have signed the M of N approval request 2204. Thus, if the M of N transaction policy allows majority signing the transaction will be authorized and cleared.

If a device is compromised, such as being lost or stolen, the user may place the e-wallet share's key id, EPID signature, or both, on a blacklist with remaining shares. For example, e-wallet share S2 2210 may be added to a blacklist which is then circulated among the other shares S1 2208, S3 2212, S4 2214, S5 2216, and S6 2202. If a signed M of N approval request reaches a share and a blacklisted ID or signature is found to have signed the transaction, the share may refuse to sign, for example, discarding the transaction, sending the transaction. Accordingly, the M count may not increase, making it difficult for an attacker to obtain the M threshold required for transaction approval.

The M of N threshold policy may be enforced by a TEE that resists software attack and many physical attacks. The blockchain chain miner is an additional enforcement point where the proof-of-work algorithm must satisfy the M of N threshold. It may not be practical for miners to maintain a blacklist of wallet share keys, as this may require access to many historical blockchains. However, it may be feasible for miners to process multiple signatures on a transaction in the current blockchain, ignoring the revocation status.

To prevent an attacker from positioning itself as the last signer (M−1), routing of the signers may be randomized. For example, a TOR routing scheme may be applied that randomly selects the next signer. As noted, contextual information, such as device location or type, may also accompany approval grants. Context information may also help enforce anti-fraud rules.

Figure 23:
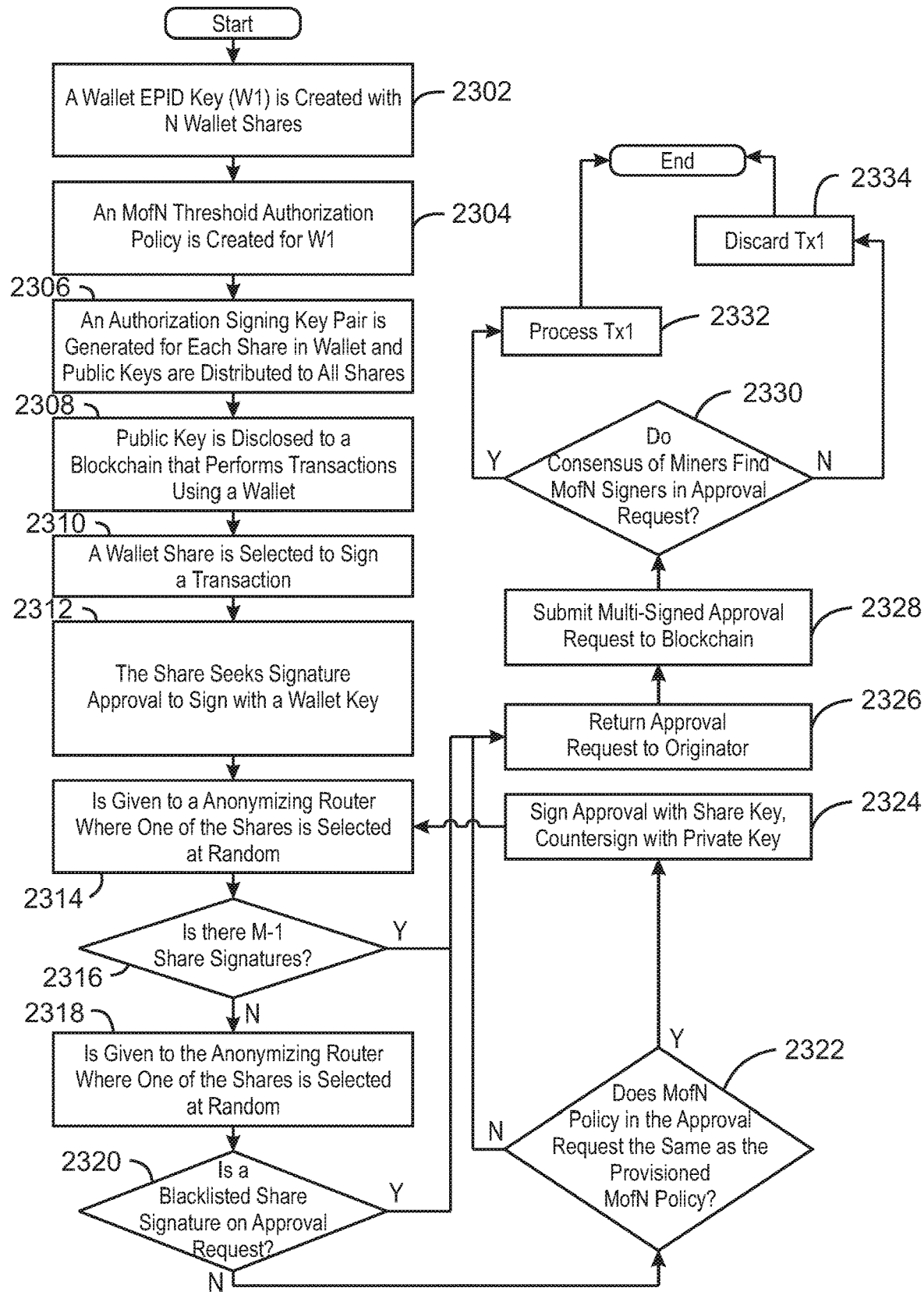
FIG. 23 is a process flow diagram of a method for wallet signing authorization using an M of N policy, in accordance with some examples.

FIG. 23 is a process flow diagram of a method 2300 for wallet signing authorization using an M of N policy, in accordance with some examples. The method 2300 begins at block 2302, when a private key (Kw1), for example, an EPID key, for an e-wallet (W1) is created with N e-wallet shares. At block 2304, an M of N threshold authorization policy is created for W1. At block 2306, an authorization signing key pair is generated for each share in W1. Public keys are distributed to all shares. At block 2308, the public key for W1 is disclosed to a blockchain that performs transactions using an e-wallet.

At block 2310, an e-wallet share, for example, S6, is selected to sign a transaction (Tx1). At block 2312, the e-wallet share seeks signature authority to sign the transaction, Tx1, with an e-wallet key (Kw1_S6). At block 2314, the approval request (Tx1_MofN) is given to an anonymizing router, such as a TOR router, to select one of the other e-wallet shares at random. At block 2316, a determination is made as to whether there are sufficient signatures based on the M of N policy, such as M−1 share signatures. If not, at block 2318, the approval request (Tx1_MofN) is provided to the anonymizing router to select another one of the e-wallet shares at random. At block 2320 a determination is made as to whether a blacklisted e-wallet share signature is on the approval request (Tx1_MofN). If not, at block 2322, a determination is made as to whether the M of N policy in the approval request (Tx1_MofN) is the same as the provisioned M of N policy. If so, at block 2324, the approval request is signed with an e-wallet share key for the share, and countersigned with the e-wallet's private key (Kw1). Process flow then returns to block 2314 to continue the signing process.

If M−1 e-wallet share signatures have been obtained at block 2316, or a blacklisted share signature is detected on the approval request at block 2320, or the M of N policy and the approval request is the same as the provisioned M of N policy at block 2322, the signing process is halted and process flow proceeds to block 2326. At block 2326, the multi-signed approval request, such as [[[[[[[[Tx1_Mof N] KS4] Kw1] KS2] Kw1] KS3] Kw1] KS6] Kw1], is returned to the originator, for example S6. The multi-signed approval request may then be submitted to the blockchain at block 2328.

At block 2320, a determination is made as to whether a consensus of miners find M of N signers in the signed approval request [[[[[[[[Tx1_Mof N] KS4] Kw1] KS2] Kw1] KS3] Kw1] KS6] Kw1]. If so at block 2332, the transaction is processed and cleared, after which the method 2300 ends. If a consensus of miners does not find M of N signers in the signed approval request, the transaction is discarded at block 2334, after which the method 2300 ends.

If a distributed e-wallet share is lost or stolen such that the EPID e-wallet key is obtained, the attacker could empty the e-wallet with a single transaction before the blockchain is informed of the compromised EPID e-wallet key. This may occur before the e-wallet key or signature is added to a revocation list. To help prevent this, an EPID key recovery may be used.

Figure 24:
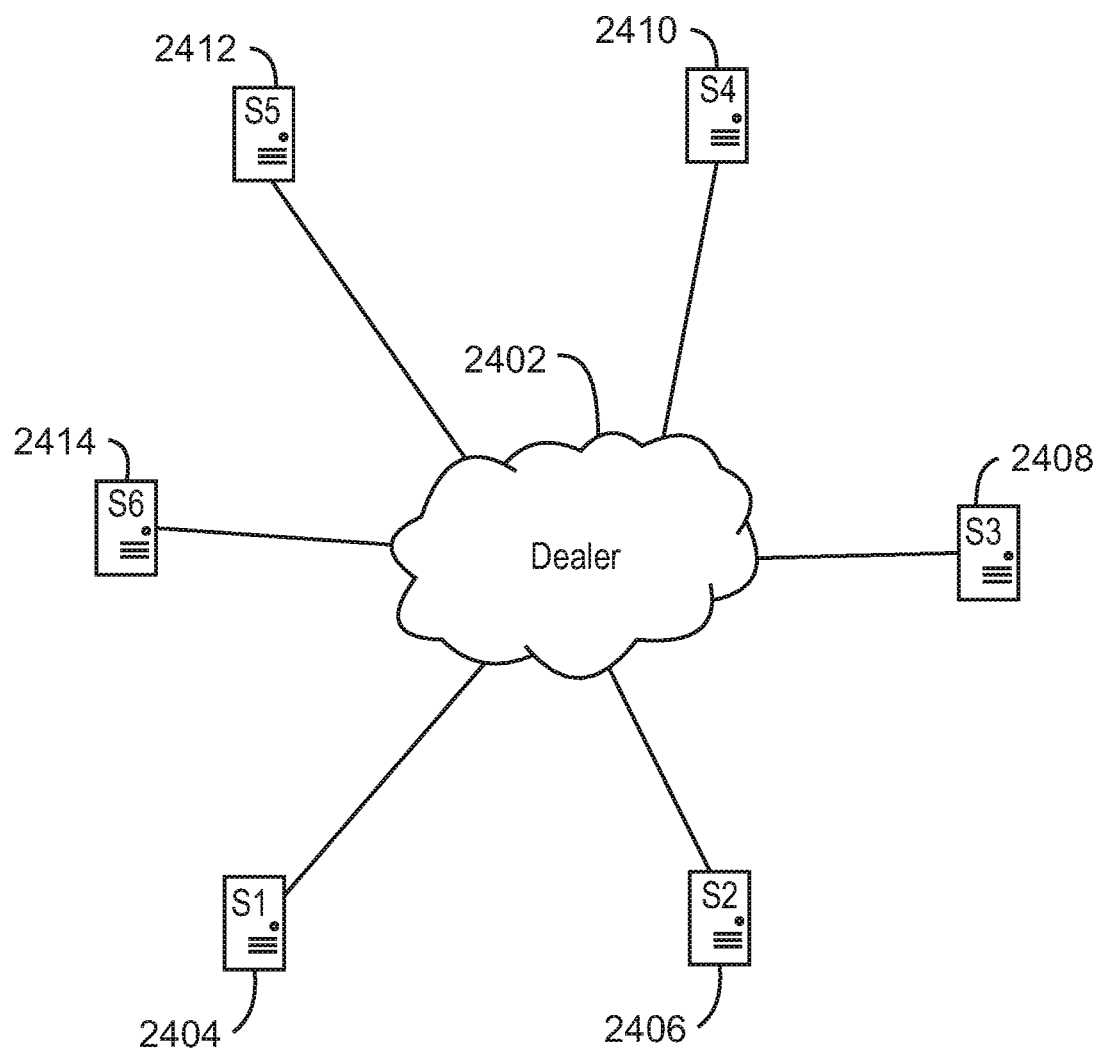
FIG. 24 is a schematic diagram of a process for distributed e-wallet security using secret sharing and EPID key recovery, in accordance with some examples.

FIG. 24 is a schematic diagram of a process 2400 for distributed e-wallet security using secret sharing and EPID key recovery, in accordance with some examples. In the process 2400, a dealer 2402 creates an e-wallet key (Kw1) using EPID, and joins all shares to the e-wallet, W1. The e-wallet key, Kw1, may be divided into two halves by each e-wallet share 2404 to 2414. Each e-wallet share 2404 to 2414 may encrypt half of the EPID private key with a symmetric key and apply Shamir secret sharing (SS) to divide the key across all shares 2404 to 2414. The devices hosting the e-wallet shares 2404 to 2414, as well as the dealer 2402, may include any combinations of edge devices, fog devices, cloud devices, and the like, as described herein.

In some examples, an EPID key is not used, and a traditional private key is used instead. EPID may be appropriately used as a semi-permissioned blockchain key, but as such, may be protected using e-wallet technology and SS further applied as an anti-theft or anti-fraud strategy. Thus, keys may not necessarily be used for financial transactions in e-wallets.

In Shamir SS a secret is divided into parts, with each participant receiving its own unique part. To reconstruct the secret, some or all of the parts are needed. In some examples, a threshold scheme is used where a predetermined number of the parts are sufficient to reconstruct the original secret. Signing a transaction requires M of N secrets and M of N copies of the EPID half key. Proactive secret sharing may be used to refresh the share keys if a share 2404 to 2414 is revoked.

A compromised e-wallet share, for example, S1 2404, can be restricted from using the wallet key (Kw1) by escrowing half of the share's Kw1 private key, for example, Kw1-S1 for wallet share S1. The EPID key may be increased in size to ensure adequate security. For example, if an EPID key using ECC of size 256 is used to achieve 128-bits of equivalent AES security, the EPID wallet key may be 512-bits in length, since half of the key (256-bits) will be escrowed. The remaining 256-bits will not be disclosed, and hence retains a minimum of 256-bits of key strength. This example presumes the lower-order half (e.g. Kw1-S1-L) is escrowed. However, it doesn't matter whether the high order half or low order half is escrowed.

The low-order half Kw1-S1-L may be encrypted by a symmetric key (KS1) (e.g. {Kw1-S1-L}KS1) and the encrypted value distributed to the other shares (e.g. S2-S6). The Rabin information dispersal (RID) may be used as an efficient way to distribute escrowed EPID private key halves as every share will possess an escrow copy for every other share.

The symmetric key used to encrypt the escrowed key (e.g. KS1) may be divided into N shares, for example, using Shamir secret sharing and each wallet share may be given a key share (e.g. SS2, . . . , SS6). The user may select an M of N policy for reconstruction of the symmetric key so that if at least M devices are available, the wallet may still sign transactions. If a share (such as S4) is thought to be compromised, M−1 of the N shares must approve delivery of their SS4 share to S4 before S4 is able to decrypt his escrowed EPID wallet key. Peer wallet shares may further restrict S4 by choosing to withhold the escrowed EPID private key ({Kw1-S1-L}KS4) from S4 if a transaction Tx1 is thought to be illicit.

Each wallet transaction must therefore be approved by M of the N wallet shares. If a wallet share is thought to be compromised, a notification message is sent to the remaining shares who refuse to process requests from the suspicious wallet share (such as S4). To prevent reply signing requests and revocation notifications, both messages may include nonces. The wallet may be implemented using a trusted execution environment (TEE) technology that hardens the wallet that prevents software attacks and many physical attacks.

Figure 25:
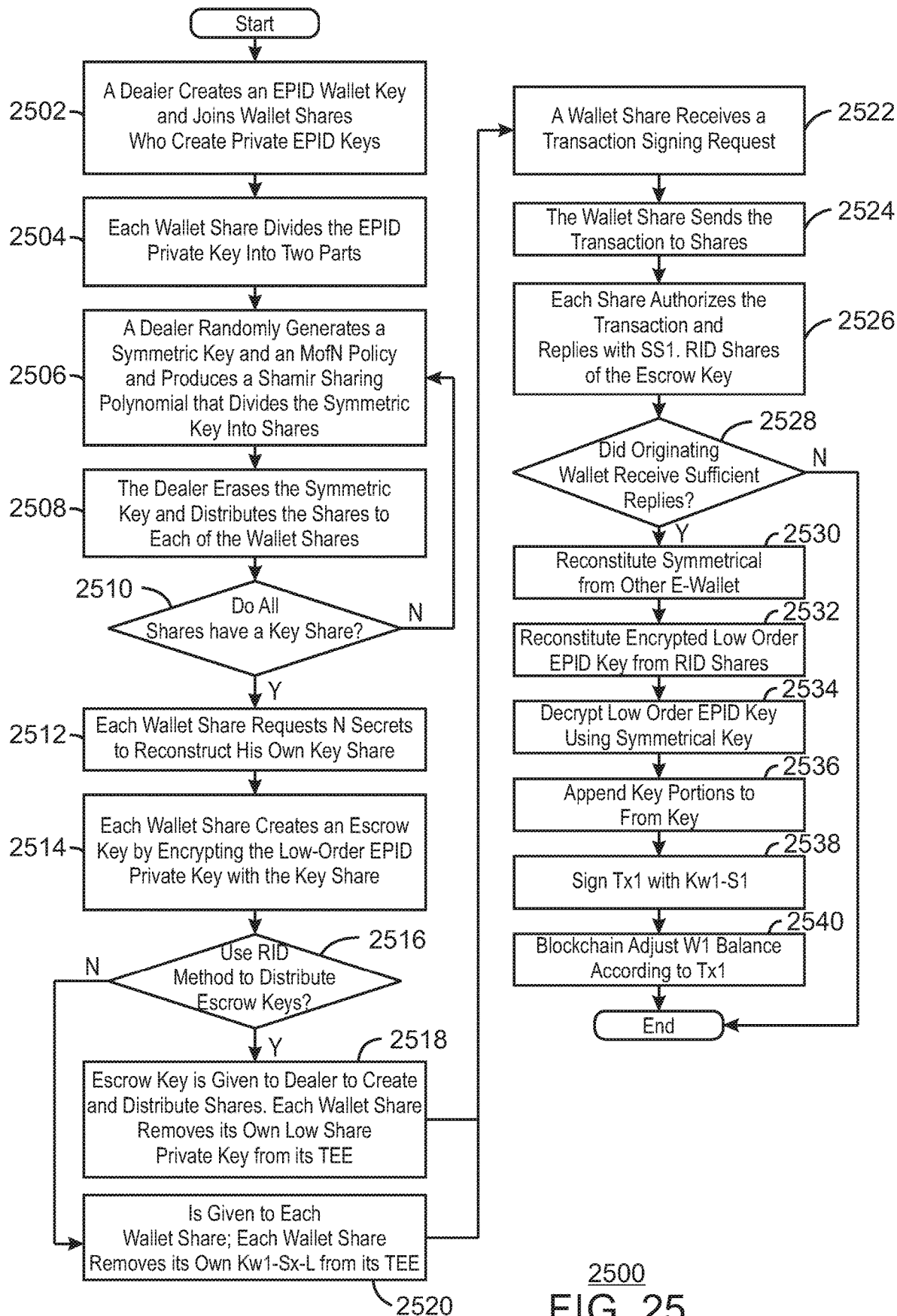
FIG. 25 is a process flow diagram of a method for securing a distributed e-wallet using secret sharing and an EPID key recovery, in accordance with some examples.

FIG. 25 is a process flow diagram of a method 2500 for securing a distributed e-wallet using secret sharing and an EPID key recovery, in accordance with some examples. The method 2500 begins at block 2502, when a dealer creates an EPID wallet key (Kw1) and joins e-wallet shares (S1 to Sn) that each create private EPID keys (Kw1-S1, . . . , Kw1-Sn). At block 2504, each e-wallet share divides the EPID private key into two parts, for example, a high part that includes the first half of the bits in the EPID private key and the low part that includes the second half of the bits in the EPID private key (high (H), low (L)). For example, for share S1 the EPID private key parts may be abbreviated as Kw1-S1-H and Kw1-S1-L.

At block 2506, a dealer randomly generates a symmetric key (Ks1) and an M of N policy and produces a Shamir sharing polynomial that divides the symmetric key (Ks1) into N key shares (KSx), wherein N is the number of e-wallet shares. At block 2508, the dealer erases the symmetric key (Ks1) and distributes the key shares to each of the N e-wallet shares.

At block 2510, a determination is made as to whether all e-wallet shares have a key share. If not, process flow returns to block 2506 to repeat the secret sharing.

At block 2512, each e-wallet share requests M secrets to reconstruct the local key (KSx). At block 2514, each e-wallet share (S1 to Sn) creates an escrow key ({Kw1-Sx-L}KSx) by encrypting a portion of the EPID private key with the key share (KSx) for the e-wallet share (S1 to Sn).

At block 2516, a determination is made as to whether an RID method is to be used to distribute escrow keys. If so, at block 2518 an escrow key is given to a dealer to create and distribute shares. Each e-wallet share (S1 to Sn), then removes its own low order private key (Kw1-SX-L) from its TEE.

If an RFID method is not to be used to distribute escrow keys at block 2516, at block 2520, the escrow key ({Kw1-Sx-L}KSx) for each e-wallet share is provided to every other e-wallet share, and each e-wallet share (S1 to Sn), then removes its own low order private key (Kw1-SX-L) from its TEE. Accordingly, the approach to key escrow may rely in an alternative, or more traditional, method not based on secret sharing. Instead, the whole key may be stored by at least one of the other wallets, as a backup to the first wallet. The backup wallet may be selected at random or in a round-robin fashion. There may be multiple backup keys stored with every wallet as well. If so, the backup key stored with the first wallet is redundant and may be removed. Other techniques for storing and providing backup keys may also be used.

At block 2522, an e-wallet share, such as S1, receives a transaction signing request for a transaction (Tx1). At block 2524 The wallet share, such as S1, sends the transaction signing request for the transaction (Tx1) to the other shares, such as S2 to Sn. At block 2526, each wallet share authorizes the transaction (Tx1), and replies with the authorized transaction and secret share 1 (SS1). If an RID method is used to distribute escrow keys, as determined at block 2516, the RID shares of the escrow key, such as {Kw1-S1-L} KS1, are sent.

At block 2528, a determination as made as to whether the originating e-wallet share, S1 in this example, has received a sufficient number of replies, for example, M replies of an M of N policy. If not, the process ends.

If, at block 2528, it is determined that sufficient numbers of replies have been received by the originating e-wallet share, process flow proceeds to block 2530. At block 2530, the key share for the originating e-wallet share is reconstituted from shared secret provided by other e-wallet shares. At block 2532, the encrypted portion of the EPID key, for example, the encrypted {Kw1-S1-L}KS1, may be reconstituted from RID shares. At block 2534 the portion of the EPID key, for example, Kw1-S1-L, may be decrypted using the symmetric key, KS1. The decrypted portion of the EPID key may be appended to the other portion of the EPID key, for example Kw1-S1-L may be appended to Kw1-S1-H to reform the original key, Kw1-S1. At block 2538, the transaction, Tx1, may be signed with the key, Kw1-S1. At block 2540, the signed transaction may be submitted to the blockchain for processing, and miners associated with the blockchain may adjust the balance of the wallet based on the transaction. The process then ends.

Figure 26:
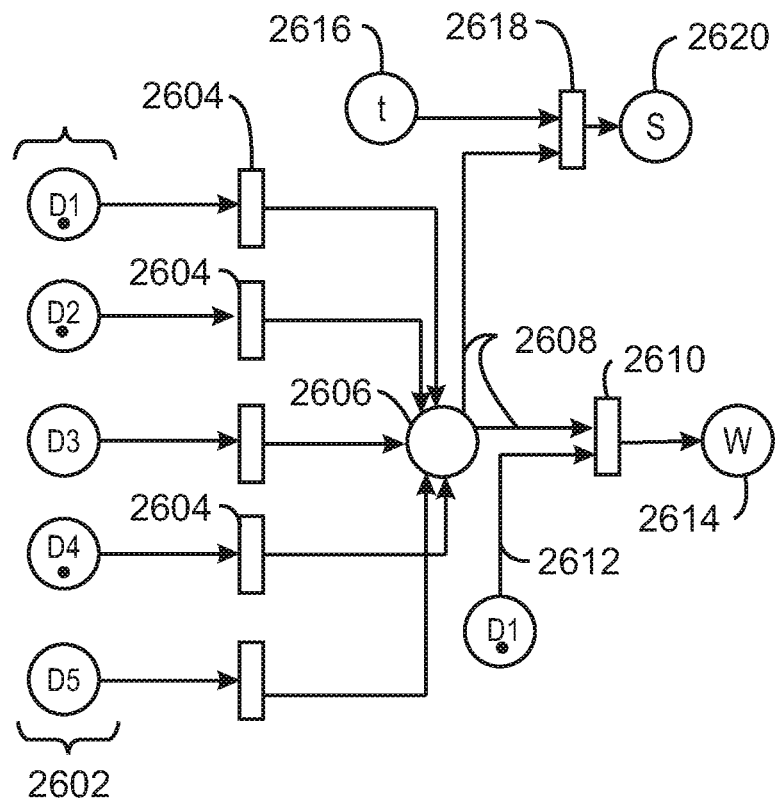
FIG. 26 is a schematic diagram of a Petri net describing how three out of five devices can elect one as master for larger withdrawals, in accordance with some examples.

FIG. 26 is a schematic diagram of a policy 2600 for a Petri net describing how three out of five devices can elect one device as a master device for larger withdrawals, in accordance with some examples. A blockchain contract execution environment, like Ethereum, allows the creation of transactions to unlock payment, and also allows Turing complete languages for writing and running programs whose internal state is part of the whole state of the blockchain. Changes in contract state are triggered by transactions invoking a user defined handle, or 'method' in object oriented terminology. Contracts themselves have a public key, or pub key, address, can invoke other contracts methods and can send/receive funds. This brings state integrity, fault tolerance and resistance to attacks to contracts along the same line of what already happens for Bitcoin payments.

Within this structure, the policy 2600 as described herein to manage a circle of personal devices 2604, wherein each personal device 2604 is able to command payments from a user's funds. The policy 2600 may be encoded in the form of a contract, or protected operational code, and its state may be decentralized on the blockchain. Accordingly, the contract implementing the policy 2600 may be secure, fault tolerant, and resistant to attacks.

A strength-of-authentication value may be included in the policy expression. The strength-of-authentication may be obtained from a wallet device that integrates a user authentication capability. For example, this may be a trusted execution environment (TEE) technology such as ARM Trust Zone, Intel SGX, Intel ME, Intel VT-x or TCG TPM, where a trusted path may connect a biometric, behavior-metric, password or multi-factor authentication mechanism such that release or use of the wallet key may be gated by user authentication. Furthermore, the type and strength of authentication may be mapped to a policy object identifier such as an ANSI X.509 OID, UUID or other policy identifier scheme. The policy OID is a parameter of the M of N policy scheme described below.

In this example, the user may have five (M) personal devices 2602, wherein each personal device 2602 has its own address public key, such as D1 0xd1 . . . , D2 0xd2 . . . , D3 0xd3 . . . , D4 0xd4 . . . , and D5 0xd5 . . . . With a majority M of N policy, any three of the five devices may elect a master. For example, D1, D2, and D4 may issue a command 2604 to select D1 as a master, such as "setMaster(0xd1 . . . )". The command may be provided to a vote tallying element 2606, which may issue a permission command 2608 to a master withdrawal 2610 if the M of N policy is met, such as three of five. The elected master, D1, may then issue a withdrawal command 2612 to complete the withdrawal 2614.

In some examples, if M out of N devices send a set Master transaction within a period T (e.g., 10 minutes) tracked by a timer 2616, then one of them is elected master, and its key may be used to withdraw all funds. If the timer expires 2618 before the transaction occurs, a vote sink 2120 may occur, banning the transaction. This may help to mitigate the effect of stolen devices by placing a time load on a transaction. Further, as described with respect to FIG. 27, M out of N devices may send a ban transaction within a period T (e.g., 10 minutes), causing one device to be banned from the contract. This may ban a device if lost or stolen from the contract.

Figure 27:
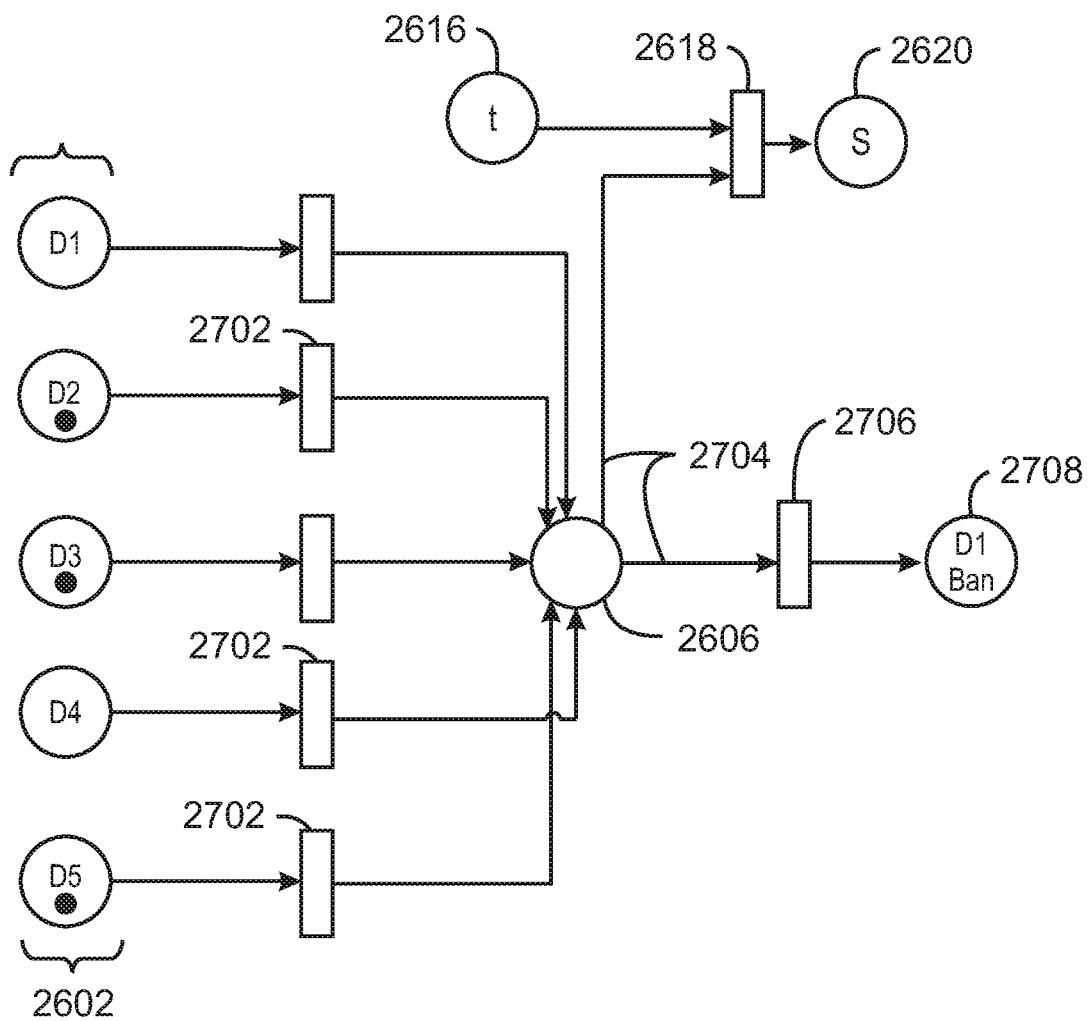
FIG. 27 is a schematic diagram of a process using a Petri net to describe how three out of five devices can ban a device, in accordance with some examples.

FIG. 27 is a schematic diagram of a process 2700 using a Petri net to describe how three out of five devices can ban a device, in accordance with some examples. Like numbered items are as described with respect to FIG. 26. In this example, three devices, such as D2, D3, and D5 may issue a ban device command 2702 to ban D1 from issuing a transaction. The vote tallying element 2606 may confirm that M of N devices have issued the command, and issue the ban D1 command 2704 devices to downstream devices. Upon receiving the ban D1 command 2704, the ban D1 action 2706 is implemented and D1 is banned 2708. Further the ban D1 command 2704 will expire the timer 2618 causing a vote sink 2620 to block the transaction.

Figure 28:
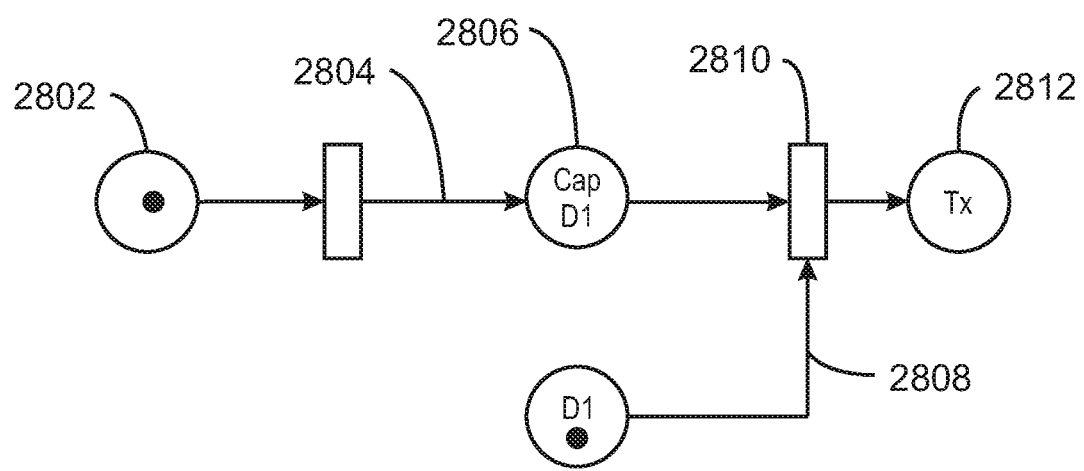
FIG. 28 is a schematic diagram of a process using a Petri net to describe how device spending is capped during a period, in accordance with some examples.

In addition to banning devices, as described with respect to FIG. 28, the policy can be defined informally with spending elements. For example, an element may define that one device can spend max M % (e.g. 10%) of funds over a period H (e.g. 48 hours).

FIG. 28 is a schematic diagram of a process 2800 using a Petri net to describe how device spending is capped during a period, in accordance with some examples. In this example, a new period starting 2802 results in the issuing of a balance 2804 providing a cap 2806 in the balance that can be spent by a single device, such as D1 in this example. When the device, D1, issues a spend command 2808, or transaction, it is compared 2810 against the cap 2806, and if the amount is less than or equal to the cap 2806 for that device, D1, the transaction 2812 is allowed to be completed.

In examples described herein, money is locked in a contract, such as on Ethereum. The contract allows only a user's personal devices to spend the money which is checked against prior defined conditions. The contract may be deployed with its own address/pub key 0x0C. An example in pseudocode for Ethereum is shown below:

```
contract Policy {
///list of addresses for authorized devices address[ ]
devices;
///max expenditure allowed for a single device in period
(eg. a day)
uint cap=1 ether;
///address of device temporary elected as master key
address master;
///quorum to elect or ban a device N=3;
function Policy(address [ ] _devices, unint _cap){
///constuctor code here
}]
function spend(address recipient, uint funds) {
///code here
///allow no more than cap in period of 24h
////if invoker is master key allow more
}
function set Master(address addr) {
///code here
///add one vote to addr to become master key
}
function ban(address addr){
///code here
///add one vote to addr to be banned
////if majority vote for ban, device is removed from
contract
}
}
```

A challenge facing e-cash systems based on blockchain technology is the destruction of an e-wallet containing e-cash, which will render the e-cash orphaned. The 'paper' value of the cash exchange may include orphaned e-cash but its lack of liquidity makes it impossible for the exchange to realize the value. Further, if an owner becomes incapable of accessing and managing the e-wallet, for example, the loss of a password, death, incapacity, or other issues, the e-cash is effectively orphaned. In techniques described herein, escrow arrangements may allow the retrieval of the lost or damaged share.

Figure 29:
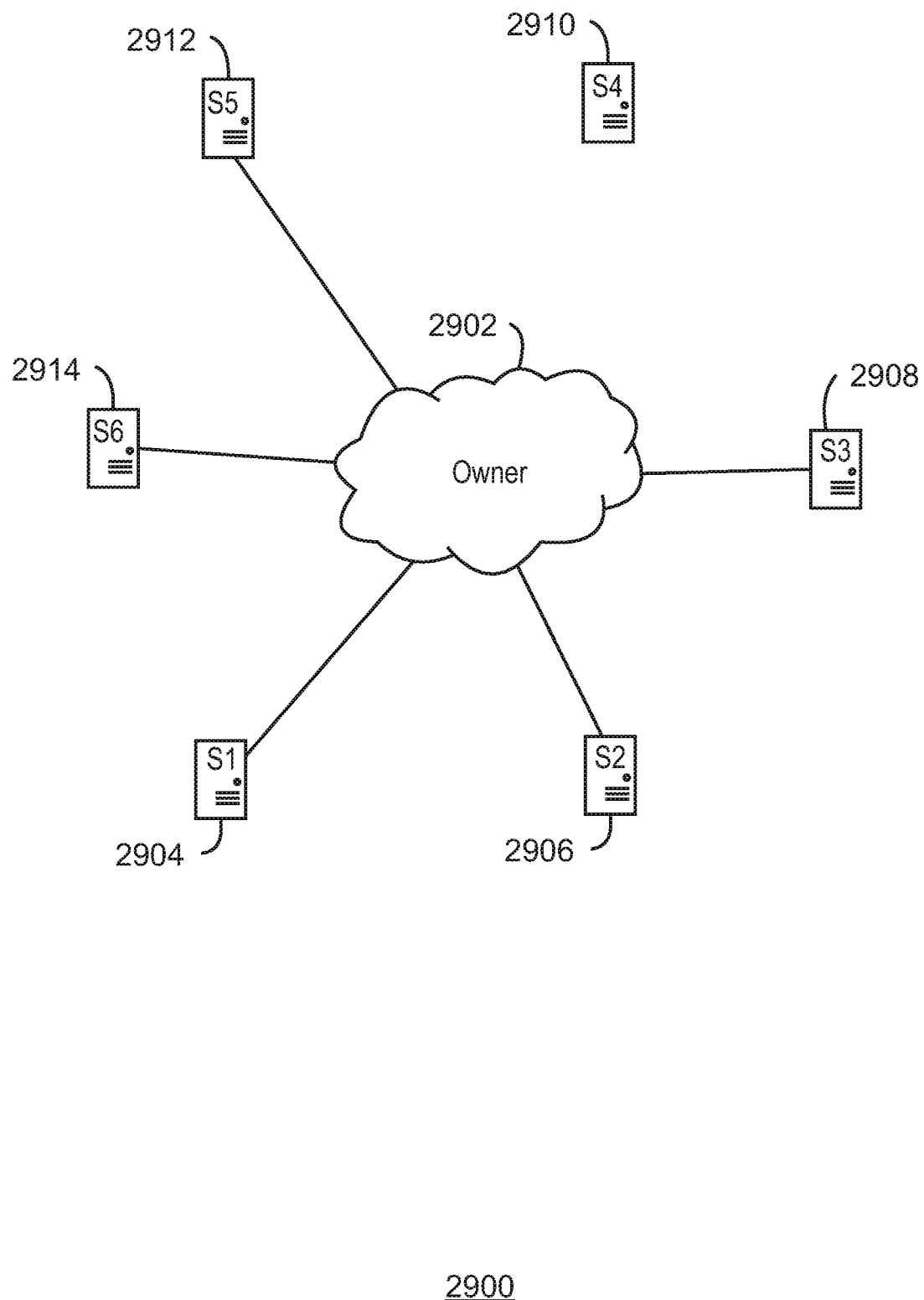
FIG. 29 is a schematic diagram of a process for recovery of a wallet using distributed escrow, in accordance with some examples.

FIG. 29 is a schematic diagram of a process 2900 for recovery of a wallet using distributed escrow, in accordance with some examples. Distributed wallet escrow is a process 2900 whereby an e-wallet key for an e-wallet share is escrowed by distributed peers. The owner retains a full copy of the key, but escrow agents may retain only a share that requires M of N shares to reconstitute. Shamir secret sharing, described herein, may be used to create the shares and to reconstitute them.

To ensure the interests of the owner 2902 are protected from malicious collusion by escrow agents, the owner 2902, specifies the conditions of key reconstitution as part of the initial share distribution. The policies and escrow agents may be disclosed to a blockchain via a transaction. Shares, for example, S1 2904, S2 2906, S3 2908, S4 2910, S5 2912, and S6 2914, are chosen using a modular divisor over a finite field, so that blockchain observers are not able to gain an advantage by colluding with any of the escrow agents when observing share reconstructions. Hence, the public values disclosed to the block chain in a transaction may include the number of shares (N). Other public values include M, which is the threshold to reconstitute a wallet key (Kw1), p which is the prime modular divisor of share values (x, F(x)), and S=(KS1, KS2, . . . , KSn), which is the escrow agent's public keys, authorized to reconstitute the wallet key. Policies describing conditions in which reconstitution is authorized may be represented as P=(P1, P2, . . . , Pn). The public values may also include the e-cash value, and the signature of items produced by the wallet key, Kw1. Thus, the opening escrow value may be a transaction, Tx1, posted to the blockchain, that is of the form: [M, N, p, policies, shareholders, e-cash] Kw1.

The e-cash value may be a small denomination that may be used to satisfy blockchain transaction clearing requirements. Alternatively, the e-cash value may be a larger amount that covers operational costs associated with a miner, or other party, who monitors the blockchain to identify conditions and perform reconstruction of the escrow key.

If an e-wallet key is lost, a device destroyed, or another condition of the escrow is observed by M shareholders, each shareholder notifies the blockchain with a transaction, Tx2. The transaction includes the escrow policy and evidence of the condition being true, and is signed using the key for that share. For example, if an escrow policy recognizes reconstitution upon the death of the key holder, then a statement of identity signed by the key holder, for example, an identity certificate, and a death certificate issued by a proper legal authority is signed by each of M shareholders and submitted to the blockchain.

The blockchain observers, or miners, may verify the validity of identity and death certifications and may look for subsequent transactions involving the Kw1. As long as the escrow policies are vetted, the blockchain miners may approve clearing transactions involving the wallet Kw1. If not, the blockchain miners may not approve clearing the transactions. It may be reasonable for the e-cash amount included in the escrow establishment transaction to be held in reserve for miners who may approve or deny clearing subsequent transactions involving the escrowed wallet key (Kw1).

The devices hosting the e-wallet shares, S1 2904, S2 2906, S3 2908, S4 2910, S5 2912, and S6 2914, as well as the owner 2902, may include any combinations of edge devices, fog devices, cloud devices, and the like, as described herein.

Figure 30:
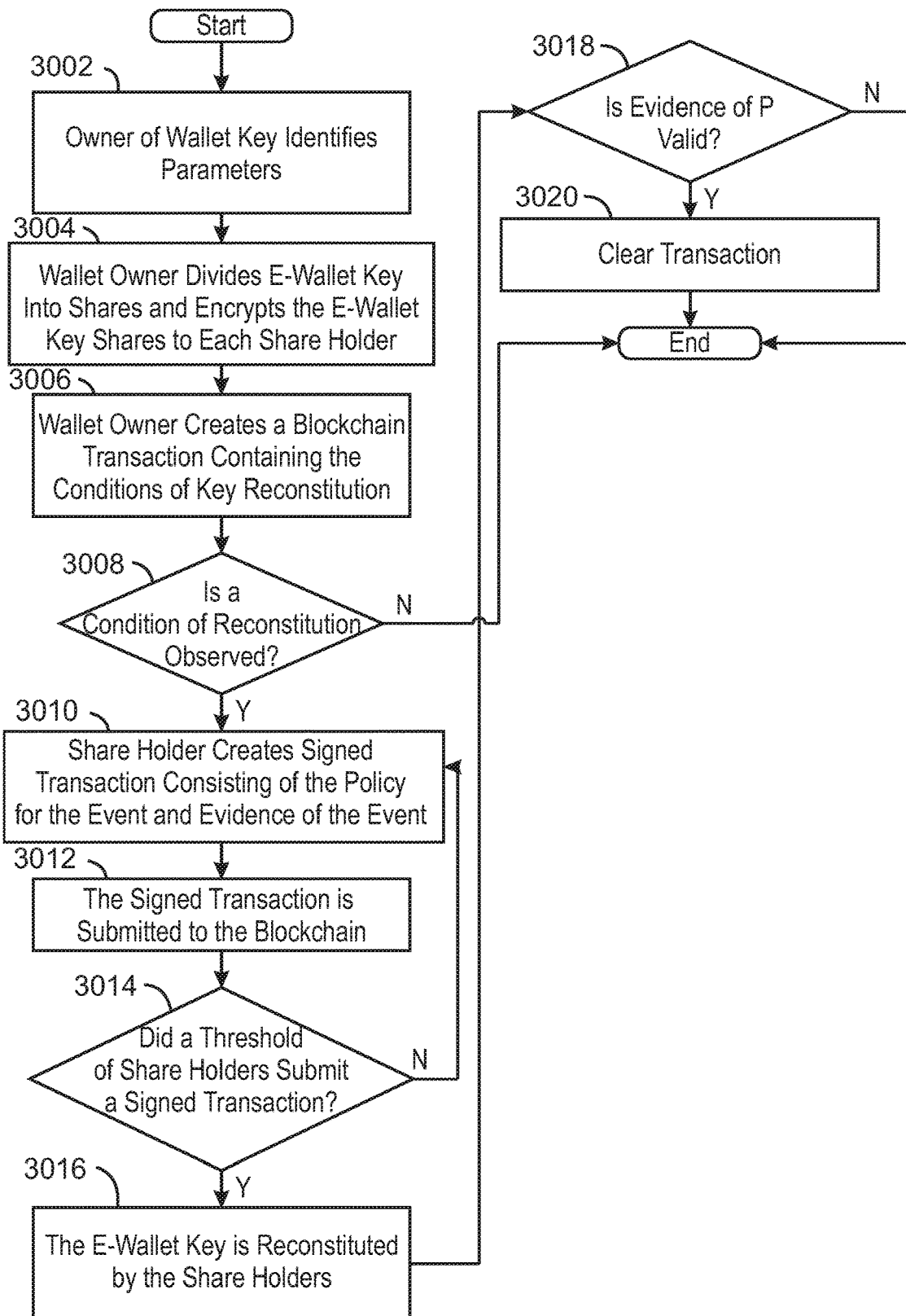
FIG. 30 is a process flow diagram of a method for the recovery of a wallet using distributed escrow, in accordance with some examples.

FIG. 30 is a process flow diagram of a method 3000 for the recovery of a wallet using distributed escrow, in accordance with some examples. The method begins at block 3002, when an owner of an e-wallet and associated key identifies key parameters for an escrow key reconstitution. The parameters include reconstitution policies (P=(P1, P2, . . . , Pn), shareholders (S=KS1, KS2, . . . , KSn), and an M of N secret sharing scheme that supports a finite field and the value 'p'.

At block 3004, the e-wallet key (Kw1) may be divided into shares (N=number of e-wallet shares), and encrypted. The e-wallet key shares are sent to each shareholder (S) using the shareholder secret key. At block 3006 the wallet owner creates a blockchain transaction (Tx1) containing the conditions of key reconstitution, such as [M, N, p, P, S, E-cash] Kw1, and posts the transaction.

At block 3008, a determination is made as to whether a condition of reconstitution is observed. If not, the method 3000 ends.

If a condition of reconstitution is observed at block 3008, at block 3010, the shareholder observing the condition creates a transaction (Tx2) including the policy for the event and evidence for the event, and signs the transaction. For example, the signed transaction Tx2 may be of the form [P, evidence of P]KSx, where KSx is the private key for the share observing the event (Sx). At block 3012, the signed transaction may be submitted to a blockchain, for example, posted to a blockchain on the device or sent in a transaction message to another device hosting a blockchain.

At block 3014, a determination is made as to whether a threshold number of shareholders submitted a reconstitution transaction, such as M of N shareholders. If so, at block 3016, the e-wallet key (Kw1) is reconstituted by the (N) shareholders of the e-wallet (W1). A transaction (Tx3) to spend the remaining funds in the wallet may be created, for example, the transfer the balance of funds to a new e-wallet. At block 2018, miners determine if the evidence of the event initiating the reconstitution is valid. If not, the method 3000 ends. If the evidence of the event is determined to be valid at block 2018, at block 2020 the transaction (Tx3) is cleared. The remaining e-cash created by the initial transaction (Tx1) may be recovered.

Figure 31:
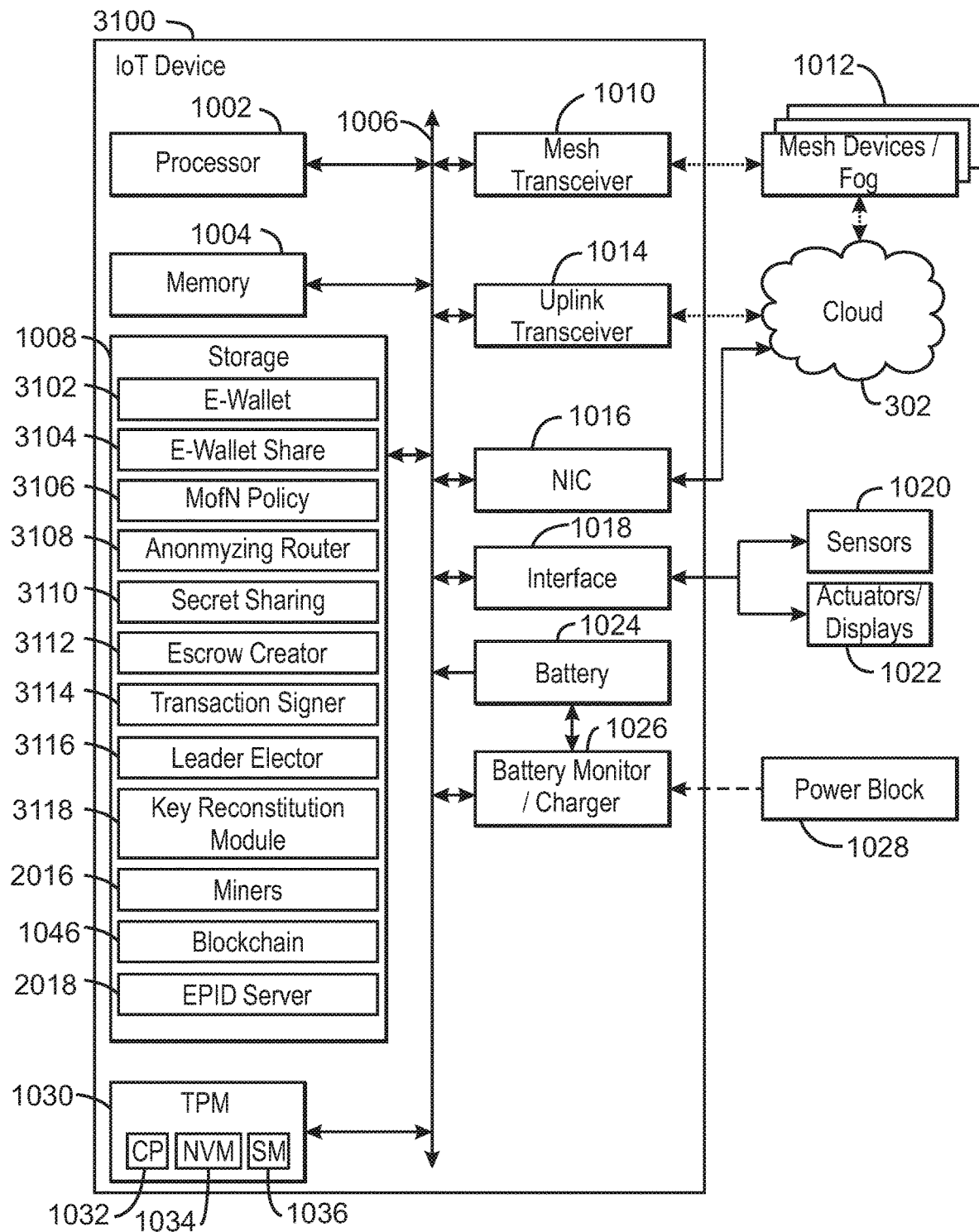
FIG. 31 is a block diagram of an example of components that may be present in an IoT device for implementing enhance security in multiple distributed e-wallets, in accordance with some examples.

FIG. 31 is a block diagram of an example of components that may be present in an IoT device 3100 for implementing enhance security in multiple distributed e-wallets, in accordance with some examples. Like numbered items are as described with respect to FIGS. 3, 10, and 20. It can be noted that different components may be selected and used for the IoT device 1000 discussed with respect to FIG. 10, and the IoT Devices 2000 and 3100 discussed with respect to FIGS. 20 and 31.

The mass storage 1008 may include a number of modules to implement the e-wallet security functions described herein. Although shown as code blocks in the mass storage 1008, it may be understood that any of the modules may be fully or partially replaced with hardwired circuits, for example, built into an application specific integrated circuit (ASIC). The mass storage 1008 may include an e-wallet (W1) app 3102 to generate displays, provision apps with keys, obtain input from users, and hold a balance and an EPID key pair (Kw1) that includes public and private keys. The e-wallet app 3103 may be linked to e-wallet shares on the same device, such as e-wallet share 3104, and e-wallet shares on other devices, for example, using a wallet linking module 2002, as described with respect to FIG. 20. The e-wallet app 3102 may be used to generate or enter an M of N policy 3106. The M of N policy 3106 may determine the number of units of a total number of units required for authorizing a transaction, reconstituting a key, electing a master device, or banning a device, as described with respect to FIGS. 22 to 30. The M of N policy 3106 may include a module including code configured to run in a protected blockchain, such as Ethereum, among others. An anonymizing router module 3108, such as a TOR router, may be used to circulate transactions among e-wallet shares for authorization.

A secret sharing module 3110 may be used to produce a shared secret, for example, to divide a key into shares that may be distributed among e-wallet shares. The secret sharing module may use a Shamir secret sharing algorithm, a seed tree, a Merkle tree, or any number of other techniques to generate a shared secret. An escrow creator 3112 may be used to create an escrowed key that may be provided to e-wallet shares, along with keys from other devices, to reconstitute a primary key. A transaction signer 3114 may sign a transaction for authentication prior to the transaction being posted to the blockchain 1046, for example, by reconstituting a private key, if needed, checking that no prior signatures are on a blacklist, and signing the transaction with a private key. A leader elector 3116 may be used with leader electors in other devices to choose a master device for completing a transaction. This may follow an M of N policy as described herein. The leader elector 3116 may also be used in a procedure with M of N other devices to ban a device from completing transactions. A key reconstitution module 3118 may be used to reconstitute a key from shares of other keys provided to each of the shares of a multiple distributed wallet. The key reconstitution module 3118 may be used in layered processes to reconstitute a symmetric key from shared secret provided by other e-wallet shares, then reconstitute a portion of an EPID key from shares using the reconstituted symmetric key.

Figure 32:
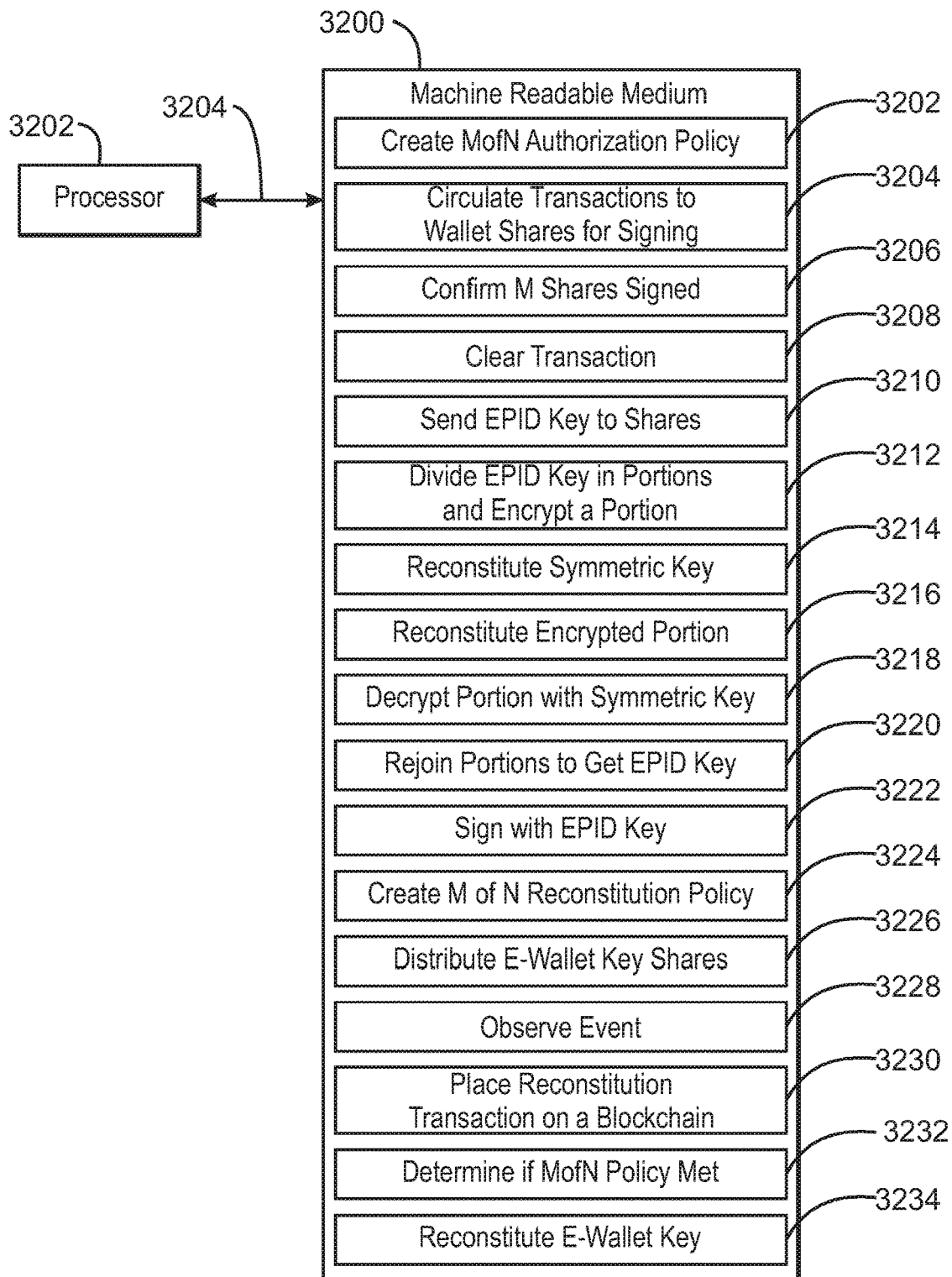
FIG. 32 is a block diagram of a non-transitory, machine readable medium 3200 including code that, when executed, directs a processor to implement enhanced security procedures for multiple distributed e-wallets, in accordance with some examples.

FIG. 32 is a block diagram of a non-transitory, machine readable medium 3200 including code that, when executed, directs a processor to implement enhanced security procedures for multiple distributed e-wallets, in accordance with some examples. The processor 1102 may access the non-transitory, machine readable medium 3200 over a bus 1104. The processor 1102 and bus 1104 may be selected as described with respect to the processor 1002 and bus 1006 of FIG. 10. The non-transitory, machine readable medium 3200 may include devices described for the mass storage 1008 of FIG. 10 or may include optical disks, thumb drives, or any number of other hardware devices.

The non-transitory, machine readable medium 3200 may include code 3202 to direct the processor 1102 to create M of N authorization policies for authorizing transactions, reconstituting keys, reconstituting escrowed keys, electing a master device as a transaction leader, banning a device, and the like as described with respect to FIGS. 22 to 30. Code 3204 may be included to direct the processor 1102 to circulate transactions to wallet shares for signing, for example, by routing transactions to randomly selected devices through an anonymizing router. Code 3206 may be included to direct the processor 1102 to confirm that M shares of N have authorized a transaction, allowing the transaction to proceed. Code 3208 may be included to direct the processor 1102 to clear an authorized transaction that has been posted a blockchain.

The non-transitory, machine readable medium 3200 may include code 3210 to direct the processor 1102 to receive an EPID key in an e-wallet share. Code 3212 may be included to direct the processor 1102 to divide the EPID key into portions and encrypt a portion. Code 3214 may be included to direct the processor 1102 to reconstitute a symmetric key from shared secret provided by M of N devices. Code 3218 may be included to direct the processor 1102 to decrypt an encrypted portion of an EPID key using a reconstituted symmetric key. Code 3220 may be included to direct the processor 1102 to rejoin the decrypted portion of the EPID key with another portion of the EPID key to form a complete EPID key. Code 3222 may be included to direct the processor 1102 to sign a transaction with the complete EPID key.

The non-transitory, machine readable medium 3200 may include code 3224 to create an M of N reconstitution policy for reconstituting a key if an event, such as if a device is lost or damaged or a user passes away. Code 3226 may be included to direct the processor 1102 to distribute e-wallet key shares across e-wallet shares. Code 3228 may be included to direct the processor 1102 to observe that the event for reconstitution has occurred. Code 3230 may be included to direct the processor 1102 to place a reconstitution transaction on a blockchain. Code 3230 may be included to determine if the conditions for an M of N policy have been met. Code 3234 may be included to reconstitute an e-wallet key if the conditions for the M of N policy have been met.

E-wallet design today relies on a wallet app to establish if an e-cash transaction is authorized by a user. The wallet app may be subject to attack by malware resulting in unauthorized, or malicious, approval of e-cash transactions. Contextual information may be used to further secure e-wallets. For example, strong biometrics may be employed, depending on the physical capabilities of the device containing an e-wallet share. The biometrics may be combined with context sensors, such as location, proximity, and the like, as a condition of access to a TEE containing a wallet application.

This may improve user convenience without sacrificing security. Further, the user may be able to engage in multiple e-cash transactions subsequent to an initial multi-factor authentication event, so long as context sensors sense that the user is physically present near the e-wallet device. The wallet app may also employ trusted output and input to a display confirming a transaction, for example, using Intel protected transaction display technology.

Figure 33:
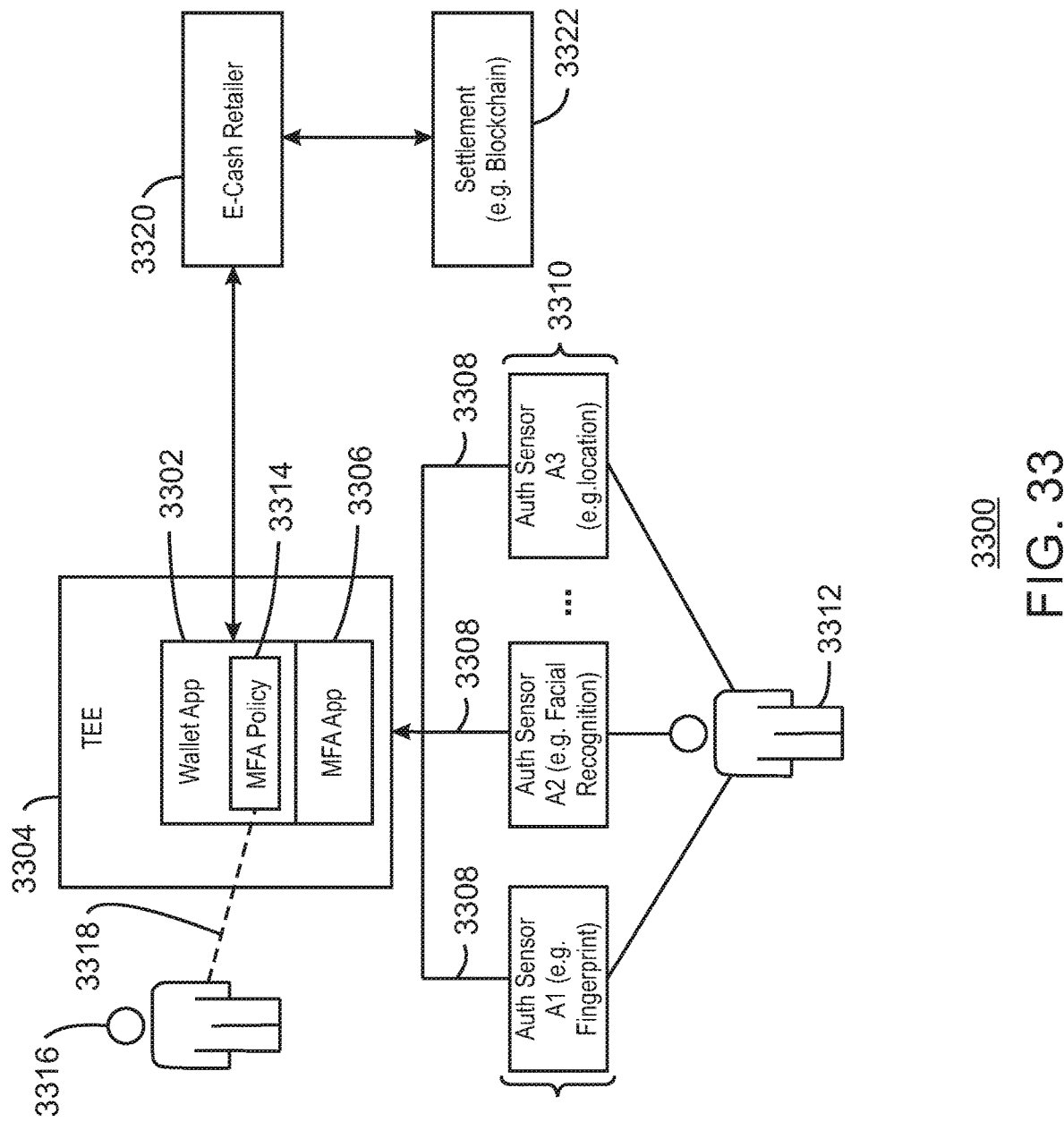
FIG. 33 is a schematic diagram of a process for contextual authentication of a wallet app, in accordance with some examples.

FIG. 33 is a schematic diagram of a process 3300 for contextual authentication of a wallet app 3302, in accordance with some examples. This invention may use a trusted execution environment (TEE) 3304, for example, an Intel SGX, Intel CSME, ARM Trust Zone, among others, to harden the wallet application 3302. In the process 3300, a contextual and multi-factor authentication (MFA) application 3306 has connectivity through a trusted-path 3308 to MFA and context sensors 3310. As a result, malware is less able to masquerade as the legitimate user 3312 without physically compromising the sensors 3310. The wallet app 3302 is instrumented with a MFA policy 3314 that directs the MFA app 3306 to establish the presence of the legitimate user 3312 during which the signing key for the wallet app 3302 may be accessible. If the detected presence at the legitimate user 3312 is lost, or if a timeout is exceeded, access to the wallet key may be automatically denied. In this example, the wallet app 3302 in the TEE 3304, the trusted path 3308, and the context sensors 3310 may all be hosted by a single edge device, such as a smartphone, computer, or the like. The e-cash retailer 3320 may be hosted by a point-of-sale system, such as a retailer in a store or an e-commerce retailer located remotely. The blockchain 3322 (or settlement system) may be hosted by an MEC server, a commercial service provider, and the like. Other systems described herein, such as the PUFS system described with respect to FIGS. 36-40, and the RFID systems, described with respect to FIGS. 42-48, may be part of the edge device for the user, such as the smartphone, computer, or other system used for e-wallet transactions.

Two wallet roles are defined, a wallet owner, or legitimate owner 3312, and a wallet user 3316. The legitimate owner 3312 may set an MFA policy 3314 that is configured in the wallet app 3302 in the TEE 3304. This may be accomplished using the TEE trusted update features common to a TEE, such as SGX SW update, TPM NVM, CSME secure storage and the like. Changes to the MFA policy 3314 require different credentials and access policy from those used to access 3318 wallet keys by the wallet user 3316. The wallet user 3316 may be a group of users setting policies for a permissioned or semi-permissioned blockchain where the blockchain policies and procedures may direct or otherwise specify a MFA policy and practice relating to user authentication involving e-wallet access in connection with a user's participation on the blockchain.

A transaction may be further protected subsequent to approval by the wallet user 3312. The authentication context, for example, as defined by the MFA policy 3314, may be transmitted to an e-cash retailer 3320, for consideration. An attestation, for example, based on a key from the TEE 3304, may establish the trustworthy implementation of the wallet app 3302, MFA app 3306, and connection to the MFA and context sensors 3310. The e-cash retailer 3320 may require a specific level of hardening to defray transaction costs. The context information may further contain a representation of the wallet policy, MFA Policy 3314, used to allow access to the transaction key. The retailer may further defray transaction cost by requiring a certain level of authentication and context. For example, the retailer may offer a discount on goods and services in exchange for use of a strong MFA policy 3314.

The clearing service 3322, using a blockchain, may take authentication context into account when clearing the transaction. For example, blockchain chain miners may verify attestation and MFA policies meet a standard set by the community of miners that helps to prevent the blockchain from allowing malicious or illegal e-cash transactions involving an e-wallet.

Figure 34:
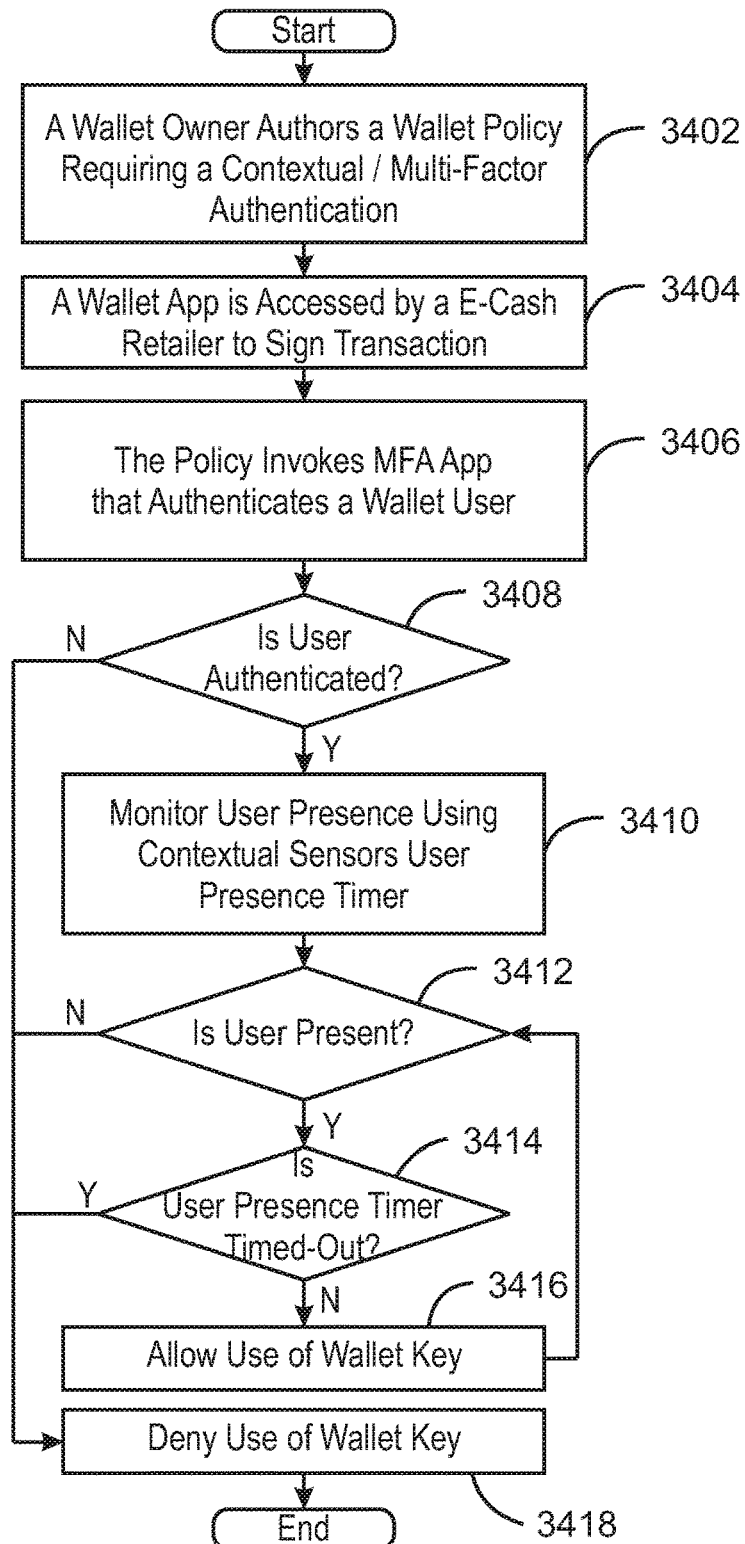
FIG. 34 is a process flow diagram of a method for the contextual authentication of an e-wallet, in accordance with some examples.

FIG. 34 is a process flow diagram of a method 3400 for the contextual authentication of an e-wallet, in accordance with some examples. The method 3400 begins at block 3402, when a wallet owner creates a wallet policy requiring a contextual or multifactor authentication, which must be met before the wallet is allowed to perform a transaction. At block 3404 the wallet app is accessed by an e-cash retailer to sign a transaction (Tx1). At block 3406, the policy invokes and MFA at that authenticates a wallet user.

At block 3408, a determination is made as to whether the user is authenticated. If so, at block 3410, the user presence is monitored using contextual sensors, such as motion, sound, location, proximity, and the like. A user presence timer is set. At block 3412, a determination is made as to whether the user is present. If so, at block 3414, a determination is made as to whether the user presence timer has timed out. If not, at block 3416, use of the wallet key (Kw1) is allowed to complete the transaction (Tx1).

If the user is not authenticated at block 3408, process flow proceeds to block 3418. Further, if the user is not determined to be present at block 3412 or the user presence has timed out at block 3414, process flow also proceeds to block 3418. At block 3418 use of the wallet key (Kw1) is denied.

Figure 35:
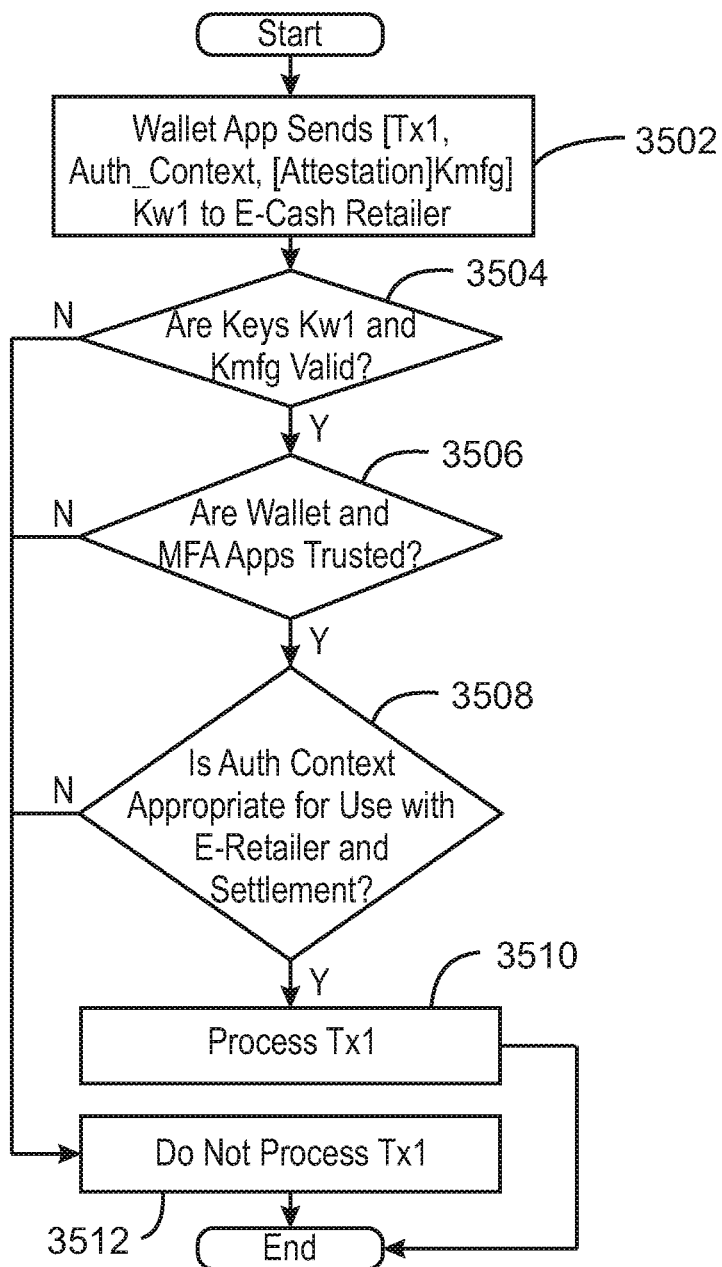
FIG. 35 is a process flow diagram of a method for the contextual authentication of an e-wallet by an e-cash retailer, in accordance with some examples.

FIG. 35 is a process flow diagram of a method 3500 for the contextual authentication of an e-wallet by an e-cash retailer, in accordance with some examples. The process begins at block 3502, when a wallet app sends a transaction, an authorization context, and an attestation signed using a manufacturer's key (Kmfg) to an e-cash retailer. The information is signed using the e-wallet's key (Kw1). At block 3504, the e-cash retailer determines if the e-wallet's key, Kw1, and the manufacturer's key (Kmfg) are valid. If so, at block 3506, the e-cash retailer determines if the e-wallet and the MFA apps are trusted. If so, at block 3508, the e-cash retailer determines if the authorization context is appropriate for use with the e-cash retailer and the settlement system, for example, if the e-cash retailer has access to the appropriate blockchain. If so, at block 3510, the transaction is processed.

If the keys are determined not to be valid at block 3504, or the wallet and MFA apps are determined not to be trusted at block 3506, or the authorization context is determined not to be appropriate for use with the e-cash retailer and 3508, process flow proceeds to block 3512. At block 3512, the e-cash retailer refuses the transaction and the method 3500 ends.

In addition to the other techniques described herein, e-wallet applications may be protected from theft by incorporating physically unclonable functions (PUFS). PUFS are functions that may be generated in hardware which are easy to evaluate but difficult to simulate. A PUF may be different between devices, but remain the same under different environmental conditions, providing an identification measurement. For example, the ratio of the timing of a race condition through a series of flip-flops in a circuit may be the same for the circuit under different environmental conditions, but may be different from other circuits even if those circuits use the same arrangement of flip-flops. PUFS may be based on optical measurements, magnetic measurements, or memory technologies, among many others.

Figure 36:
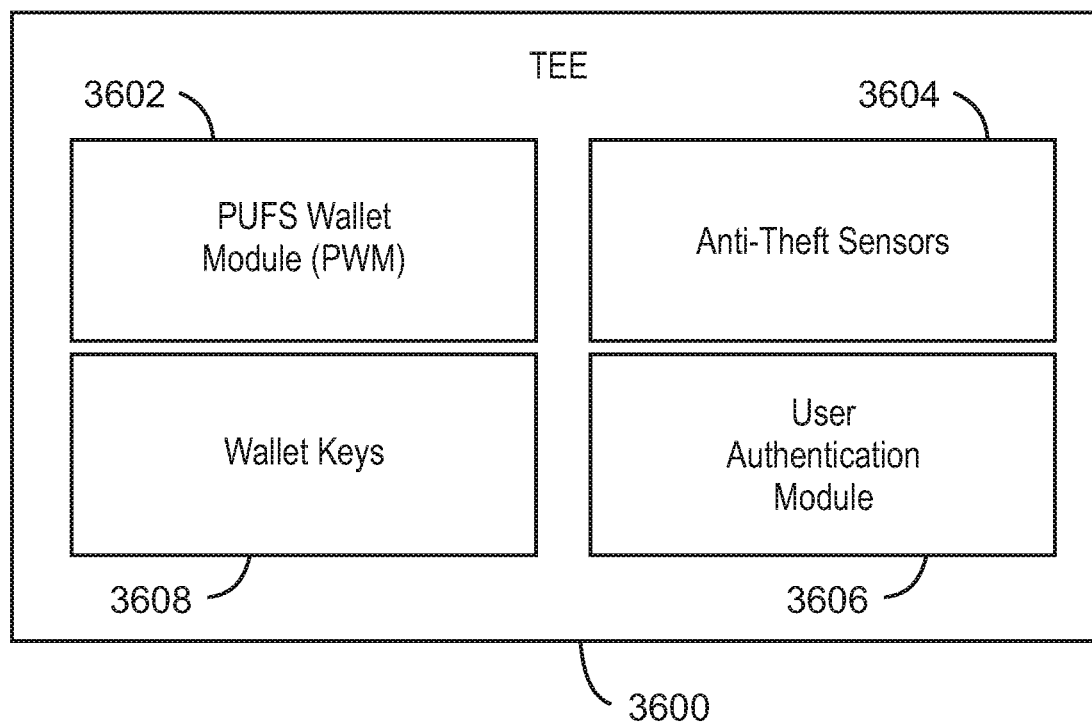
FIG. 36 is a block diagram of a trusted execute environment (TEE) that may be used for implementing PUFS to secure an e-wallet, in accordance with some examples.

FIG. 36 is a block diagram of a trusted execute environment (TEE) 3600 that may be used for implementing PUFS to secure an e-wallet, in accordance with some examples. Distributed as well as centralized wallet applications can be protected from theft by incorporating a wallet module, or app, that uses PUFS, termed a PUFS wallet module (PWM) 3602. The PWM 3602 may be used with antitheft sensors 3604 and a user authentication module 3606 to authorize use of the wallet keys 3608. The antitheft sensors 3604 and user authentication module 3606 may be implemented as described with respect to FIGS. 33 to 35.

Figure 37:
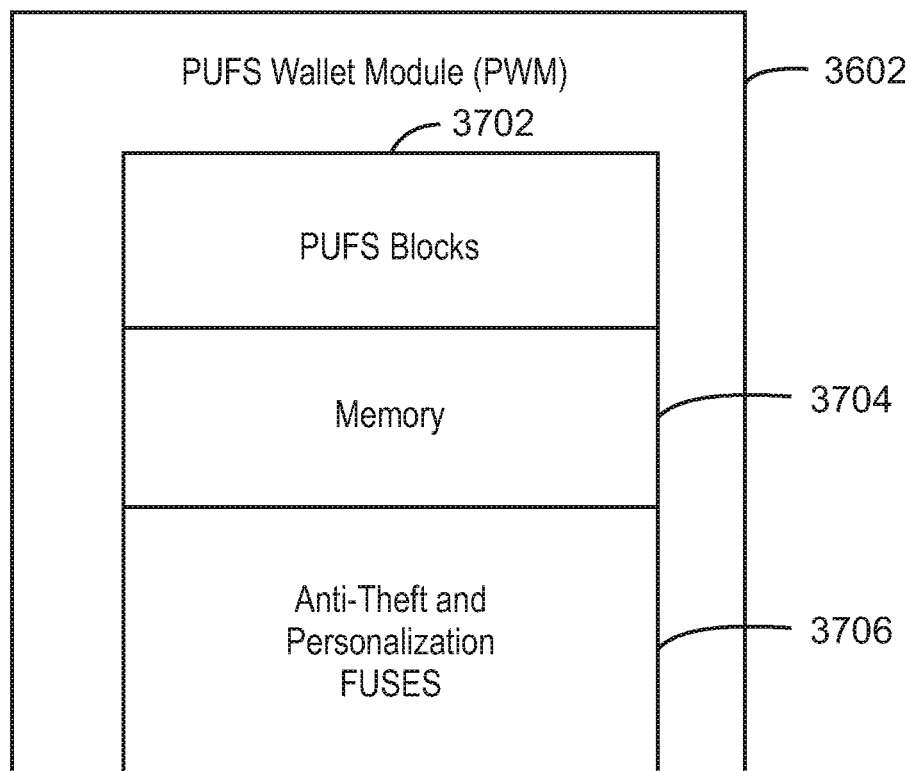
FIG. 37 is a block diagram of a PUFS wallet module (PWM) 3602 used for securing an e-wallet, in accordance with some examples.

FIG. 37 is a block diagram of a PUFS wallet module (PWM) 3602 used for securing an e-wallet, in accordance with some examples. The PWM 3602 may include one or more PUFS blocks 3702 that implement a PUF. The PWM 3602 may include a memory to produce PUF measurements, such as a domain wall core memory. A domain wall core memory holds data in magnetic domains along a conductor. The domain wall core memory may be used to provide a PUF, in addition to storing data. Antitheft and personalization fuses may be present to allow personalization of the PWM 3602 or to inactivate the PWM 3602 in case of incorrect credentials or other problems that may indicate theft.

Figure 38:
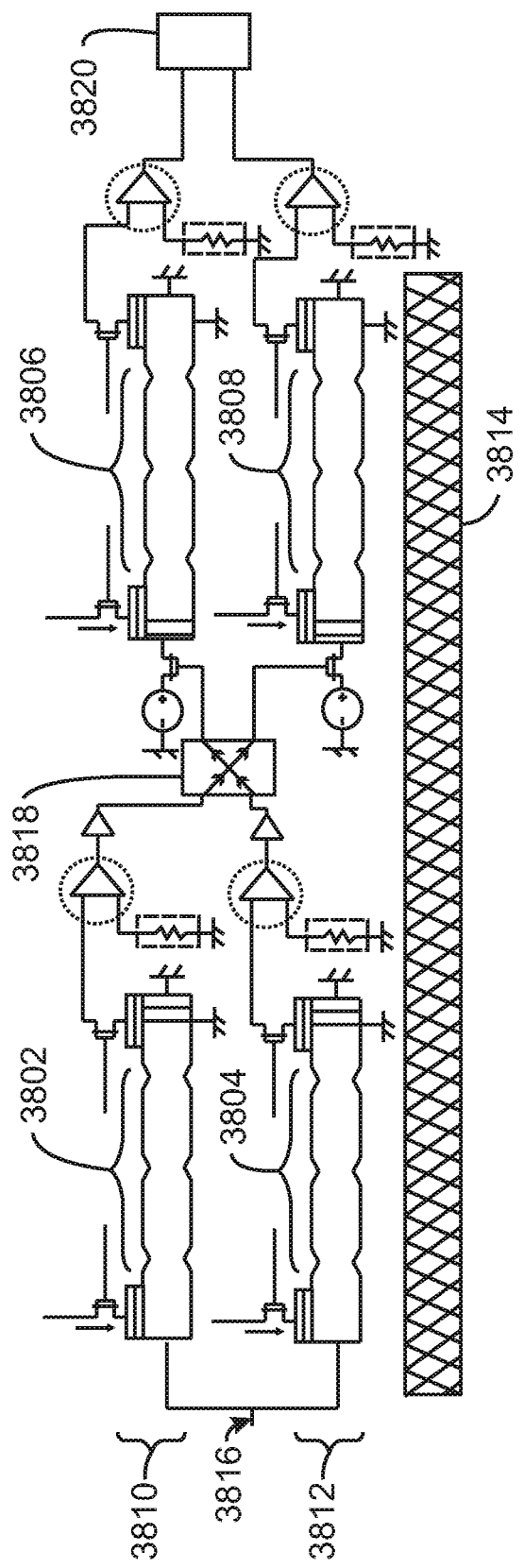
FIG. 38 is a schematic diagram of a domain wall relay circuit 3800 for implementing a PUF to secure an e-wallet, in accordance with some examples.

FIG. 38 is a schematic diagram of a domain wall relay circuit 3800 for implementing a PUF to secure an e-wallet, in accordance with some examples. In this example, a domain wall apparatus provides PUFS that operate on a principle of measuring magnetic spintronic acceleration in a substrate. Domain wall PUFs may be realized in multiple forms such as a core memory, flash memory and nanowire relays, as shown in FIG. 38.

In this example, the domain wall stores data in four pairs of nanowires 3802, 3804, 3806, and 3808. The circuits include two paths, an upper path 3810, and a lower path 3812. The lower path 3812 is closer to a magnetic substrate 3814, which may affect the speed of data transmission along the lower path 3812. The effects of fuses on the magnetic properties of a substrate may alter the PUFs behavior without impacting the normal expected operation of memory function.

A challenge signal 3816 is introduced upstream of the first pair of nanowires 3802 and 3804. The signal is flipped in a cross-over block 3818 so that the signal in the lower nanowire pair 3804 goes through the upper nanowire pair 3806, and vice versa. An arbiter 3820 determines the relationship between the pulse trains following the different paths, providing the measurement.

An e-wallet may further be personalized using IC fuses that when blown change the magnetic properties of the PUFs substrate 3814. The user takes possession of the TEE containing the PUFs blockchains and blows the personalization fuses. This establishes a PUF behavior that differs from that observed by the manufacturer.

The user may configure the e-wallet for anti-theft by specifying conditions by which other fuses, termed anti-theft fuses, may be blown. This may include values observable by anti-theft sensors such as a change in capacitance of the IC package containing the TEE, or a geo-fence perimeter where it is safe to use the wallet or conversely an area where it is unsafe to use. If the anti-theft sensors detect a stolen state, the anti-theft fuses are blown causing the magnetic properties of the PUFs substrate to be altered, affecting the PUFs response to the challenge voltages.

Further, triggering of a PUFs theft detection mechanism may further trigger removal of e-wallet keys, including peer wallet escrowed keys, escrowed key shares, or other key shares. It may also trigger re-constitution of removed keys on a peer wallet using escrowed keys or key shares on yet other wallet peers, so that the compromised wallet can be reconstituted on a new e-wallet or e-wallet share.

The user may also configure a user PIN value where PIN digits correspond to challenge voltages that may be supplied to the PUFs blockchain. The response voltages are read by a user authentication module that compares the responses with a registered set of expected response voltages. If the response voltages match the registered voltages, the user is authenticated and access to wallet signing keys may be granted.

The memory associated with a PUFS mechanism may be used to store additional values such as the user PIN, to add more bits of entropy than are available using the PUFs mechanism. This may further improve user authentication.

The invention may further use the PUFs responses to further authenticate the wallet transaction by including the PUFs identification (ID) in the transaction data. A dispute regarding two wallets spending the same e-cash could be resolved by comparing the PUFs ID with the wallet that can produce the expected response voltages.

Figure 39:
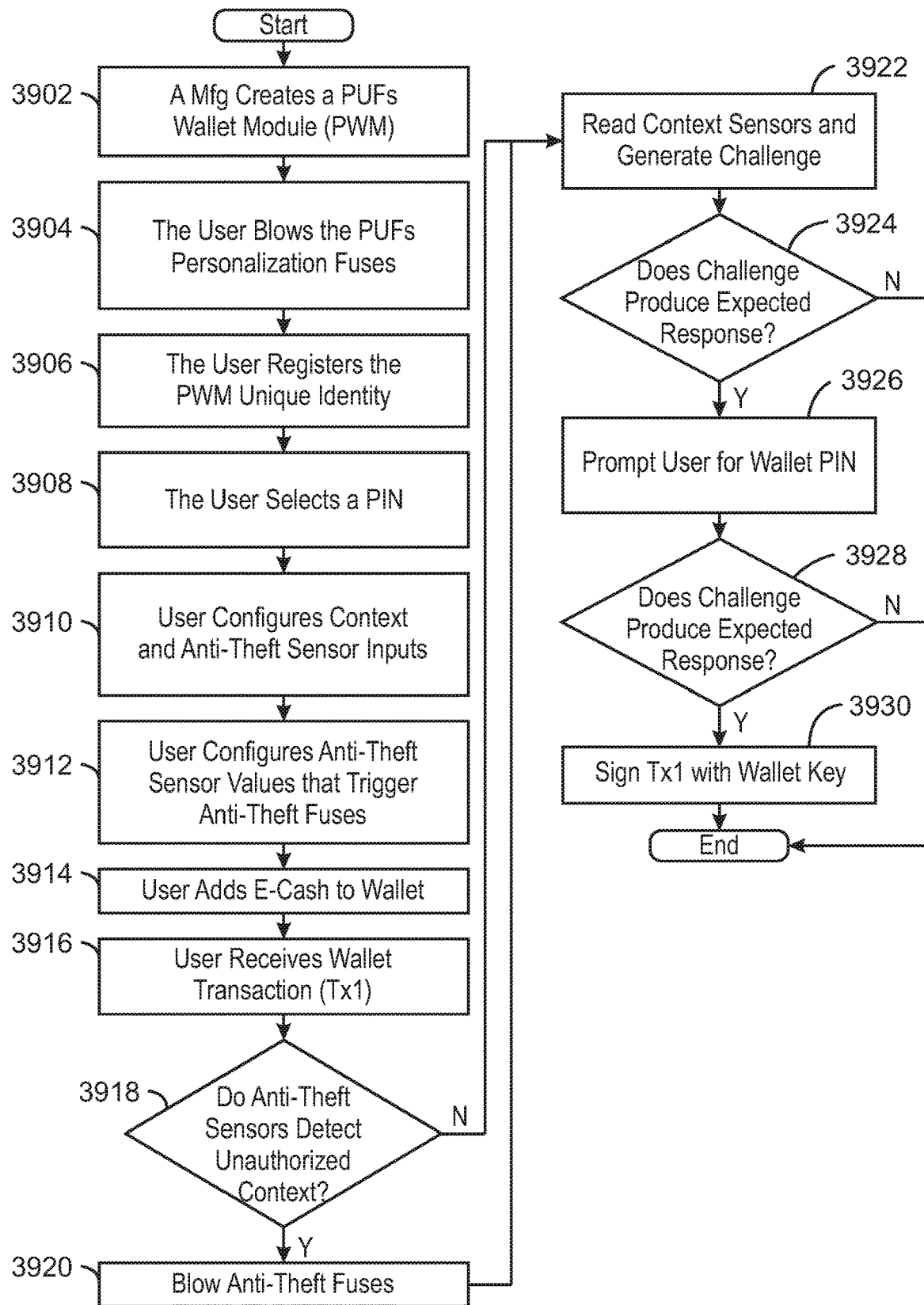
FIG. 39 is a process flow diagram of a method for increasing the security of an e-wallet using PUFS, in accordance with some examples.

FIG. 39 is a process flow diagram of a method 3900 for increasing the security of an e-wallet using PUFS, in accordance with some examples. The method starts at block 3902 when a manufacturer creates a PUFS wallet module (PWM). At block 3904, a user may blow the PUFS personalization fuses in order to change the response from the manufacturers settings. At block 3906, the user may register the PWM's unique identity, for example, in a nonvolatile memory in a TEE. At block 3908 the user selects a personal identification number (PIN).

At block 3910, the user may configure context and antitheft sensor inputs. The context sensor inputs may be set and used as described with respect to FIGS. 33 and 34. At block 3912, the user may configure antitheft sensor values that will trigger the blowing of antitheft fuses. At block 3914, the user adds e-cash to the e-wallet.

At block 3916, the user receives or generates a wallet transaction (Tx1). At block 3918, a determination is made as to whether the antitheft sensors detect unauthorized context. If so, at block 3920, the antitheft fuses are blown.

At block 3922, the context sensors are read and a challenge is generated. At block 3924, a determination is made as to whether the challenge produce the expected response. If not, such as if blowing the antitheft fuses has created a different response, the method 3900 ends.

If, at block 3924, the challenge has produced the expected response, at block 3926, the user is prompted for a wallet PIN. The wallet PIN is used to generate another challenge, which is used at block 3928 to determine if the challenge produces the expected response. If not, such as if a user enters an incorrect pin, the method 3900 ends. At block 3930, the transaction is signed with the wallet key.

Figure 40:
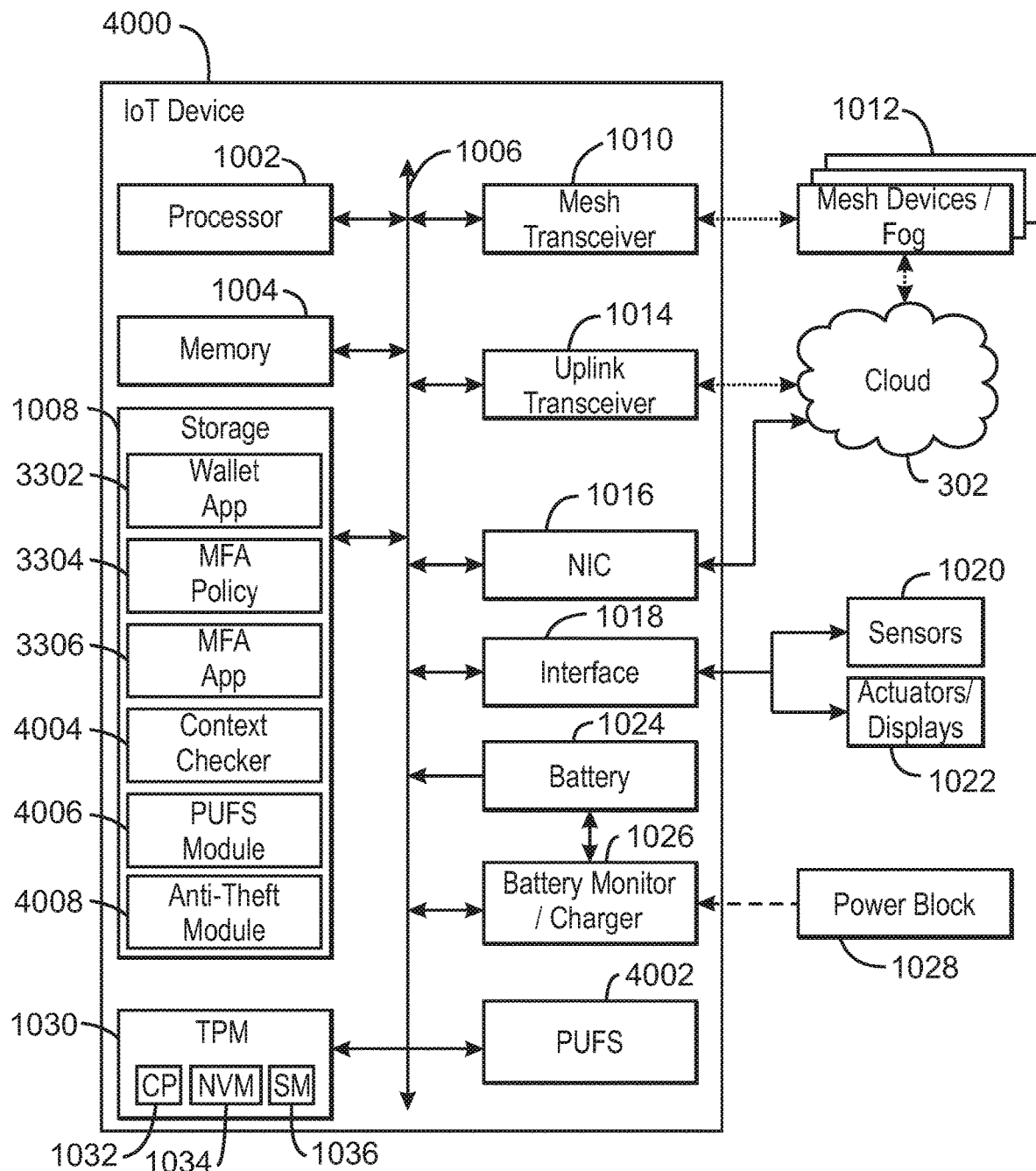
FIG. 40 is a block diagram of an example of components that may be present in an IoT device for implementing multiple distributed e-wallets, in accordance with some examples

FIG. 40 is a block diagram of an example of components that may be present in an IoT device 4000 for implementing multiple distributed e-wallets, in accordance with some examples. Like numbered items are as described with respect to FIGS. 3, 10, and 33. It can be noted that different components may be selected and used for the IoT device 1000 discussed with respect to FIG. 10, and the IoT Devices 2000 and 3100 discussed with respect to FIGS. 20 and 31.

The IoT device 4000 may include a PUFS module 4002 that uses physically unclonable functions to protect and e-wallet. The PUFS module 4002 may use the circuit of FIG. 38, or other circuits that can generate PUFS, including optical circuits, magnetic circuits, and others as described herein. As described with respect to FIGS. 10 and 20, the TPM 1030 may be used to implement a trusted execute environment (TEE) in which modules implementing the security functions may operate. The sensors 1020 may include sensors that determine context, user proximity, and the like as described with respect to the authorization sensors 3310 of FIG. 33. The sensors 1020 may also include input devices that allow for the control of the transaction, including, for example, entry of a PIN to authorize the transaction. The actuators/display 1022 may include any number of devices that take action or provide output, including, for example, devices that may lock the IoT device 4000 to a sales terminal while the transaction is being completed. Other devices that may be included in the actuators 1022 are displays, lights, and other output devices that may indicate the status of the transaction, such as red or green lights that may indicate the transaction status by color. The actuators 1022 may include more complex displays, such as a touch screen or other display, that provides detailed information and control entry, for example, to select the wallet app 3302 for use, enter credentials, enter transaction amounts, and enter PINs, among others.

The mass storage 1008 may include a number of modules to implement the context authentication functions described herein. Although shown as code blocks in the mass storage 1008, it may be understood that any of the modules may be fully or partially replaced with hardwired circuits, for example, built into an application specific integrated circuit (ASIC). Modules described with respect to FIG. 20, such as a wallet linker module 2002 and a wallet manager 2004 may be present to implement the same functions. The mass storage 1008 may include a wallet app 3302, a MFA policy 3304, and a MFA at 3306, as described with respect to FIGS. 33 and 34. In some examples, the wallet app 3302 may be replaced with the PUFS wallet module 3602, as described with respect to FIG. 36.

A context checker 4004 may be included if the IoT device 4000 is clearing transactions from wallet apps in other IoT devices, for example, as described with respect to FIG. 35. A PUFS module 4006 may be used to generate a challenge voltage, or other challenge signal, that may be imposed on the PUFS block 4002 to generate a response. The PUFS module 4006 may request a PIN from a user to generate the challenge signal. The PUFS module 4006 may also shut down a transaction or send an alert if the response is not valid, for example, on a display on the IoT device 4000, or on a display associated with a e-cash retailer, or both. An antitheft module 4008 may use authorization and context sensors to determine if the IoT device 4000 is in an unauthorized location, such as not proximate to a legitimate user, or if an unauthorized party is attempting to use the IoT device 4000, among others. If so, the antitheft module 4008 may burn antitheft fuses in the PUFS block 4002 to deactivate the wallet app, for example, by causing challenges to return incorrect responses. The legitimate user may configure the antitheft module 4008 to burn the antitheft fuses in an expected pattern, allowing later recovery of the balance in the wallet app 3302 by the legitimate user.

Figure 41:
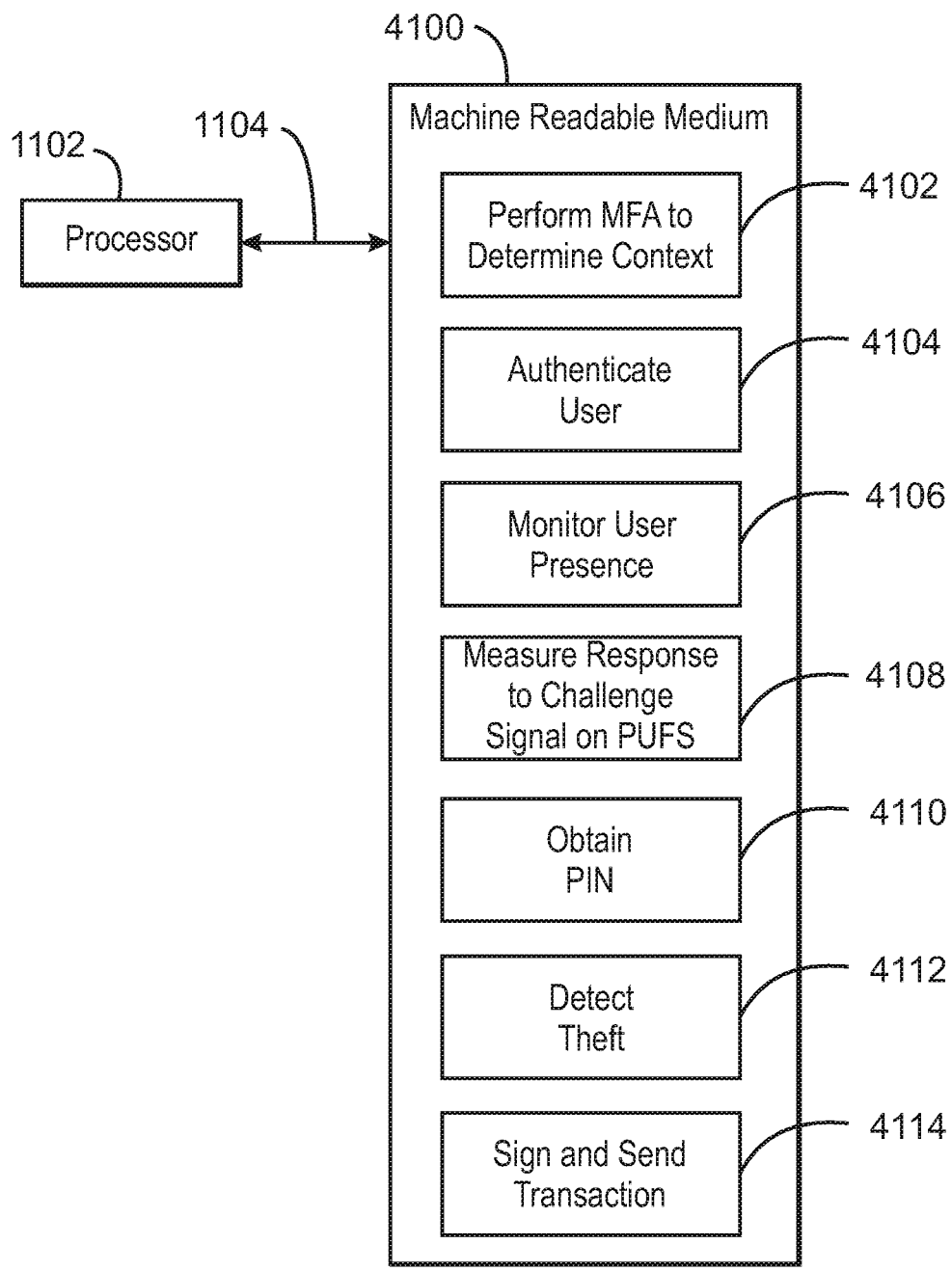
FIG. 41 is a block diagram of a non-transitory, machine readable medium including code that, when executed, directs a processor to implement multiple distributed e-wallets, in accordance with some examples.

FIG. 41 is a block diagram of a non-transitory, machine readable medium including code that, when executed, directs a processor to implement multiple distributed e-wallets, in accordance with some examples. The processor 1102 may access the non-transitory, machine readable medium 4100 over a bus 1104. The processor 1102 and bus 1104 may be selected as described with respect to the processor 1002 and bus 1006 of FIG. 10. The non-transitory, machine readable medium 3200 may include devices described for the mass storage 1008 of FIG. 10 or may include optical disks, thumb drives, or any number of other hardware devices.

The non-transitory, machine readable medium 3200 may include code 4102 to direct the processor 1102 to invoke an MFA policy to determine a context for user authorization of an e-wallet, for example, as described with respect to FIGS. 33 and 34. Code 4104 is included to direct the processor 1102 to use sensors to authenticate a legitimate user, for example, in combination with user entered credentials, such as a password or PIN. Code 4106 is included to direct the processor 1102 to use sensors to monitor the presence of the legitimate user, for example, using motion sensors, sound sensors, location sensors, and others to determine if the legitimate user is proximate to the device. The code 4106 may also direct the processor 1102 to start a timer, either the beginning the transaction or if the legitimate user moves away from the vicinity of the device. When the timer expires the code 4106 may direct the processor to deactivate a wallet app.

Code 4108 may be included to direct the processor 1102 to measure a response to a challenge signal on a PUFS unit, for example, as described with respect to FIGS. 36 to 39. The code 4108 may be included to direct the processor 1102 to generate an initial challenge, such as based on a context, to determine if the wallet module is authorized, or to generate a challenge based on a PIN entered by a user, or both, for example as described with respect to FIG. 39. Code 4110 may be included to direct the processor 1102 to obtain a PIN from a user.

Code 4112 may be included to direct the processor 1102 to detect and unauthorized context for the device, such as the theft of a device, illegitimate access 2 a wallet, or both, for example, based on authorization sensors, or entered credentials. The code 4112 may direct the processor 1102 to burn antitheft fuses, for example, if a theft has been detected.

Code 4114 may be included to direct the processor 1102 to sign a transaction using a key from the wallet app, and submit the transaction, for example, to an e-cash retailer. The code 4114 may direct the processor 1102 to send other information to the e-cash retailer, for example, the MFA policy, contextual authorization information, and the like.

The experience of using a distributed e-wallet may be improved by tracking the e-wallet shares. The techniques described with respect to FIGS. 42 to 48 disclose the use of an radio frequency identification unit (RFID), for example, embedded in the CPU package to perform this tracking. A network of RFID readers, or individual RFID readers, may a scan for the RFID values, which then may be made available to a subscriber base. The tracking function may be a service that is provided for a fee.

Figure 42:
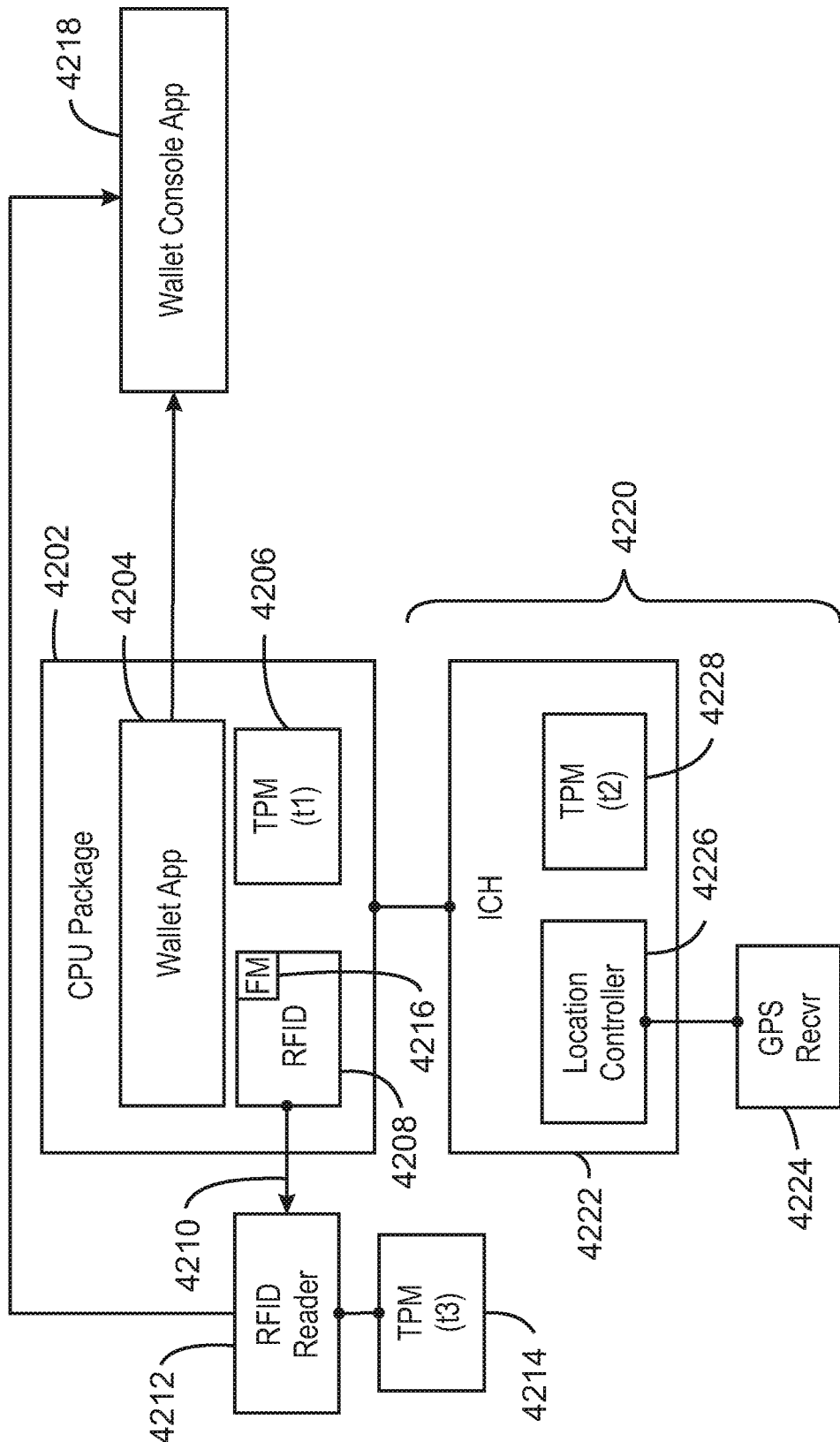
FIG. 42 is a block diagram of a system that uses radio frequency identification (RFID) to track an e-wallet, in accordance with some examples.

FIG. 42 is a block diagram of a system 4200 that uses radio frequency identification (RFID) to track an e-wallet, in accordance with some examples. In this example, a CPU package 4202 hosts a wallet app 4204, for example, protected by a TEE 4206. The wallet app 4204 may hold e-wallet credentials and balances for an e-wallet share, for example, in an encrypted format. The CPU package 4202 may have an integrated RFID 4208, that may provide RFID values 4210 when read by an RFID reader 4212. The RFID reader 4212 may also be protected by a TEE 4214, for example, to prevent compromising the RFID values 4210 read from the RFID 4208. The RFID reader 4212 may be part of an RFID reader network having a number of RFID readers in different locations.

The wallet owner may register the RFID values 4210 with the RFID reader network, for example, using the wallet app 4204 or other systems as described herein. The RFID reader network may then notify the subscriber whenever one of the readers recognizes a registered RFID 4208. An RFID 4208 that is integrated with the CPU package 4202 may also be visible to the TEE 4206 in the CPU package 4202. This allows the RFID value 4210 to be signed by a TEE key, such as a manufacturer's embedded attestation key or a key provisioned by the user. A signature of the RFID value 4210 may be stored in a flash memory (FM) 4216 in the RFID 4208, such that upon scanning by the RFID reader 4212 the signature may be transferred to the RFID reader 4212, for example, under the control of the wallet app 4204. The RFID value 4210 and signature may be supplied to the subscriber of the RFID network, for example, through a wallet console app 4218, that may display the RFID value 4210 on a local display, a retailer's display, or other displays relevant to a transaction. The wallet console app 4218 may be used to interact with the wallet app 4204 on the device hosting the CPU package 4202, and to interact with the RFID reader 4212, or an RFID reader network, to register the RFID values for the e-wallet share.

Upon receiving the RFID signature, including the RFID value 4210 signed by a transaction key, the subscriber may verify the signature using a public key corresponding to the private signing key, for example, using the wallet app 4204. In this fashion, the subscriber may confirm that the RFID 4208 was associated with the physical device. Accordingly, an attacker must successfully break the TEE 4206 in the CPU package 4202 to impersonate the RFID 4208.

The RFID tracking method may work even when the CPU package 4202 is not powered. Hence, it may be used to track the e-wallet in a variety of environments such as taxi cabs, rental cars, public buildings, retail stores, hotels, smart city cross walks and so forth.

A second tracking mechanism 4220 may be used when the device is powered, in addition to the RFID 4208. In this tracking mechanism 4220, an I/O controller hub (ICH) 4222 may access a GPS 4224, location beacon, or other location sensor using a location controller 4226. The location information that is sampled by the device may be signed using a TEE 4228, in the ICH 4222, with a manufacturer or user provisioned attestation key. The location information may then be countersigned with the RFID value 4210, using the TEE 4206 in the CPU package 4202. This message may be sent to the wallet owner, for example, for display at a wallet console app 4218 whenever connectivity allows.

By correlating both messages, the wallet owner can determine the last known physical location of the wallet and a likelihood for when wallet transaction could have occurred. By including the RFID and location information in the signature that authorizes e-cash transactions, the merchant and clearing entities may be able to apply anti-fraud algorithms to refuse a transaction that is suspicious.

Figure 43:
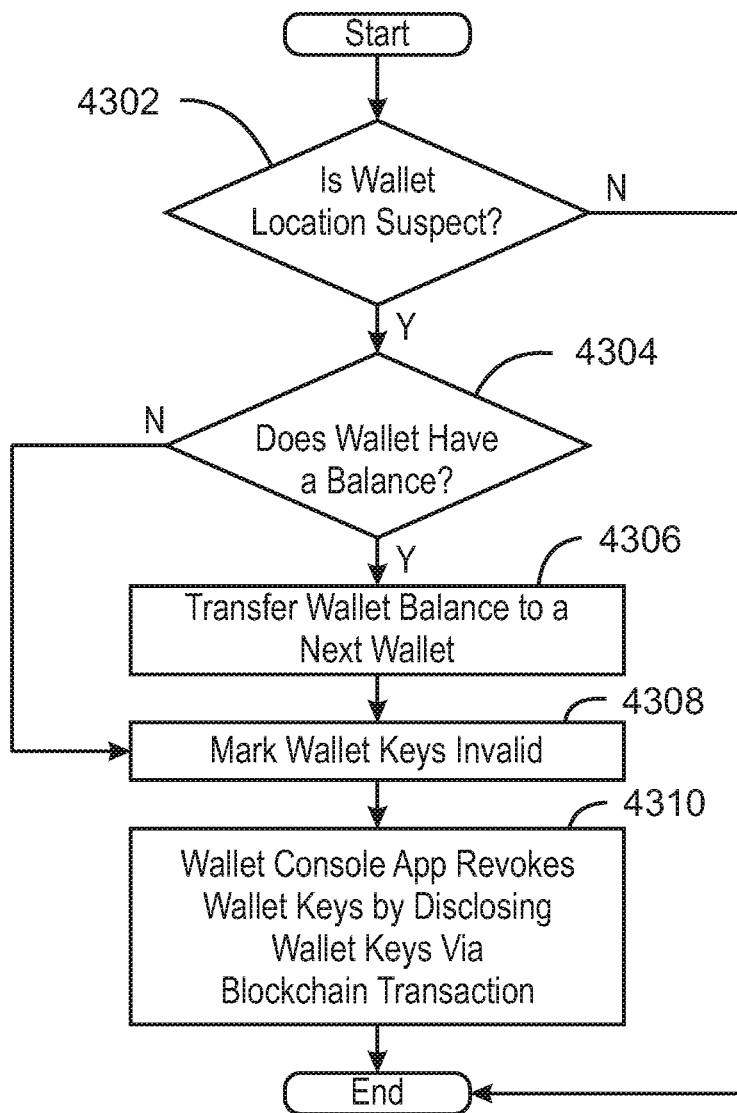
FIG. 43 is a process flow diagram of a method for tracking an e-wallet with RFID, in accordance with some examples.

FIG. 43 is a process flow diagram of a method 4300 for tracking an e-wallet with RFID, in accordance with some examples. The method 4300 begins at block 4302, when a determination is made as to whether an e-wallet location is suspect. This may be performed using the RFID information, location data, or both described with respect to FIG. 42. If so, at block 4304, a determination is made as to whether the e-wallet has a balance. If so, at 4306, the balance is transferred to another e-wallet.

If, at block 4304, a determination is made that the e-wallet has no balance, or after the balance is transferred, at block 4308, the keys are marked as invalid. At block 4310, the keys to the e-wallet are revoked, for example, when the e-wallet console app is disclosed via a blockchain transaction.

The use of the location information may increase the security of the wallet by allowing transaction to be allowed or blocked based on location. Further, other shares of the wallet may be distributed to locations for use, as described with respect to FIG. 44.

E-cash transactions cleared by a blockchain may lack anti-fraud protection. A wallet owner may opt-in to increased fraud protection by employing wallet technology that include a CPU-hosted RFID and wallet application protected by a trusted execution environment (TEE) that is co-resident on the CPU package, such as Intel SGX, ARM Trust Zone, or Intel CSE, among others.

Figure 44:
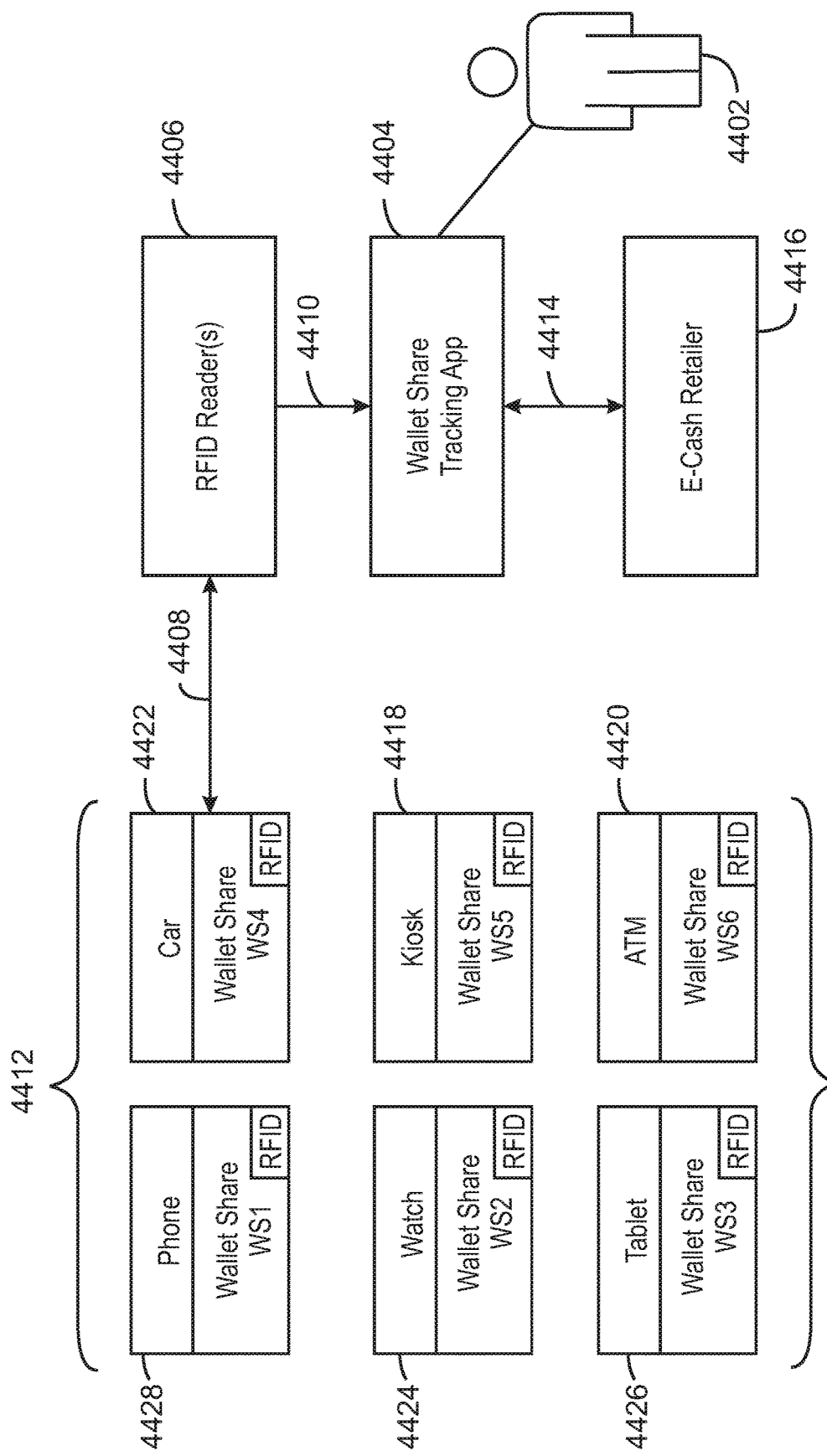
FIG. 44 is a block diagram of system for using RFID and location to secure an e-wallet from fraud, in accordance with some examples.

FIG. 44 is a block diagram of system 4400 for using RFID and location to secure an e-wallet share from fraud, in accordance with some examples. In the system 4400, a distributed wallet share tracking application 4404, for example, integrated into a wallet manager, may track the location of each share of a distributed wallet (W1) that may rely on EPID as a wallet key. In some examples, wallet shares (WS1, WS2, . . . , WSn) may be physically co-resident with a CPU RFID in a CPU-package. A system of RFID readers 4406 may exist where a CPU RFID will receive a "wake-on-RFID' message from a proximate RFID reader 4406 causing a wallet share, WS1, WS2, . . . , WSn to execute to sign RFID value with the key for W1 (Kw1).

The signed RFID value 4408 is given to the RFID reader 4406 which adds reader location signed by reader, the RFID location information 4410 is provided to the wallet-share tracking app 4404. The wallet-share tracking app 4404 may use this information to construct a display of available wallet shares, WS1, WS2, . . . , WSn, such as a connection graph of the locations 4412 of the distributed wallet shares. The display may be provided to the user 4402 on the screen of a mobile device. The user 4402 may select a convenient wallet share, WS1, WS2, . . . , WSn, to perform a transaction (Tx1). The wallet-share tracking app 4404 may obtain the location of the user 4402, for example, from a GPS in the mobile device. The location of the user 4402 may be combined with the signed RFID location information 4410 and included in the Tx1 4414. The Tx1 4414 may then be sent to an e-cash retailer 4416.

When the Tx1 4414 is processed for the e-cash retailer 4416, for example, by a blockchain miner, anti-fraud policies are applied that relate the location of the wallet-share tracking app 4404, the user 4402, and the location of the wallet share, or shares, used to complete the transaction. Further information from the mobile device hosting the wallet-share tracking app 4404 may be used to attest that the wallet is protected by CPU package that has not been compromised for example by a black-market CPU provider.

The use of EPID keys for the wallet (W1) and the wallet shares (WS1, WS2, . . . , WSn) may allow wallet shares to be placed in public locations, such as a kiosk 4418, an ATM 4420, a car 4422, among others. Further, devices such as a watch 4424, a tablet 4426, or a phone 4428, that may be stolen or otherwise compromised, may be protected by the combination of the EPID key and the location information.

Figure 45:
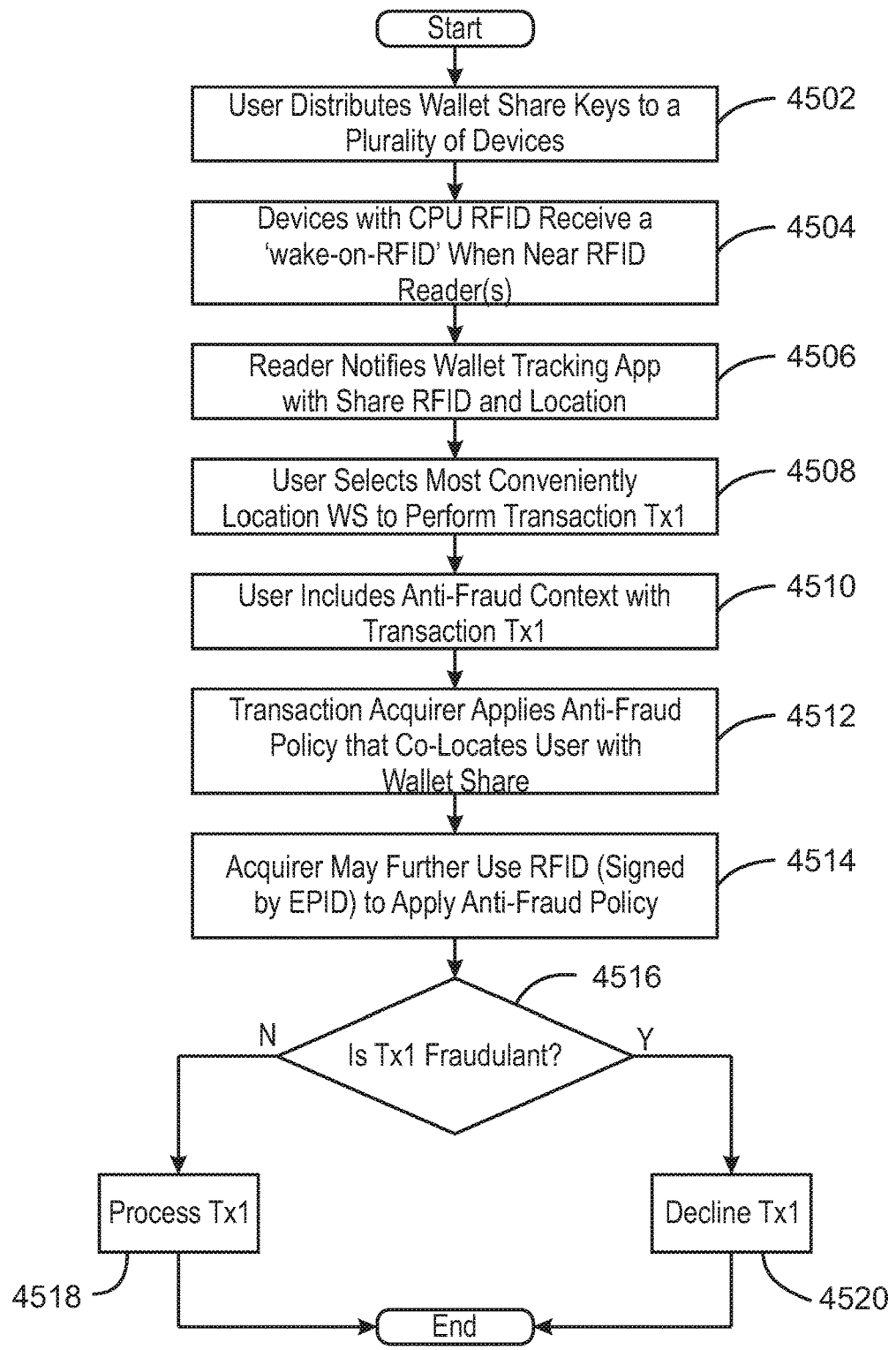
FIG. 45 is a process flow diagram of a method for using RFID and location to secure an e-wallet from fraud, in accordance with some examples.

FIG. 45 is a process flow diagram of a method 4500 for using RFID and location to secure an e-wallet from fraud, in accordance with some examples. The method begins at block 4502, when a user distributes wallet share keys to a plurality of devices, for example, each of which hosts a wallet share. The devices may have an RFID, for example, associated with the CPU in the device. At block 4504, devices with an RFID receive a 'wake on RFID' when near an RFID reader. At block 4506, the reader notifies the wallet tracking app by sending a message with the RFID information for the e-wallet share and the location of the e-wallet share.

At block 4508, the user selects the most conveniently located e-wallet share to perform a transaction (Tx1). At block 4510, the user includes antifraud context with the transaction.

At block 4512, the transaction acquirer, such as an e-cash retailer, may apply antifraud policies, for example, to co-locate the user with the wallet share. At block 4514, the acquirer may further use the RFID, for example, signed by an EPID key, to apply the antifraud policy.

At block 4516, a determination is made as to whether the transaction (Tx1) is fraudulent. If not, at block 4518 the transaction is processed, for example, by being submitted to a blockchain by an e-cash retailer for clearance by miners. The method 4500 then ends after the transaction is cleared.

If at block 4516, the transaction is determined to be fraudulent, at block 4520, the transaction is declined and the method 4500 ends. A message indicating that the transaction has been declined may be displayed by wallet manager on a mobile device or other computing device.

Figure 46:
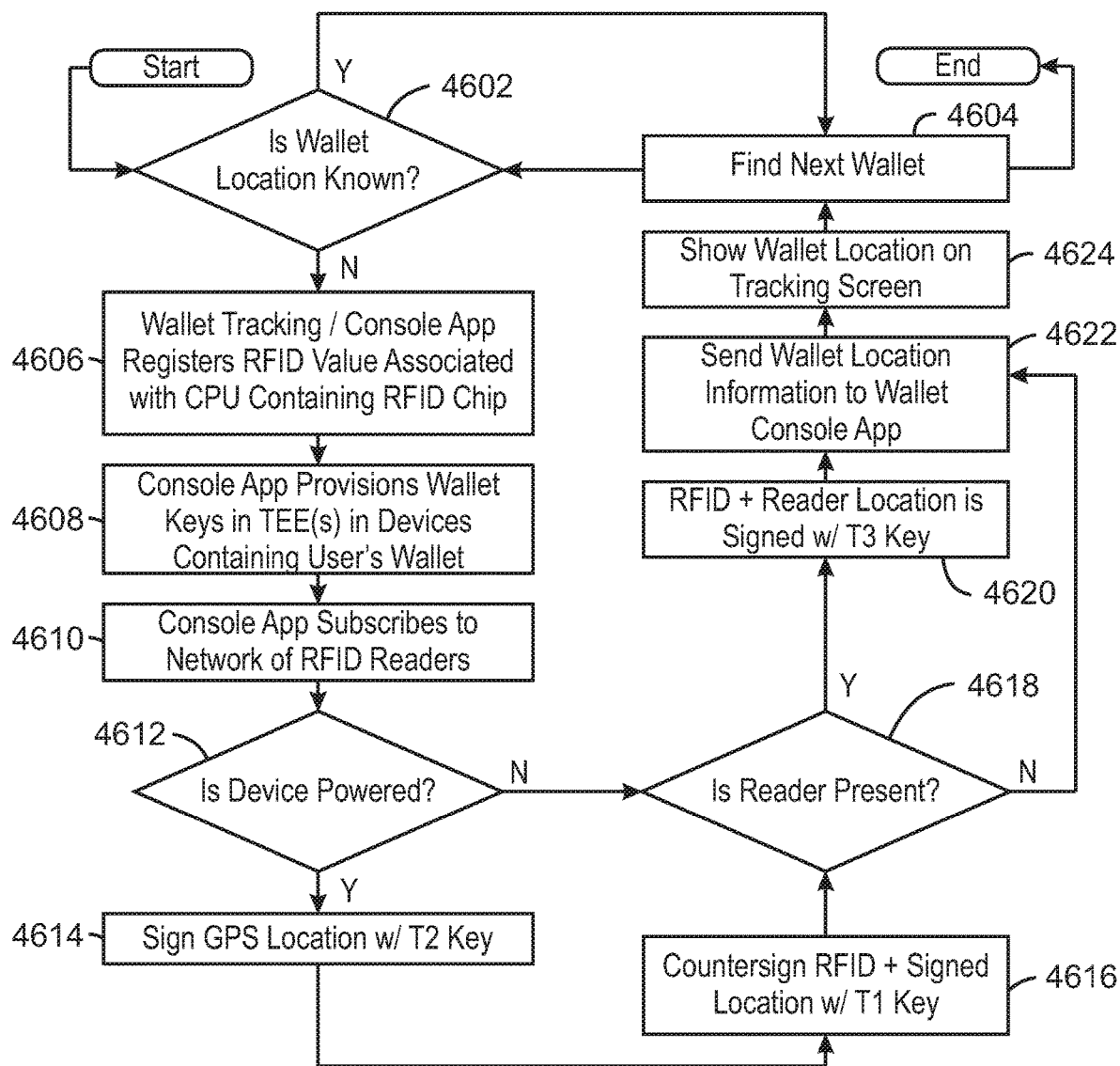
FIG. 46 is a process flow diagram of a method to provision and locate an e-wallet share using RFID, in accordance with some examples.

FIG. 46 is a process flow diagram of a method 4600 to provision and locate an e-wallet share using RFID, in accordance with some examples. The method begins at block 4602, with a determination as to whether the e-wallet share location is known. If so, at block 4604, the parameters may be changed to look for the next e-wallet share, for example, by incrementing a pointer. Process flow then returns to block 4602 to find the next e-wallet. If at block 4604, all e-wallet shares have been found, the method 4600 ends.

If at block 4602, it is determined that a wallet share location is not known, then at block 4606, a wallet tracking or wallet console app registers and RFID value for the e-wallet share, for example, associated with a CPU containing an RFID chip. At 4608, the wallet console app may provision wallet keys to TEEs in devices containing shares of the user's e-wallet. At block 4610, the wallet console app may subscribe to a network of RFID readers, if it does not already have a subscription.

At block 4612, a determination is made as to whether a device is powered, for example, this may be made by an RFID reader, or may be an automatic action within the device itself. If the device is powered, at block 4614, a location from a GPS unit may be signed with a device key, for example, from a TEE in an interface controller hub (ICH) coupling the CPU to the GPS receiver. At block 4616, the RFID values, for example, from an RFID in the CPU package and the signed location from the ICH, if present, may be signed by using a device key from the TEE in a CPU package.

At block 4618, a determination is made as to whether an RFID reader is present. If so, at block 4620 the RFID values, location, and other information from the device is joined to the reader location and signed with a reader key, for example, from a TEE in the RFID reader. At block 4622, the wallet location information for the e-wallet share is sent to the wallet tracking app in the wallet console application. The location of the e-wallet share may then be displayed on a tracking screen, for example, on the touch screen of a mobile device, a browser screen, or the like. Process flow then returns to block 4604, to find the next e-wallet share. This is performed as a loop to keep track of e-wallet shares as the e-wallet shares, the user, or both move between different RFID readers.

Figure 47:
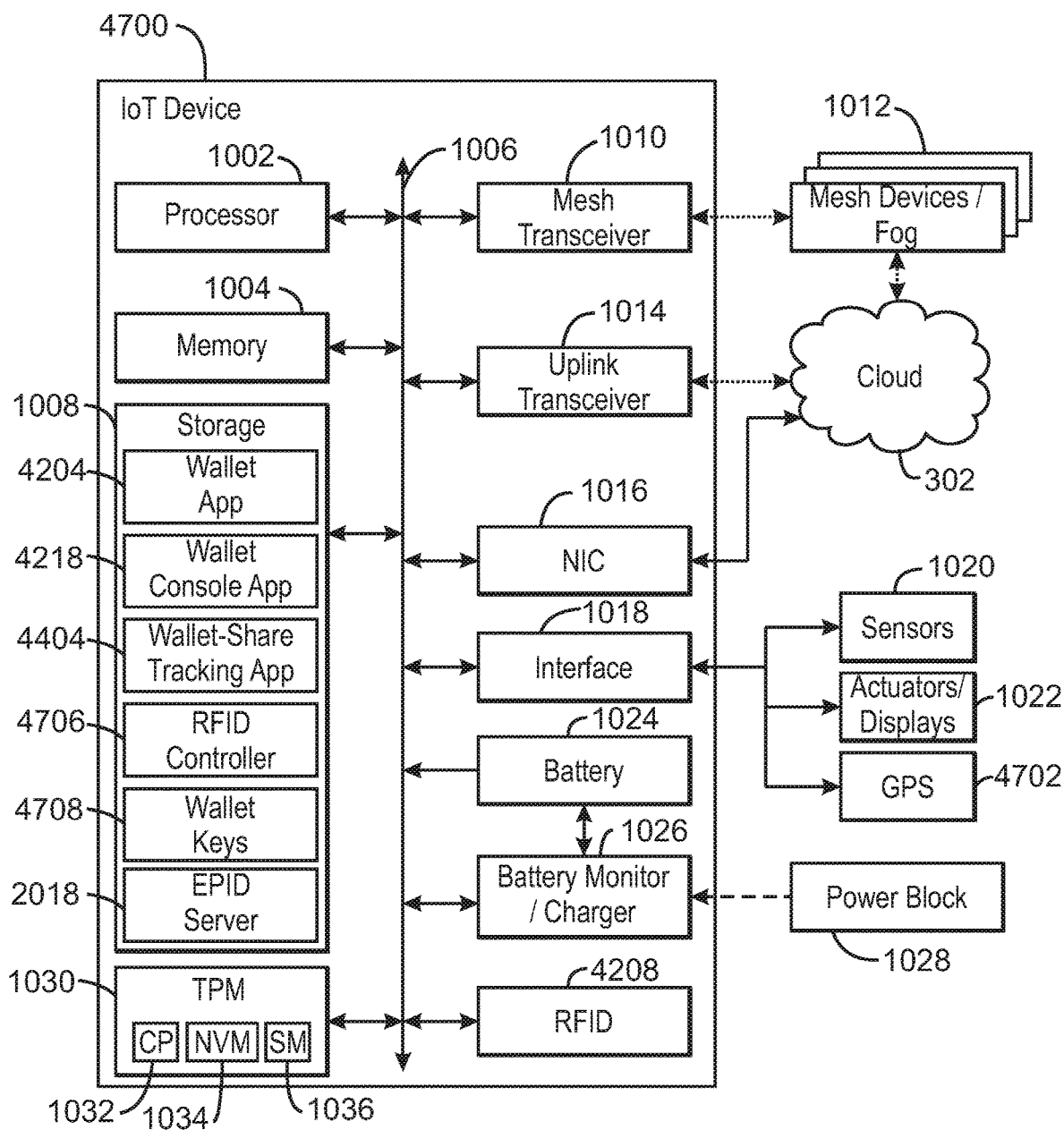
FIG. 47 is a block diagram of an example of components that may be present in an IoT device for using RFID to track and secure e-wallets, in accordance with some examples.

FIG. 47 is a block diagram of an example of components that may be present in an IoT device 4700 for using RFID to track and secure e-wallets, in accordance with some examples. Like numbered items are as described with respect to FIGS. 3, 10, 20, 42, and 44. It can be noted that different components may be selected and used for the IoT device 1000 discussed with respect to FIG. 10, and the IoT Device 4700 discussed with respect to FIG. 47.

The IoT device 4700 may also include a GPS 4702 to determine a location when the IoT device 4700 is powered. The interface 1018 may couple to actuators/displays 1022, such as a touch screen display in a mobile device, to display locations of e-wallet shares, select e-wallet shares to trigger transactions, enter transaction information, such as amounts, and the like.

The mass storage 1008 may include a number of modules to implement the e-wallet RFID functions described herein. Although shown as code blocks in the mass storage 1008, it may be understood that any of the modules may be fully or partially replaced with hardwired circuits, for example, built into an application specific integrated circuit (ASIC). Modules described with respect to FIG. 20, such as a wallet linker module 2002 and a wallet manager 2004 may be present to implement the same functions. The mass storage 1008 may include the wallet console app 4204 to interface with the user, for example, through a touchscreen on a mobile device, among others. A wallet share tracking app 4404 may be included to aggregate data from RFID readers and e-wallet shares to locate and track e-wallet shares. An e-wallet share 4704, including an EPID key (Ksn) may be located on the IoT device 4700. The e-wallet share 4704 on the local IoT device 4700 may use an RFID 4208 located on the IoT device 4700 to report its location. The RFID 4208 may be associated with the processor 1002 in a single CPU package. Further, the TPM 1030 may also be associated with the processor 1002 and the RFID 4208 in the CPU package.

An RFID controller 4706 may access the RFID 4208, instructing the RFID 4208 to provide RFID values to an RFID reader. A wallet keys module 4708 may create keys for e-wallet shares, and track current and revoked keys for both the local e-wallet share 4704 and for e-wallet shares in other devices.

The transactions performed by the e-wallet shares may be entire transactions, wherein each e-wallet share is authorized to perform the entire transaction. In some examples, the e-wallet shares may implement distributed transactions, wherein each e-wallet share provides a portion of the funds. In either case, context authentication as described herein, or an M of N policy as described herein, may be used to authorize the transaction.

Figure 48:
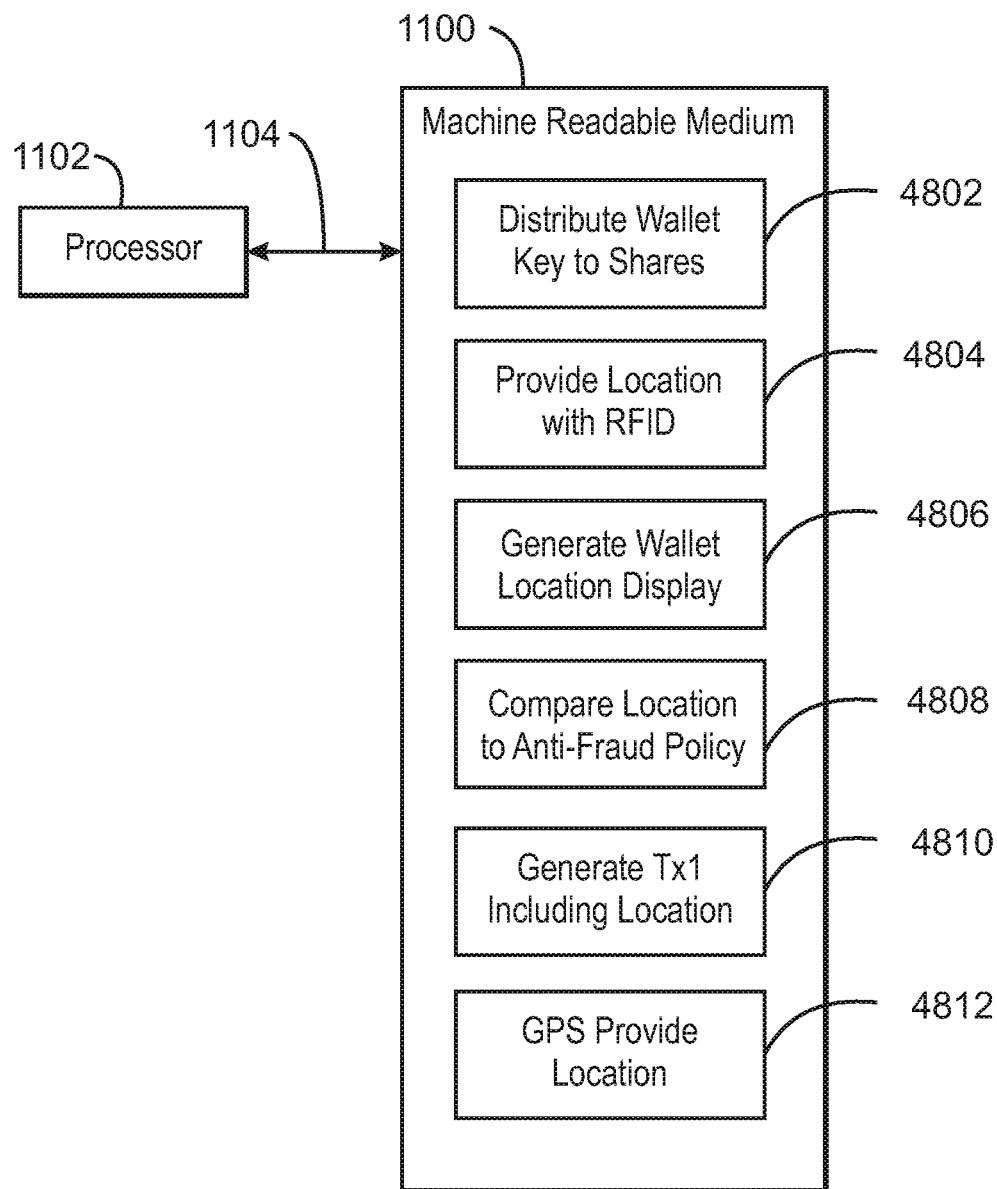
FIG. 48 is a block diagram of a non-transitory, machine readable medium including code that, when executed, directs a processor to track and secure e-wallets using RFID e-wallets, in accordance with some examples.

FIG. 48 is a block diagram of a non-transitory, machine readable medium 4800 including code that, when executed, directs a processor to track and secure e-wallets using RFID e-wallets, in accordance with some examples. Like numbered items are as described with respect to FIG. 11.

The non-transitory, machine readable medium 4800 may include code 4802 to direct the processor 1102 to distribute e-wallet shares to a number of IoT devices, and provision the e-wallet shares, for example, as described with respect to FIGS. 45 and 46. Code 4804 may be included to direct the processor 1102 to provide RFID values to an RFID reader, for example, powering up when a wake-up signal is received, and sending the RFID values, as described with respect to FIGS. 45 and 46. The RFID values may be signed with an attestation key from a TEE.

Code 4806 may be included to direct the processor 1102 to generate a location display of e-wallet shares, for example, associated with an e-wallet in a local device. Code 4808 may be included to direct the processor 1102 to compare the locations to an anti-fraud policy, for example, to determine if a wallet location is suspect as described with respect to FIG. 43 or to allow the completion of a transaction as described with respect to FIG. 46.

Code 4810 may be included to direct the processor 1102 to generate a transaction (Tx1) that includes location information, such as signed RFID values, signed GPS values, or both. Code 4812 may be included to direct the processor 1102 to provide a GPS location for the device holding the e-wallet share. The GPS location may be signed, for example, using an attestation key provided by a TEE in an interface control hub.

EXAMPLES

Example 1 includes an apparatus for securing e-wallet transactions. The apparatus includes an e-wallet application configured to obtain parameters for an e-wallet transaction from a user and a transaction generator. The transaction generator is configured to sign a first transaction using a first private key and verify the first transaction using a corresponding first public key, encrypt the first transaction to form a second transaction, and sign the second transaction using a second private key and verify the second transaction using a corresponding second public key.

Example 2 includes the subject matter of example 1. In this example, the apparatus includes a trusted platform module (TPM) to create a trusted execute environment (TEE) in which the e-wallet application operates.

Example 3 includes the subject matter of either of examples 1 or 2. In this example, the apparatus includes a blockchain to record transactions from the transaction generator.

Example 4 includes the subject matter of any of examples 1 to 3. In this example, the apparatus includes an insurance sidechain to record contracts for compensating transactions.

Example 5 includes the subject matter of any of examples 1 to 4. In this example, the e-wallet application comprises an application programming interface (API) configured to send a transaction to a web farm comprising a network of temporal distributed wallets.

Example 6 includes the subject matter of any of examples 1 to 5. In this example, the apparatus includes a touchscreen display, wherein the e-wallet application is configured to display operations of the e-wallet application, and obtain input from a user of the e-wallet application.

Example 7 includes a machine implemented method for securing e-wallet transactions. The method includes creating a transaction in a first e-wallet device, signing the transaction with a first wallet key, and signing the transaction with a subsequent wallet key to create a subsequent transaction.

Example 8 includes the subject matter of example 7. In this example, the machine implemented method includes committing the subsequent transaction to a blockchain after signing with the subsequent wallet key.

Example 9 includes the subject matter of either of examples 7 or 8. In this example, the machine implemented method includes sequentially signing the subsequent transaction with a plurality of wallet keys to create a final transaction.

Example 10 includes the subject matter of any of examples 7 to 9. In this example, the machine implemented method includes committing the final transaction to a blockchain.

Example 11 includes the subject matter of any of examples 7 to 10. In this example, the machine implemented method includes sending the subsequent transaction to a web farm hosting a number of distributed wallets to be encrypted using keys for the plurality of distributed wallets.

Example 12 includes the subject matter of any of examples 7 to 11. In this example, the machine implemented method includes determining whether hey subsequent transaction is to be submitted to the web farm, based, at least in part, on a policy that determines if the subsequent transaction is of sufficient value.

Example 13 includes the subject matter of any of examples 7 to 12. In this example, the machine implemented method includes sending a subsequent transaction to a cloud over a router.

Example 14 includes the subject matter of any of examples 7 to 13. In this example, the machine implemented method includes translating a message syntax from a first syntax to a second syntax.

Example 15 includes the subject matter of any of examples 7 to 14. In this example, the machine implemented method includes requesting a compensating transaction for the subsequent transaction by making a copy of the subsequent transaction on a blockchain, and posting the copy to a sidechain.

Example 16 includes the subject matter of any of examples 7 to 15. In this example, the machine implemented method includes detecting an insurer's offer on a sidechain, to provide insurance for the subsequent transaction, counter signing the insurer's offer to form an insurance contract transaction, posting the insurance contract transaction to hey blockchain.

Example 17 includes the subject matter of any of examples 7 to 16. In this example, the machine implemented method includes clearing a subsequent transaction.

Example 18 includes the subject matter of any of examples 7 to 17. In this example, the machine implemented method includes determining if a party is not satisfied with an outcome of a clearing of a subsequent transaction.

Example 19 includes the subject matter of example 18. In this example, the machine implemented method includes creating a claim against the insurance and posting the claim to the blockchain.

Example 20 includes the subject matter of example 19. In this example, the machine implemented method includes receiving a compensating transaction for the subsequent transaction from the insurance.

Example 21 includes a non-transitory, machine readable medium. The non-transitory machine readable medium includes code that, when executed, directs a processor to create a transaction, sign the transaction with a first key, encrypt the transaction to form an encrypted transaction, and sign the encrypted transaction with a second key.

Example 22 includes the subject matter of example 21. In this example, the non-transitory machine readable medium includes code that, when executed, directs the processor to send the encrypted transaction to a web farm hosting multiple-distributed e-wallets, and request the web farm further encrypt the encrypted transaction using keys for the multiple-distributed e-wallets.

Example 23 includes the subject matter of either of examples 21 or 22. In this example, the non-transitory, machine readable medium includes code that, when executed, directs the processor to request an offer for a compensating transaction from an insurer for an encrypted transaction.

Example 24 includes the subject matter of example 23. In this example, the non-transitory, machine readable medium includes code that, when executed, directs the processor to except an offer for the compensating transaction from the insurer.

Example 25 includes the subject matter of any of examples 22 to 24. In this example, the non-transitory machine readable medium includes code that, when executed, directs the processor to evaluate an outcome of the encrypted transaction.

Example 26 includes the subject matter of example 25. In this example, the non-transitory, machine readable medium includes code that, when executed, directs the processor to make a claim for the compensating transaction from the insurer.

Example 27 includes an apparatus for securing blockchain transactions. The apparatus includes an e-wallet application configured to obtain parameters for an e-wallet transaction from a user, and a means for signing the e-wallet transaction by a plurality of e-wallet shares to create a multi-signed transaction.

Example 28 includes the subject matter of example 27. In this example, the apparatus includes means to create a trusted execute environment (TEE) for multiply signing the e-wallet transaction.

Example 29 includes the subject matter of either of examples 27 or 28. In this example, the apparatus includes a means to record transactions.

Example 30 includes the subject matter of any of examples 27 to 29. In this example, the apparatus includes a means to record compensating transactions.

Example 31 includes the subject matter of any of examples 27 to 30. In this example, the e-wallet application comprises a means to use a network of temporal distributed wallets to encrypt a transaction.

Example 32 includes an apparatus for securing multiple distributed e-wallet shares. The apparatus includes a wallet share manager configured to create an e-wallet, create distributed e-wallet shares, and provision the distributed e-wallet shares with extended privacy identification (EPID) keys and a balance. A wallet linking module is configured to join the distributed e-wallet shares to the e-wallet. An EPID server is configured to generate EPID keys for the e-wallet and the e-wallet shares.

Example 33 includes the subject matter of example 32. In this example, the apparatus includes a revocation list comprising credentials for revoked e-wallet shares, wherein the wallet share manager enters credentials for revoked e-wallet shares into the revocation list based, at least in part, on input from a user.

Example 34 includes the subject matter of either of examples 32 or 33. In this example, the apparatus includes a touchscreen configured to obtain user input for the wallet share manager.

Example 35 includes the subject matter of any of examples 32 to 34. In this example, the apparatus includes a blockchain configured to hold transactions comprising shares of the e-wallet.

Example 36 includes the subject matter of example 35. In this example, the apparatus includes miners configured to examine the blockchain to verify transactions.

Example 37 includes the subject matter of any of examples 32 to 36. In this example, the apparatus includes a publication-subscription (pub-sub) manager. The pub-sup manager is configured to issue a wake-up message from a transacting share to other e-wallet shares, and send a balance synchronization message to the other e-wallet shares.

Example 38 includes the subject matter of example 37. In this example, the wallet share manager is configured to send an acknowledgment message from the other e-wallet shares to the pub-sub manager after receiving a balance synchronization message, and adjust a balance in an e-wallet share based, at least in part, on the balance synchronization message received from the pub-sub manager.

Example 39 includes the subject matter of any of examples 32 to 38. In this example, the apparatus includes a fractional transaction manager configured to divide a transaction into a plurality of fractional transactions that are each assigned to one of the e-wallet shares.

Example 40 includes the subject matter of example 39. In this example, the apparatus includes a fractional key manager configured to sign each of the plurality of fractional transactions with a corresponding key for an e-wallet share assigned to a fractional transaction.

Example 41 includes a method for securing distributed shares of an e-wallet in multiple devices. The method includes provisioning a plurality of devices each hosting an e-wallet share with enhanced privacy identification (EPID) private keys for the e-wallet share. The method also includes posting a signature for each e-wallet share to a blockchain, and determining if an e-wallet share is compromised. If an e-wallet share is compromised, a revocation list including the signature for the compromised e-wallet share of the plurality of the e-wallet shares is posted to a blockchain.

Example 42 includes the subject matter of example 41. In this example, the method includes creating a transaction by an e-wallet share, signing the transaction with an EPID private key, and posting the transaction to a blockchain.

Example 43 includes the subject matter of example 42. In this example, the method includes verifying the signature using an EPID public key, comparing the signature to a signature revocation list, and aborting the transaction if the signature is on a signature revocation list.

Example 44 includes the subject matter of example 42. In this example, the method includes verifying the signature using an EPID public key, comparing the signature to a signature revocation list, and processing the transaction if the signature is not on a signature revocation list.

Example 45 includes the subject matter of any of examples 41 to 44. In this example, the method includes prompting a user for a transaction approval for a transaction from the e-wallet share, signing the transaction, and updating an e-wallet balance for the e-wallet share. A wake signal is then sent to the plurality of devices from the device hosting the wallet share, and a balance synchronization message is sent to the plurality of devices from the device hosting the e-wallet share.

Example 46 includes the subject matter of example 45. In this example, the method includes returning an acknowledgment message for the balance synchronization message, and adjusting a balance based, at least in part, on the balance synchronization message.

Example 47 includes the subject matter of any of examples 41 to 46. In this example, the method includes dividing an amount for a transaction by a number of seller e-wallet shares to form fractional transactions, and confirming that a sum of the fractional transactions does not exceed a threshold amount for a seller e-wallet.

Example 48 includes the subject matter of example 47. In this example, the method includes increasing the number of seller e-wallet shares used for the transaction if the sum of the fractional transactions exceeds the threshold amount for the seller e-wallet.

Example 49 includes the subject matter of either of examples 47 or 48. In this example, the method includes determining if a buyer uses fractional e-wallet shares. A determination is made as to whether the number of fractional e-wallet shares for the buyer is less than the number fractional e-wallet shares for a seller, and the number of fractional e-wallet shares used by the buyer is increased.

Example 50 includes the subject matter of any of examples 47 to 49. In this example, the method includes assigning a fractional e-wallet share for the seller to each fractional transaction.

Example 51 includes the subject matter of example 50. In this example, the method includes signing each fractional transaction using a private e-wallet key for a fractional e-wallet share for a buyer.

Example 52 includes a non-transitory, machine readable medium. The non-transitory, machine readable medium includes code that, when executed, directs a processor to provision a plurality of e-wallet shares with a private extended privacy identification (EPID) key for each of the plurality of e-wallet shares, receive a signature from one of the plurality of e-wallet shares based, at least in part, on a public EPID key for the one. Code is included that, when executed, directs the processor to determine if the one has been compromised, and revoke the one by posting the signature to a revocation list on a blockchain.

Example 53 includes the subject matter of example 52. In this example, the non-transitory, machine readable medium includes code that, when executed, directs the processor to send a signal to the plurality of e-wallet shares from the one of the plurality of e-wallet shares after it has completed a transaction, and send a balance synchronization message to the plurality of e-wallet shares from the one.

Example 54 includes the subject matter of either of examples 52 or 53. In this example, the non-transitory, machine readable medium includes code that, when executed, directs the processor to determine a fractional transaction to be allocated to each of the plurality of e-wallet shares, and match a total sum of fractional transactions to spending limits for an e-wallet link to the plurality of e-wallet shares.

Example 55 includes the subject matter of any of examples 52 to 54. In this example, the non-transitory, machine readable medium includes code that, when executed, directs the processor to map shares of an e-wallet for a buyer to shares of an e-wallet for a seller, and sign a fractional transaction using a public key for each of the shares of an e-wallet for a buyer.

Example 56 includes the subject matter of any of examples 52 to 55. In this example, the non-transitory, machine readable medium includes code that, when executed, directs the processor to confirm that each of the signatures used by an e-wallet share is valid, and to clear a transaction.

Example 57 includes an apparatus for securing multiple distributed e-wallet shares. The apparatus includes a wallet share manager that is configured to create an e-wallet, create multiple distributed e-wallets, and provision the multiple distributed e-wallets with extended privacy identification (EPID) keys and a balance. The apparatus also includes a means to join the multiple distributed e-wallets to the e-wallet as shares of the e-wallet, and an EPID server configured to generate EPID keys for the e-wallet and the shares of the e-wallet.

Example 58 includes the subject matter of example 57. In this example, the apparatus includes a means for communicating a revocation of shares of the e-wallet.

Example 59 includes the subject matter of either of examples 57 or 58. In this example, the apparatus includes a means for storing transactions.

Example 60 includes the subject matter of any of example 59. In this example, the apparatus includes a means for verifying transactions.

Example 61 includes the subject matter of any of examples 57 to 60. In this example, the apparatus includes a means for synchronizing balances among the e-wallet shares.

Example 62 includes the subject matter of example 61. In this example, the apparatus includes a means for confirming the synchronization of balances among the e-wallet shares.

Example 63 includes the subject matter of any of examples 57 to 62. In this example, the apparatus includes a means to share the cost of a transaction among the e-wallet shares.

Example 64 includes an apparatus for approving transactions from e-wallet shares. The apparatus includes an e-wallet app on a first device configured to generate a transaction and an M of N policy to determine a minimum number of shares (M) of an e-wallet out of a total number of shares (N) of the e-wallet to approve the transaction. An anonymizing router is included to send an approval request for the transaction to other devices hosting shares of the e-wallet for approval of the transaction.

Example 65 includes the subject matter of example 64. In this example, the apparatus includes a first device including an e-wallet share and hosting the e-wallet app configured to issue the approval request. A transaction signer in a second device is configured to sign the approval request and determine if the M of N policy has been met. The e-wallet app is configured to send the signed approval request to the anonymizing router to be forwarded to a subsequent device, wherein the subsequent device is randomly selected by the anonymizing router.

Example 66 includes the subject matter of 65. In this example, the subsequent device comprises a subsequent transaction signer to sign the approval request and determine if the M of N policy has been met, and a subsequent e-wallet app configured to send the approval request to the anonymizing router to be returned to the first device.

Example 67 includes the subject matter of either of example 65 or 66. In this example, the apparatus includes a blacklist comprising a signature for a lost or stolen device. The e-wallet app is configured to check the signatures on the approval request against the blacklist. If a signature for a blacklisted device is detected, the e-wallet app is configured to return an unsigned approval request to the anonymizing router.

Example 68 includes the subject matter of any of examples 64 to 67. In this example, the apparatus includes a trusted processing module (TPM) to establish a trusted execute environment (TEE) for a device.

Example 69 includes the subject matter of any of examples 64 to 68. In this example, the apparatus includes a secret sharing module configured to generate a shared secret that is transmitted to devices hosting the e-wallet shares.

Example 70 includes the subject matter of example 69. In this example, the apparatus includes an escrow creator to create an escrowed key that is transmitted to the devices hosting the e-wallet shares.

Example 71 includes the subject matter of either for example 69 or 70. In this example, the apparatus includes a key reconstitution module to reconstitute a key from a shared secret, an escrow, or both.

Example 72 includes the subject matter of any of examples 64 to 71. In this example, the apparatus includes a leader elector to choose a master device for completing a transaction.

Example 73 includes the subject matter of example 72. In this example, the leader elector is configured to be operated in a protected blockchain.

Example 74 includes a method for approving transactions for an e-wallet. The method includes combining a transaction with an M of N threshold authorization policy to create an approval request in an originating e-wallet share hosted in a first device. The approval request is signed in the originating e-wallet share to create an initial approval request. The initial approval request is provided to an anonymizing router to be transferred to another device hosting another e-wallet share for signing.

Example 75 includes the subject matter of example 74. In this example, the method includes creating the M of N threshold authorization policy for the e-wallet, creating an authorization signing key pair for each share in the e-wallet, and posting a public key for each share in the e-wallet to a blockchain.

Example 76 includes the subject matter of either of example 74 or 75. In this example, the method includes signing a received approval request to create a multi-signed approval request, determining that M of N e-wallet shares have signed, and returning the multi-signed approval request to the originating e-wallet share.

Example 77 includes the subject matter of any of examples 74 to 76. In this example, the method includes signing a received approval request to create a multi-signed approval request, determining that M of N e-wallet shares have not signed, and providing the multi-signed approval request to the anonymizing router to be transferred to another e-wallet share for signing.

Example 78 includes the subject matter of any of examples 74 to 77. In this example, the method includes determining that an e-wallet share has been compromised, placing credentials for the compromised e-wallet share on a blacklist, and providing the blacklist to other e-wallet shares in the e-wallet.

Example 79 includes the subject matter of example 78. In this example, the method includes determining that an e-wallet share on the blacklist has signed the approval request, and refusing to sign the approval request.

Example 80 includes the subject matter of any of examples 74 to 79. In this example, the method includes posting a multi-signed approval request to a blockchain for clearance, determining that a consensus of miners find M of N signers in the multi-signed approval request, and processing the transaction.

Example 81 includes the subject matter of any of examples 74 to 80. In this example, the method includes creating an EPID private key for an e-wallet, distributing the EPID private key to an e-wallet share, and dividing the EPID private key into a first key portion and a second key portion in the e-wallet share.

Example 82 includes the subject matter of example 81. In this example, the method includes creating an EPID share key for the e-wallet share.

Example 83 includes the subject matter of either of examples 81 or 82. In this example, the method includes generating a symmetric key, producing a shared secret to divide the symmetric key into key shares, distributing a key share to an e-wallet share, and erasing the symmetric key.

Example 84 includes the subject matter of example 83. In this example, the method includes encrypting the first key portion using the key share to form an escrow key, and removing an unencrypted first key portion.

Example 85 includes the subject matter of example 84. In this example, the method includes receiving the approval request, signing the approval request to form a signed approval request, and replying with the escrow key and the signed approval request.

Example 86 includes the subject matter of example 85. In this example, the method includes reconstituting the symmetric key, reconstituting the encrypted first key portion, decrypting the first key portion using the symmetric key, appending the first key portion and the second key portion to reform the EPID private key, and signing the transaction with the EPID private key.

Example 87 includes the subject matter of any of examples 74 to 86. In this example, the method includes receiving votes from devices hosting e-wallet shares to elect a lead device to perform a transaction, and initiating the transaction from the lead device, if M of N devices have selected the lead device.

Example 88 includes the subject matter of example 87. In this example, the method includes starting a timer after the lead device is elected, and voiding the transaction if the lead device does not complete the transaction before the timer expires.

Example 89 includes the subject matter of any of examples 74 to 88. In this example, the method includes receiving votes from devices hosting e-wallet shares to ban a device from participating in transactions, and banning the device, if M of N devices have voted to ban the device.

Example 90 includes the subject matter of example 89. In this example, the method includes starting a timer after votes are received to ban the device, and voiding the vote if M of N devices have not responded before the timer expires.

Example 91 includes the subject matter of any of examples 74 to 90. In this example, the method includes placing a cap on an amount a device can spend within a set time period.

Example 92 includes the subject matter of any of examples 74 to 91. In this example, the method includes identifying parameters to allow an escrowed key to be reconstituted if an event occurs, dividing an e-wallet key into e-wallet key shares, and encrypting the e-wallet key shares to each of a plurality of e-wallet shares.

Example 93 includes the subject matter of example 92. In this example, the method includes submitting an event transaction including the M of N threshold authorization policy for the event and evidence of occurrence of the event to a blockchain, and reconstituting the e-wallet key if M of N shareholders submitted the event transaction.

Example 94 includes a non-transitory, machine readable medium. The non-transitory, machine readable medium includes code that, when executed, directs a processor to circulate a transaction approval request to e-wallet shares for signing, and complete the transaction if M of N e-wallet shares have signed the transaction approval request.

Example 95 includes the subject matter of example 94. In this example, the non-transitory, machine readable medium includes code that, when executed, directs the processor to create an M of N authorization policy for authorizing a transaction, reconstituting a key, reconstituting an escrowed key, electing a master device as a transaction leader, or banning a device, or any combinations thereof.

Example 96 includes the subject matter of examples 94 or 95. In this example, the non-transitory, machine readable medium includes code that, when executed, directs the processor to receive an EPID key for an e-wallet share, divide the EPID key into a first portion and a second portion, encrypt the first portion using a symmetric key, and delete the symmetric key.

Example 97 includes the subject matter of example 96. In this example, the non-transitory, machine readable medium includes code that, when executed, directs the processor to receive a shared secret from each of M of N devices, reconstitute the symmetric key from the shared secret received from each of the M of N devices, decrypt the first portion using the symmetric key, and rejoin the first portion and the second portion to re-create the EPID key.

Example 98 includes the subject matter of example 97. In this example, the non-transitory, machine readable medium includes code that, when executed, directs the processor to sign a transaction with the EPID key.

Example 99 includes the subject matter of either of examples 97 or 98. In this example, the non-transitory, machine readable medium includes code that, when executed, directs the processor to observe an event in an M of N reconstitution policy for reconstituting an e-wallet key from distributed shares, and create a reconstitution transaction comprising the M of N reconstitution policy and evidence of the event occurring.

Example 100 includes the subject matter of example 99. In this example, the non-transitory, machine readable medium includes code that, when executed, directs the processor to determine if the evidence of the event occurring meets the M of N reconstitution policy, and reconstitute the e-wallet key from the distributed shares.

Example 101 includes an apparatus for proving transactions from shares of an e-wallet. The apparatus includes an e-wallet app configured to generate a transaction in a first e-wallet share hosted in a first device, and a means to approve the transaction by routing the transaction among e-wallet shares hosted in other devices to meet an M of N policy.

Example 102 includes the subject matter of example 101. In this example, the apparatus includes the first device configured to issue an approval request, a transaction signer in a second device configured to sign the approval request and determine if the M of N policy has been met, and a means to route the signed approval request to the other devices if the M of N policy has not been met.

Example 103 includes the subject matter of either of examples 101 or 102. In this example, a subsequent device comprises a subsequent transaction signer to sign the approval request and determine if the M of N policy has been met, and a means to return a signed approval request to the first device.

Example 104 includes the subject matter of any of examples 101 to 103. In this example, the apparatus includes a means to determine if a prior signature on an approval request is legitimate.

Example 105 includes the subject matter of any of examples 101 to 104. In this example, the apparatus includes a means to provide a shared secret to devices hosting a share of the e-wallet.

Example 106 includes the subject matter of any of examples 101 to 105. In this example, the apparatus includes a means to provide an escrowed key to devices hosting a share of the e-wallet.

Example 107 includes the subject matter of any of examples 101 to 106. In this example, the apparatus includes a means to reconstitute a key.

Example 108 includes the subject matter of any of examples 101 to 107. In this example, the apparatus includes a means to choose a master device for completing a transaction.

Example 109 provides an apparatus for a contextual authentication of an e-wallet. The apparatus includes a wallet application configured to confirm a context for use of an e-wallet, wherein the context is defined by a multifactor authentication (MFA) policy. A multifactor authentication application configured to access a context sensor to provide input to the wallet application for the MFA policy.

Example 110 includes the subject matter of example 109. In this example, the context sensor comprises a fingerprint reader, a facial recognition system, or a location sensor, or any combinations thereof.

Example 111 includes the subject matter of either of examples 109 to 110. In this example, the apparatus includes a trusted path coupling the context sensor to the MFA application.

Example 112 includes the subject matter of any of examples 109 to 111. In this example, the apparatus includes a trusted processing module configured to established a trusted execute environment (TEE) for the wallet application.

Example 113 includes the subject matter of any of examples 109 to 112. In this example, the apparatus includes a context checker configured to confirm a context of a user prior to clearing a transaction.

Example 114 includes the subject matter of example 113. In this example, the context comprises a biometric identification of the user or a location of the user or both.

Example 115 includes the subject matter of any of examples 109 to 114. In this example, the apparatus includes a physically unclonable functions (PUFS) wallet module (PWM) comprising a PUFS block, configured to provide a response to a challenge.

Example 116 includes the subject matter of example 115. In this example, the challenge is a signal provided to the PUFS block based, at least in part, on the context of a user.

Example 117 includes the subject matter of either of examples 115 or 117. In this example, the challenge is a signal provided to the PUFS block based, at least in part, on a personal identification number (PIN) provided by the user.

Example 118 includes the subject matter of any of examples 115 to 117. In this example, the apparatus includes personalization fuses that, when blown, change the response from the PUFS block.

Example 119 includes the subject matter of any of examples 115 to 118. In this example, the apparatus includes an antitheft module configured to blow antitheft fuses when the context for the user indicates that an e-wallet holding the PWM is unauthorized.

Example 120 includes the subject matter of any of examples 115 to 119. In this example, the PUFS block comprises a domain wall memory.

Example 121 provides a method for a contextual authentication of an e-wallet. The method includes receiving a request to authorize a transaction in a device hosting the e-wallet, invoking a multifactor authentication application to authenticate a user of the e-wallet by using a context sensor to determine a context for the user, and allowing use of the e-wallet if rules for the context are met.

Example 122 includes the subject matter of example 121. In this example, the method includes creating a wallet policy comprising the rules for the context.

Example 123 includes the subject matter of either of examples 121 or 122. In this example, the rules comprise a valid biometric identification of the user.

Example 124 includes the subject matter of any of examples 121 to 123. In this example, the rules comprise a location of the user.

Example 125 includes the subject matter of any of examples 121 to 124. In this example, the rules comprise a location of the device hosting the e-wallet.

Example 126 includes the subject matter of any of examples 121 to 125. In this example, the rules comprise a distance between the user and the device hosting the e-wallet while a transaction is cleared.

Example 127 includes the subject matter of any of examples 121 to 126. In this example, the method includes denying use of the e-wallet if the context of the user is not authorized.

Example 128 includes the subject matter of any of examples 121 to 127. In this example, the method includes denying use of the e-wallet if the user is not detected by the device hosting the e-wallet.

Example 129 includes the subject matter of any of examples 121 to 128. In this example, the method includes denying use of the e-wallet if the user is no longer detected by the device hosting the e-wallet, and a timer, started when the user was no longer detected, expires.

Example 130 includes the subject matter of any of examples 121 to 129. In this example, the method includes rejecting a transaction if the context of the e-wallet is not appropriate for use with an e-retailer, a settlement system, or both.

Example 131 includes the subject matter of any of examples 121 to 130. In this example, the method includes receiving an e-wallet transaction, reading the context sensor and generating a challenge to a physically unclonable functions (PUFS) wallet module (PWM) based, at least in part, on the readings from the context sensor. A transaction is terminated if the challenge does not produce an expected result. A user is prompted for a personal identification number (PIN) and generating the challenge based, at least in part, on the PIN. The transaction is terminated if the challenge based on the PIN does not produce an expected result. The e-wallet transaction is processed.

Example 132 includes the subject matter of example 131. In this example, the method includes receiving a physically unclonable functions (PUFS) wallet module (PWM) from a manufacturer, blowing personalization fuses in the PWM to personalize a response to a challenge creating a unique identity, registering the unique identity of the PWM, programming a personal identification number (PIN) into the PWM, configuring wallet policy comprising context and antitheft sensor values, and adding e-cash to the e-wallet.

Example 133 includes the subject matter of either of examples 131 to 132. In this example, the method includes detecting an unauthorized context, and blowing antitheft fuses in the PWM.

Example 134 includes a non-transitory, machine readable medium. The non-transitory, machine readable medium includes code that, when executed, directs a processor to perform a multifactor authentication (MFA) to determine a context for a use of an e-wallet, authenticate a user, and sign and send a transaction if all context checks are passed.

Example 135 includes the subject matter of example 134. In this example, the non-transitory, machine readable medium includes code that, when executed, directs the processor to monitor a presence of a user, and deny the transaction if the user is not present.

Example 136 includes the subject matter of either of examples 134 or 135. In this example, the non-transitory, machine readable medium includes code that, when executed, directs the processor to generate a challenge signal for a physically unclonable function (PUF) based, at least in part, on the context, measure a response from the PUF to the challenge signal, and deny the transaction if the response does not match an expected response.

Example 137 includes the subject matter of example 136. In this example, the non-transitory, machine readable medium includes code that, when executed, directs the processor to obtain a personal identification number (PIN) from a user, generate a challenge signal for the PUF based, at least in part, on the PIN, and deny the transaction if PUF response does not match an expected response.

Example 138 includes the subject matter of any of examples 134 to 137. In this example, the non-transitory, machine readable medium includes code that, when executed, directs the processor to detect an unauthorized context for a device holding the e-wallet, and blow antitheft fuses to change a response to a challenge signal.

Example 139 includes an apparatus for contextual authentication of an e-wallet. The apparatus includes a wallet application configured to confirm a context of use of an e-wallet, and a means to determine the context of use of the e-wallet.

Example 140 includes the subject matter of example 139. In this example, the apparatus includes a means to confirm a context of a user prior to clearing a transaction.

Example 141 includes the subject matter of example 140. In this example, the apparatus includes a means to obtain a biometric identification of the user.

Example 142 includes the subject matter of either of examples 140 or 141. In this example, the apparatus includes a means to provide a unique response to a challenge signal to confirm context.

Example 143 includes the subject matter of example 142. In this example, the apparatus includes a means to generate the challenge signal based, at least in part, on a personal identification number (PIN) provided by the user.

Example 144 includes the subject matter of either of examples 142 or 143. In this example, the apparatus includes a means to change the unique response to the challenge signal if a device has been lost or stolen.

Example 145 includes an apparatus for tracking an e-wallet using radio frequency identification (RFID). The apparatus includes a CPU package hosting an RFID device and a trusted platform module (TPM). The RFID device is configured to provide RFID values to an RFID reader from a device hosting an e-wallet share, wherein the RFID device comprises a flash memory to store an attestation key. The trusted platform module (TPM) is configured to provide the attestation key for signing the RFID values, e-wallet transactions, or location communications, or any combinations thereof, and create a trusted execute environment (TEE) for operation of a wallet app.

Example 146 includes the subject matter of example 145. In this example, the apparatus includes an input output controller hub (ICH). The ICH includes a location controller configured to interface with a location system, and a trusted platform module (TPM). The TPM is configured to provide a location attestation key for signing location values, and create a location TEE in the ICH for the operation of the location controller.

Example 147 includes the subject matter of example 146. In this example, the location system comprises a GPS receiver.

Example 148 includes the subject matter of either of examples 146 or 147. In this example, the location system comprises a receiver for a location beacon.

Example 149 includes the subject matter of any of examples 145 to 148. In this example, the apparatus includes a wallet console app configured to accept location information from the RFID reader, the wallet app, or both.

Example 150 includes the subject matter of any of examples 149 to 149. In this example, the apparatus includes a wallet share tracking app configured to create a graph displaying a location of the device hosting the wallet app, wherein the wallet console app is configured to display a location graph for a user.

Example 151 includes the subject matter of any of examples 145 to 150. In this example, the apparatus includes a network of RFID readers configured to read the RFID device, and provide location information to a wallet share tracking app.

Example 152 includes the subject matter of any of examples 145 to 151. In this example, the apparatus includes a wallet keys module configured to create keys for e-wallet shares.

Example 153 includes the subject matter of any of examples 146 to 152. In this example, the wallet keys module is configured to track current keys and revoked keys for e-wallet shares.

Example 154 includes a method for tracking e-wallet using radiofrequency identification (RFID). The method includes determining if an RFID reader is present, and, if so, signing RFID values for a device hosting an e-wallet share and a RFID reader location with a reader key, and sending the RFID reader location to a wallet console app. A location for the e-wallet share is displayed on a tracking screen, and a next e-wallet is found.

Example 155 includes the subject matter of example 154. In this example, the method includes registering RFID values associated with an RFID chip in the device, provisioning an e-wallet key for the e-wallet share to the device, and subscribing to a network of RFID readers.

Example 156 includes the subject matter of either of examples 154 or 155. In this example, the method includes determining if the device is powered and, if so, obtaining a GPS location for the device in a location controller in an I/O controller hub (ICH), signing the GPS location with an ICH key, combining the RFID values and location into a location message, counter signing the location message with a device key, and sending the location message to a wallet console app.

Example 157 includes the subject matter of any of examples 154 to 156. In this example, the method includes determining if a location of the device hosting the e-wallet share is suspect, marking an e-wallet key for the e-wallet share as invalid, and revoking the e-wallet key.

Example 158 includes the subject matter of example 157. In this example, the method includes determining if the e-wallet share has a balance, and, if so, transferring the balance to a different e-wallet share.

Example 159 includes the subject matter of any of examples 154 to 158. In this example, the method includes sending RFID values for the device hosting the e-wallet share and the location of the device to a wallet tracking app, selecting a wallet share for performing a transaction, and sending a signed transaction. A location context is sent with the transaction. The transaction is denied if the location context indicates the transaction is fraudulent. The transaction is processed if the location context indicates the transaction is not fraudulent.

Example 160 includes the subject matter of example 159. In this example, the method includes receiving a wake-on-RFID signal from an RFID reader and powering the device.

Example 161 includes the subject matter of either of examples 159 to 160. In this example, the method includes applying an antifraud policy comprising a location context that code locates a user with the device hosting the e-wallet share.

Example 162 includes the subject matter of any of examples 159 to 161. In this example, the method includes applying an antifraud policy comprising a location context that determines if the RFID location is valid.

Example 163 includes a non-transitory, machine readable medium. The non-transitory, machine readable medium includes code that, when executed, directs a processor to distribute a wallet key to a device hosting an e-wallet share for the e-wallet share, provide a location using values from a radio frequency identification (RFID) device, and generate a transaction including a location of a device hosting the e-wallet share.

Example 164 includes the subject matter of example 163. In this example, the non-transitory, machine readable medium includes code that, when executed, directs the processor to generate a display of a wallet location of the device hosting the e-wallet share.

Example 165 includes the subject matter of either of examples 163 or 164. In this example, the non-transitory, machine readable medium includes code that, when executed, directs the processor to compare a location of the device hosting an e-wallet share to an anti-fraud policy, and deny a transaction if the location is not consistent with the anti-fraud policy.

Example 166 includes the subject matter of example 165. In this example, the non-transitory, machine readable medium includes code that, when executed, directs the processor to obtain a location from a global positioning system (GPS).

Example 167 includes an apparatus for tracking a device hosting an e-wallet share using radiofrequency identification (RFID). The apparatus includes a CPU package hosting an RFID device and a trusted platform module (TPM), a means to provide signed RFID values to an RFID reader from the device hosting the e-wallet share. The trusted platform module (TPM) is configured to provide an attestation key for signing the RFID values, e-wallet transactions, or location communications, or any combinations thereof, and create a trusted execute environment (TEE) for an operation of a wallet app.

Example 168 includes the subject matter of example 167. In this example, the apparatus includes an input output controller hub (ICH). The ICH includes a means for obtaining location values, and a trusted platform module configured to provide a location attestation key for signing the location values.

Example 169 includes the subject matter of example 168. In this example, the apparatus includes a means to display location information to a user.

Example 170 includes the subject matter of any of examples 167 to 169. In this example, the apparatus includes a means to track the device through a variety of locations using the RFID device.

Example 171 includes the subject matter of any of examples 167 to 170. In this example, the apparatus includes a means to create keys for e-wallet shares.

Example 172 includes the subject matter of any of examples 168 to 171. In this example, the apparatus includes a means to track keys for e-wallet shares.

Some examples may be implemented in one or a combination of hardware, firmware, and software. Some examples may also be implemented as instructions stored on a machine readable medium, which may be read and executed by a computing platform to perform the operations described herein. A machine readable medium may include any mechanism for storing or transmitting information in a form readable by a machine, e.g., a computer. For example, a machine readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some examples," "various examples," or "other examples" means that a particular feature, structure, or characteristic described in connection with the examples is included in at least some examples, but not necessarily all examples, of the techniques. The various appearances of "an embodiment", "one embodiment", or "some examples" are not necessarily all referring to the same examples. Elements or examples from an embodiment can be combined with elements or examples of another embodiment.

Not all components, features, structures, characteristics, etc. described and illustrated herein need to be included in a particular embodiment or examples. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some examples have been described in reference to particular implementations, other implementations are possible according to some examples. Additionally, the arrangement and/or order of circuit elements or other features illustrated in the drawings and/or described herein need not be arranged in the particular way illustrated and described. Many other arrangements are possible according to some examples.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An apparatus for a contextual authentication of an electronic wallet (e-wallet), comprising:
   a processor; and
   memory including instructions, which when executed by the processor, cause the processor to execute:
   a wallet application configured to confirm a context for use of an e-wallet by a user, wherein the context is defined by a multifactor authentication (MFA) policy; and
   a multifactor authentication application configured to access a context sensor to provide input to the wallet application for the MFA policy,
   wherein the MFA policy comprises a valid biometric identification of the user and a user proximity rule requiring the user to be proximate to the apparatus hosting the e-wallet, the valid biometric identification invoked during an initial transaction with the e-wallet, and the user proximity rule invoked during subsequent transactions with the e-wallet, and wherein the MFA policy denies use of the e-wallet based on expiration of a user presence timer, the user presence timer started when the user is no longer detected by the apparatus hosting the e-wallet, and
   wherein the MFA policy is verified to meet a standard set by a community of miners in a blockchain, the blockchain used to clear the initial transaction with the e-wallet.

2. The apparatus of claim 1, the context sensor comprising a fingerprint reader, a facial recognition system, or a location sensor, or any combinations thereof.

3. The apparatus of claim 1, comprising a physically unclonable functions (PUFS) wallet module (PWM) comprising a PUFS block, configured to provide a response to a challenge.

4. The apparatus of claim 3, wherein the challenge is a signal provided to the PUFS block based, at least in part, on the context of a user.

5. The apparatus of claim 3, wherein the challenge is a signal provided to the PUFS block based, at least in part, on a personal identification number (PIN) provided by the user.

6. The apparatus of claim 3, comprising personalization fuses that, when blown, change the response from the PUFS block.

7. The apparatus of claim 3, comprising an antitheft module configured to blow antitheft fuses when the context for the user indicates that an e-wallet holding the PWM is unauthorized.

8. The apparatus of claim 3, wherein the PUFS block comprises a domain wall memory.

9. A method for a contextual authentication of an e-wallet, comprising:
   receiving a request to authorize a transaction in a device hosting the e-wallet;

invoking a multifactor authentication application to authenticate a user of the e-wallet by using a context sensor to determine a context for the user;

allowing repeated use of the e-wallet if rules for the context are met, wherein the rules comprise a valid biometric identification of the user and a user proximity rule requiring the user to be proximate to the device hosting the e-wallet, the valid biometric identification invoked during an initial transaction with the e-wallet, and the user proximity rule invoked during subsequent transactions with the e-wallet, wherein the rules for the context are verified to meet a standard set by a community of miners in a blockchain, the blockchain used to clear the initial transaction with the e-wallet; and denying use of the e-wallet based on expiration of a user presence timer, the user presence timer started when the user is no longer detected by the device hosting the e-wallet.

10. The method of claim 9, comprising creating a wallet policy comprising the rules for the context.

11. The method of claim 9, wherein the rules comprise a location of the user.

12. The method of claim 9, wherein the rules comprise a location of the device hosting the e-wallet.

13. The method of claim 9, wherein the rules comprise a distance between the user and the device hosting the e-wallet while a transaction is cleared.

14. The method of claim 9, comprising denying use of the e-wallet if the context of the user is not authorized.

15. The method of claim 9, comprising denying use of the e-wallet if the user is not detected by the device hosting the e-wallet.

16. The method of claim 9, comprising rejecting a transaction if the context of the e-wallet is not appropriate for use with an e-retailer, a settlement system, or both.

17. The method of claim 9, comprising:
receiving an e-wallet transaction;
reading the context sensor and generating a challenge to a physically unclonable functions (PUFS) wallet module (PWM) based, at least in part, on the readings from the context sensor;
terminating a transaction if the challenge does not produce an expected result;
prompting a user for a personal identification number (PIN) and generating the challenge based, at least in part, on the PIN;
terminating the transaction if the challenge based on the PIN does not produce an expected result; and
processing the e-wallet transaction.

18. The method of claim 17, comprising:
receiving a physically unclonable functions (PUFS) wallet module (PWM) from a manufacturer;
blowing personalization fuses in the PWM to personalize a response to a challenge creating a unique identity;
registering the unique identity of the PWM;
programming a personal identification number (PIN) into the PWM;
configuring wallet policy comprising context and antitheft sensor values; and
adding e-cash to the e-wallet.

19. The method of claim 17, comprising:
detecting an unauthorized context; and
blowing antitheft fuses in the PWM.

20. A non-transitory, machine readable medium comprising code for a contextual authentication of an electronic wallet (e-wallet) that, when executed, directs a processor to:
receive a request to authorize a transaction in a device hosting the e-wallet;
invoke a multifactor authentication application to authenticate a user of the e-wallet by using a context sensor to determine a context for the user;
allow repeated use of the e-wallet if rules for the context are met, wherein the rules comprise a valid biometric identification of the user and a user proximity rule requiring the user to be proximate to the device hosting the e-wallet, the valid biometric identification invoked during an initial transaction with the e-wallet, and the user proximity rule invoked during subsequent transactions with the e-wallet, wherein the rules for the context are verified to meet a standard set by a community of miners in a blockchain, the blockchain used to clear the initial transaction with the e-wallet; and
deny use of the e-wallet based on expiration of a user presence timer, the user presence timer started when the user is no longer detected by the device hosting the e-wallet.

21. The non-transitory, machine readable medium of claim 20 comprising code that, when executed, directs a processor to:
monitor a presence of a user; and
deny the transaction if the user is not present.

22. The non-transitory, machine readable medium of claim 20, comprising code that, when executed, directs the processor to:
generate a challenge signal for a physically unclonable function (PUF) based, at least in part, on the context;
measure a response from the PUF to the challenge signal; and
deny the transaction if the response does not match an expected response.

23. The non-transitory, machine readable medium of claim 22, comprising code that, when executed, directs the processor to:
obtain a personal identification number (PIN) from a user;
generate a challenge signal for the PUF based, at least in part, on the PIN; and
deny the transaction if PUF response does not match an expected response.

* * * * *